US011518255B2

(12) United States Patent
Kohn et al.

(10) Patent No.: US 11,518,255 B2
(45) Date of Patent: Dec. 6, 2022

(54) DETERMINING CONTROL ACTIONS OF DECISION MODULES

(71) Applicant: Veritone Alpha Inc., Costa Mesa, CA (US)

(72) Inventors: Wolf Kohn, Seattle, WA (US); Michael Luis Sandoval, Bellevue, WA (US); Vishnu Vettrivel, Bothell, WA (US); Jonathan Cross, Bellevue, WA (US); Jason Knox, Kenmore, WA (US); David Talby, Mercer Island, WA (US); Mike Lazarus, San Diego, CA (US)

(73) Assignee: Veritone Alpha, Inc., Costa Mesa, CA (US)

( * ) Notice: Subject to any disclaimer, the term of this patent is extended or adjusted under 35 U.S.C. 154(b) by 1210 days.

(21) Appl. No.: 16/001,858

(22) Filed: Jun. 6, 2018

(65) Prior Publication Data

US 2018/0356783 A1    Dec. 13, 2018

Related U.S. Application Data

(63) Continuation of application No. 14/746,759, filed on Jun. 22, 2015, now Pat. No. 10,082,778.

(Continued)

(51) Int. Cl.
*G06E 1/00* (2006.01)
*G06E 3/00* (2006.01)
(Continued)

(52) U.S. Cl.
CPC ............ *B60L 50/60* (2019.02); *B60W 10/06* (2013.01); *B60W 10/08* (2013.01); *G05B 13/04* (2013.01);
(Continued)

(58) Field of Classification Search
CPC .... G06F 3/1222; G06F 3/1238; G06F 3/1273; G06F 3/1288; H04N 1/00344; H04N 1/4413; H04N 2201/0094
See application file for complete search history.

(56) References Cited

U.S. PATENT DOCUMENTS 5,040,123 A    8/1991    Barber et al.
5,724,239 A    3/1998    Kaneko
(Continued)

OTHER PUBLICATIONS

Ge et al., "Hybrid Systems: Chattering Approximation to Relaxed Controls," *Lecture Notes in Computer Science vol. 1066: Hybrid Systems* III, 1996, 25 pages.
(Continued)

*Primary Examiner* — Luis A Sitiriche
(74) *Attorney, Agent, or Firm* — VLP Law Group LLP; James A. D. White

(57) ABSTRACT

Techniques are described for implementing automated control systems that manipulate operations of specified target systems, such as by modifying or otherwise manipulating inputs or other control elements of the target system that affect its operation (e.g., affect output of the target system). An automated control system may in some situations have a distributed architecture with multiple decision modules that each controls a portion of a target system and operate in a partially decoupled manner with respect to each other, such as by each decision module operating to synchronize its local solutions and proposed control actions with those of one or more other decision modules, in order to determine a consensus with those other decision modules. Such inter-module synchronizations may occur repeatedly to determine one or more control actions for each decision module at a particular time, as well as to be repeated over multiple times for ongoing control.

29 Claims, 13 Drawing Sheets

Related U.S. Application Data

(60) Provisional application No. 62/015,018, filed on Jun. 20, 2014.

(51) Int. Cl.

| | | |
|---|---|---|
| *G06F 15/00* | (2006.01) | |
| *G06G 7/00* | (2006.01) | |
| *G06N 99/00* | (2019.01) | |
| *B60L 50/60* | (2019.01) | |
| *G05B 13/04* | (2006.01) | |
| *G06Q 10/06* | (2012.01) | |
| *G06Q 50/06* | (2012.01) | |
| *G06N 5/04* | (2006.01) | |
| *G05B 17/02* | (2006.01) | |
| *B60W 10/06* | (2006.01) | |
| *B60W 10/08* | (2006.01) | |
| *G05B 19/042* | (2006.01) | |
| *G05B 19/048* | (2006.01) | |

(52) U.S. Cl.
CPC ........... *G05B 13/041* (2013.01); *G05B 17/02* (2013.01); *G05B 19/042* (2013.01); *G05B 19/048* (2013.01); *G06N 5/04* (2013.01); *G06N 5/043* (2013.01); *G06Q 10/06315* (2013.01); *G06Q 50/06* (2013.01); *B60W 2510/0666* (2013.01); *B60W 2510/086* (2013.01); *G05B 2219/2639* (2013.01); *Y10S 903/93* (2013.01)

(56) References Cited

U.S. PATENT DOCUMENTS

| | | | |
|---|---|---|---|
| 5,727,128 | A | 3/1998 | Morrison |
| 5,963,447 | A | 10/1999 | Kohn et al. |
| 6,088,689 | A | 7/2000 | Kohn et al. |
| 6,157,864 | A | 12/2000 | Schwenke et al. |
| 6,169,981 | B1 | 1/2001 | Werbos |
| 6,694,044 | B1 | 2/2004 | Pavlović et al. |
| 8,429,106 | B2 | 4/2013 | Downs et al. |
| 2003/0069868 | A1 | 4/2003 | Vos |
| 2003/0200069 | A1 | 10/2003 | Volponi |
| 2005/0102044 | A1 | 5/2005 | Kohn et al. |
| 2005/0114105 | A1 | 5/2005 | Barber |
| 2006/0218074 | A1 | 9/2006 | Kohn |
| 2006/0229769 | A1 | 10/2006 | Grichnik et al. |
| 2009/0204259 | A1 | 8/2009 | Danko |
| 2011/0178622 | A1 | 7/2011 | Tuszynski |
| 2011/0298626 | A1 | 12/2011 | Fechalos et al. |
| 2012/0283887 | A1 | 11/2012 | Goldsmith et al. |
| 2013/0080530 | A1 | 3/2013 | Frees et al. |
| 2013/0099576 | A1 | 4/2013 | Chuah et al. |
| 2013/0253942 | A1 | 9/2013 | Liu et al. |
| 2014/0250377 | A1 | 9/2014 | Bisca et al. |
| 2015/0032394 | A1 | 1/2015 | Kimura et al. |
| 2015/0058078 | A1 | 2/2015 | Ehrenberg et al. |
| 2015/0253749 | A1 | 9/2015 | Kniazev et al. |
| 2015/0370228 | A1 | 12/2015 | Kohn et al. |
| 2016/0125435 | A1 | 5/2016 | Kohn et al. |
| 2017/0285111 | A1 | 10/2017 | Fife |
| 2017/0315517 | A1 | 11/2017 | da Silva et al. |
| 2017/0315523 | A1 | 11/2017 | Cross et al. |

OTHER PUBLICATIONS

Kohn et al., "Multiple Agent Hybrid Control: Carrier Manifolds and Chattering Approximations to Optimal Control," 33$^{rd}$ Conference on Decision and Control Lake Buena Vista, FL, Dec. 1994, 7 pages.

Kohn et al., "A Hybrid Systems Approach to Computer-Aided Control Engineering," *IEEE Control Systems* 15(2), 1995, 30 pages.

Kohn et al., "Hybrid Systems as Finsler Manifolds: Finite State Control as Approximation to Connections," *Lecture Notes in Computer Science vol. 999: Hybrid Systems II*, 1995, 28 pages.

Kohn et al., "Viability in Hybrid Systems," *Theoretical Computer Science* 138, 1995, 28 pages.

Kohn et al., "Digital to Hybrid Program Transformations," IEEE International Symposium on Intelligent Control, Dearborn, MI, Sep. 15-18, 1996, 6 pages.

Kohn et al., "Hybrid Dynamic Programming," *Lecture Notes in Computer Science vol. 1201: Hybrid and Real-Time Systems*, 1997, 7 pages.

Kohn et al., "Implementing Sensor Fusion Using a Cost-Based Approach," American Control Conference, Albuquerque, NM, Jun. 1997, 5 pages.

Kohn et al., "Control Synthesis in Hybrid Systems with Finsler Dynamics," *Houston Journal of Mathematics* 28(2), 2002, 23 pages.

Kohn et al., "A Micro-Grid Distributed Intelligent Control and Management System," *IEEE Transactions on Smart Grid* 6(6), Nov. 2015, 11 pages.

DETERMINING CONTROL ACTIONS OF DECISION MODULES

BACKGROUND

Various attempts have been made to implement automated control systems for various types of physical systems that have inputs or other control elements that the control system can manipulate to attempt to provide desired output or other behavior of the physical systems being controlled. Such automated control systems have used various types of architectures and underlying computing technologies to attempt to implement such functionality, including to attempt to deal with issues related to uncertainty in the state of the physical system being controlled, the need to make control decisions in very short amounts of time to provide real-time or near-real-time control and with only partial information, etc.

However, various difficulties exist with existing automated control systems and their underlying architectures and computing technologies, including with respect to managing large numbers of constraints (sometimes conflicting), operating in a coordinated manner with other systems, etc.

DETAILED DESCRIPTION

Figure 1:
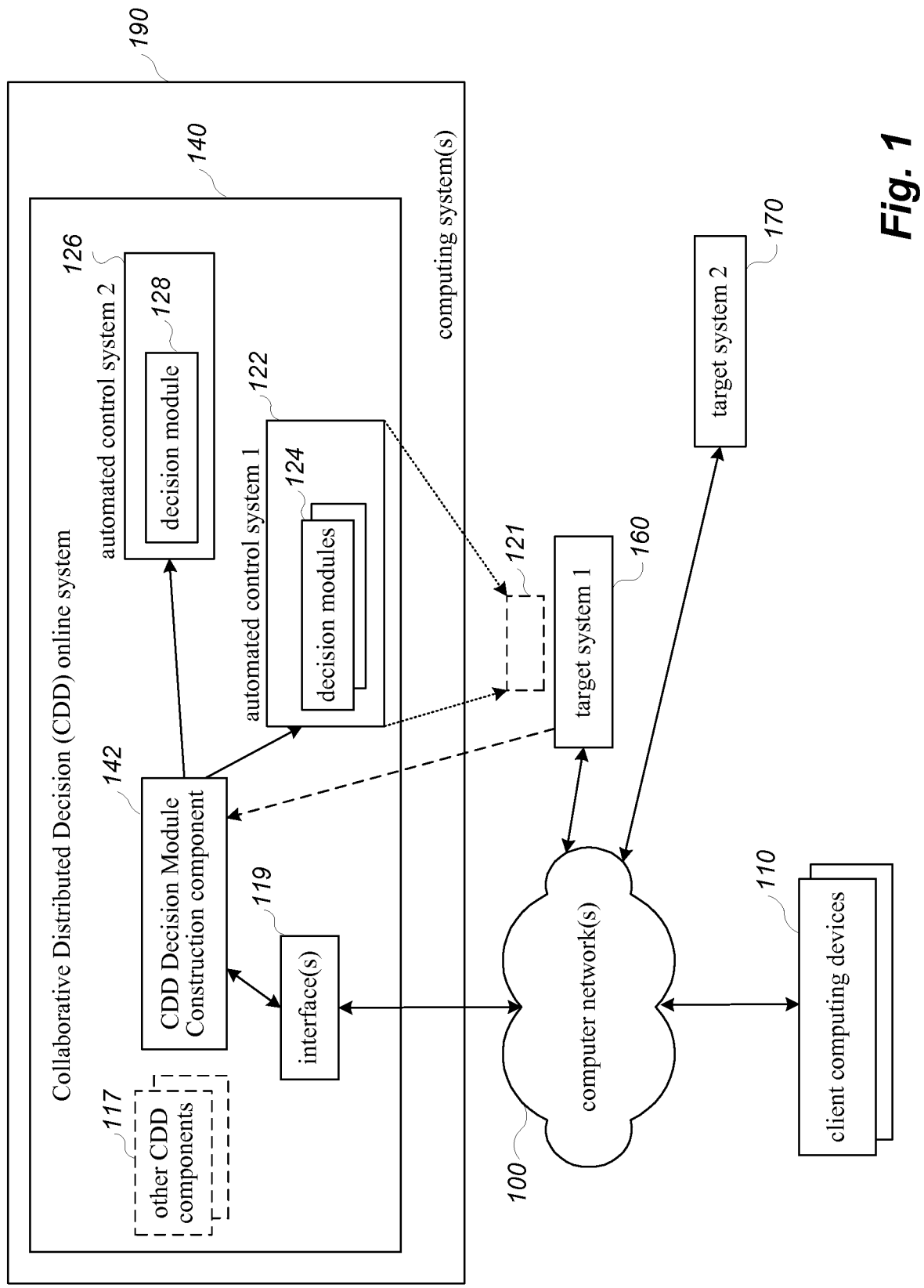
FIG. 1 is a network diagram illustrating an example environment in which a system for performing cooperative distributed control of target systems may be configured and initiated.

Techniques are described for implementing automated control systems to control or otherwise manipulate at least some operations of specified physical systems or other target systems. A target system to be controlled or otherwise manipulated may have numerous elements that are interconnected in various manners, with a subset of those elements being inputs or other control elements that a corresponding automated control system may modify or otherwise manipulate in order to affect the operation of the target system. In at least some embodiments and situations, a target system may further have one or more outputs that the manipulations of the control elements affect, such as if the target system is producing or modifying physical goods or otherwise producing physical effects.

As part of implementing such an automated control system for a particular target system, an embodiment of a Collaborative Distributed Decision (CDD) system may use the described techniques to perform various automated activities involved in constructing and implementing the automated control system—a brief introduction to some aspects of the activities of the CDD system is provided here, with additional details included below. In particular, the CDD system may in some embodiments implement a Decision Module Construction component that interacts with one or more users to obtain a description of a target system, including restrictions related to the various elements of the target system, and one or more goals to be achieved during control of the target system—the Decision Module Construction component then performs various automated actions to generate, test and deploy one or more executable decision modules (also referred to at times as "decision elements" and/or "agents") to use in performing the control of the target system. When the one or more executable decision modules are deployed and executed, the CDD system may further provide various components within or external to the decision modules being executed to manage their control of the target system, such as a Control Action Determination component of each decision module to optimize or otherwise enhance the control actions that the decision module generates, and/or one or more Coordinated Control Management components to coordinate the control actions of multiple decision modules that are collectively performing the control of the target system. Additional details related to such components of the CDD system and their automated operations are included below.

As noted above, the described techniques may be used to provide automated control systems for various types of physical systems or other target systems. In one or more embodiments, an automated control system is generated and provided and used to control a micro-grid electricity facility, such as at a residential location that includes one or more electricity sources (e.g., one or more solar panel grids, one or more wind turbines, etc.) and one or more electricity storage and source mechanisms (e.g., one or more batteries). The automated control system may, for example, operate at the micro-grid electricity facility (e.g., as part of a home automation system), such as to receive requests from the operator of a local electrical grid to provide particular amounts of electricity at particular times, and to control operation of the micro-grid electricity facility by determining whether to accept each such request. If a request is accepted, the control actions may further include selecting which electricity source (e.g., solar panel, battery, etc.) to use to provide the requested electricity, and otherwise the control actions may further include determine to provide electricity being generated to at least one energy storage mechanism (e.g., to charge a battery). Outputs of such a physical system include the electricity being provided to the local electrical grid, and a goal that the automated control system implements may be, for example, is to maximize profits for the micro-grid electricity facility from providing of the electricity. It will be appreciated that such a physical system being controlled and a corresponding automated control system may include a variety of elements and use various types of information and perform various types of activities, with additional details regarding such an automated control system being included below.

In one or more embodiments, an automated control system is generated and provided and used to control a vehicle with a motor and in some cases an engine, such as an electrical bicycle in which power may come from a user who is pedaling and/or from a motor powered by a battery and/or an engine. The automated control system may, for example, operate on the vehicle or on the user, such as to control operation of the vehicle by determining whether at a current time to remove energy from the battery to power the motor (and if so to further determine how much energy to remove from the battery) or to instead add excess energy to the battery (e.g., as generated by the engine, and if so to further determine how much energy to generate from the engine; and/or as captured from braking or downhill coasting). Outputs of such a physical system include the effects of the motor to move the vehicle, and a goal that the automated control system implements may be, for example, to move the vehicle at one or more specified speeds with a minimum of energy produced from the battery, and/or to minimize use of fuel by the engine. It will be appreciated that such a physical system being controlled and a corresponding automated control system may include a variety of elements and use various types of information and perform various types of activities, with additional details regarding such an automated control system being included below.

In one or more embodiments, an automated control system is generated and provided and used to manage product inventory for one or more products at one or more locations, such as a retail location that receives products from one or more product sources (e.g., when ordered or requested by the retail location) and that provides products to one or more product recipients (e.g., when ordered or requested by the recipients). The automated control system may, for example, operate at the retail location and/or at a remote network-accessible location, such as to receive requests from product recipients for products, and to control operation of the product inventory at the one or more locations by selecting at a current time one or more first amounts of one or more products to request from the one or more product sources, and by selecting at the current time one or more second amounts of at least one product to provide to the one or more product recipients. Outputs of such a physical system include products being provided from the one or more locations to the one or more product recipients, and a goal that the automated control system implements may be, for example, to maximize profit of an entity operating the one or more locations while maintaining the inventory at one or more specified levels. It will be appreciated that such a physical system being controlled and a corresponding automated control system may include a variety of elements and use various types of information and perform various types of activities, with additional details regarding such an automated control system being included below.

In one or more embodiments, an automated control system is generated and provided and used to manage cyber-security for physical computing resources being protected from unauthorized operations and/or to determine a risk level from information provided by or available from one or more information sources. The automated control system may, for example, operate at the location of the computing resources or information sources and/or at a remote network-accessible location, such as to receive information about attempts (whether current or past) to perform operations on computing resources being protected or about information being provided by or available from the one or more information sources, and to control operation of the cyber-security system by determine whether a change in authorization to a specified type of operation is needed and to select one or more actions to take to implement the change in authorization if so determined, and/or to determine whether a risk level exceeds a specified threshold and to select one or more actions to take to mitigate the risk level. A goal that the automated control system implements may be, for example, to minimize unauthorized operations that are performed and/or to minimize the risk level. It will be appreciated that such a target system being controlled and a corresponding automated control system may include a variety of elements and use various types of information and perform various types of activities, with additional details regarding such an automated control system being included below.

In one or more embodiments, an automated control system is generated and provided and used to manage transactions being performed in one or more financial markets, such as to buy and/or sell physical items or other financial items. The automated control system may, for example, operate at the one or more final markets or at a network-accessible location that is remote from the one or more financial markets, such as to control operation of the transactions performed by determining whether to purchase or sell particular items at particular times and to select one or more actions to initiate transactions to purchase or sell the particular items at the particular times. A goal that the automated control system implements may be, for example, to maximize profit while maintaining risk below a specified threshold. It will be appreciated that such a target system being controlled and a corresponding automated control system may include a variety of elements and use various types of information and perform various types of activities, with additional details regarding such an automated control system being included below.

In one or more embodiments, an automated control system is generated and provided and used to perform coding for medical procedures, such as to allow billing to occur for medical procedures performed on humans. The automated control system may, for example, operate at a location at which the medical procedures are performed or at a network-accessible location that is remote from such a medical location, such as to control operation of the coding that is performed by selecting particular medical codes to associate with particular medical procedures in specified circumstances. A goal that the automated control system implements may be, for example, to minimize errors in selected medical codes that cause revenue leakage. It will be appreciated that such a target system being controlled and a corresponding automated control system may include a variety of elements and use various types of information and perform various types of activities, with additional details regarding such an automated control system being included below.

It will also be appreciated that the described techniques may be used with a wide variety of other types of target systems, some of which are further discussed below, and that the invention is not limited to the techniques discussed for particular target systems and corresponding automated control systems.

As noted above, a Collaborative Distributed Decision (CDD) system may in some embodiments use at least some of the described techniques to perform various automated activities involved in constructing and implementing a automated control system for a specified target system, such as to modify or otherwise manipulate inputs or other control elements of the target system that affect its operation (e.g., affect one or more outputs of the target system). An automated control system for such a target system may in some situations have a distributed architecture that provides cooperative distributed control of the target system, such as with multiple decision modules that each control a portion of the target system and that operate in a partially decoupled manner with respect to each other. If so, the various decision modules' operations for the automated control system may be at least partially synchronized, such as by each reaching a consensus with one or more other decision modules at one or more times, even if a fully synchronized convergence of all decision modules at all times is not guaranteed or achieved.

The CDD system may in some embodiments implement a Decision Module Construction component that interacts with one or more users to obtain a description of a target system, including restrictions related to the various elements of the target system, and one or more goals to be achieved during control of the target system—the Decision Module Construction component then performs various automated actions to generate, test and deploy one or more executable decision modules to use in performing the control of the target system. The Decision Module Construction component may thus operate as part of a configuration or setup phase that occurs before a later run-time phase in which the generated decision modules are executed to perform control of the target system, although in some embodiments and situations the Decision Module Construction component may be further used after an initial deployment to improve or extend or otherwise modify an automated control system that has one or more decision modules (e.g., while the automated control system continues to be used to control the target system), such as to add, remove or modify decision modules for the automated control system.

In some embodiments, some or all automated control systems that are generated and deployed may further provide various components within them for execution during the runtime operation of the automated control system, such as by including such components within decision modules in some embodiments and situations. Such components may include, for example, a Control Action Determination component of each decision module (or of some decision modules) to optimize or otherwise determine and improve the control actions that the decision module generates. For example, such a Control Action Determination component in a decision module may in some embodiments attempt to automatically determine the decision module's control actions for a particular time to reflect a near-optimal solution with respect to or one more goals and in light of a model of the decision module for the target system that has multiple inter-related constraints—if so, such a near-optimal solution may be based at least in part on a partially optimized solution that is within a threshold amount of a fully optimized solution. Such determination of one or more control actions to perform may occur for a particular time and for each of one or more decision modules, as well as be repeated over multiple times for ongoing control by at least some decision modules in some situations. In some embodiments, the model for a decision module is implemented as a Hamiltonian function that reflects a set of coupled differential equations based in part on constraints representing at least part of the target system, such as to allow the model and its Hamiltonian function implementation to be updated over multiple time periods by adding additional expressions within the evolving Hamiltonian function.

In some embodiments, the components included within a generated and deployed automated control system for execution during the automated control system's runtime operation may further include one or more Coordinated Control Management components to coordinate the control actions of multiple decision modules that are collectively performing the control of a target system for the automated control system. For example, some or all decision modules may each include such a Control Action Determination component in some embodiments to attempt to synchronize that decision module's local solutions and proposed control actions with those of one or more other decision modules in the automated control system, such as by determining a consensus shared model with those other decision modules that simultaneously provides solutions from the decision module's local model and the models of the one or more other decision modules. Such inter-module synchronizations may occur repeatedly to determine one or more control actions for each decision module at a particular time, as well as to be repeated over multiple times for ongoing control. In addition, each decision module's model is implemented in some embodiments as a Hamiltonian function that reflects a set of coupled differential equations based in part on constraints representing at least part of the target system, such as to allow each decision module's model and its Hamiltonian function implementation to be combined with the models of one or more other decision modules by adding additional expressions for those other decision modules' models within the initial Hamiltonian function for the local model of the decision module.

Use of the described techniques may also provide various types of benefits in particular embodiments, including non-exclusive examples of beneficial attributes or operations as follows:

Infer interests/desired content in a cold start environment where textual (or other unstructured) data is available and with minimal user history;

Improve inference in a continuous way that can incorporate increasingly rich user histories;

Improve inference performance with the addition of feedback, explicit/implicit, positive/negative and preferably in a real-time or near-real-time manner;

Derive information from domain experts that provide business value, and embed them in inference framework;

Dynamically add new unstructured data that may represent new states, and update existing model in a calibrated way;

Renormalize inference system to accommodate conflicts;

Immediately do inferencing in a new environment based on a natural language model;

Add new information as a statistical model, and integrate with a natural language model to significantly improve inference/prediction;

Integrate new data and disintegrate old data in a way that only improves performance;

Perform inferencing in a data secure way;

Integrate distinct inferencing elements in a distributed network and improve overall performance;

Easily program rules and information into the system from a lay-user perspective;

Inexpensively perform computer inferences in a way that is suitable for bandwidth of mobile devices; and Incorporate constraint information.

It will be appreciated that some embodiments may not include all some illustrative benefits, and that some embodiments may include some benefits that are not listed.

For illustrative purposes, some embodiments are described below in which specific types of operations are performed, including with respect to using the described techniques with particular types of target systems and to perform particular types of control activities that are determined in particular manners. These examples are provided for illustrative purposes and are simplified for the sake of brevity, and the inventive techniques may be used in a wide variety of other situations, including in other environments and with other types of automated control action determination techniques, some of which are discussed below.

FIG. 1 is a network diagram illustrating an example environment in which a system for performing cooperative distributed control of one or more target systems may be configured and initiated. In particular, an embodiment of a CDD system 140 is executing on one or more computing systems 190, including in the illustrated embodiment to operate in an online manner and provide a graphical user interface (GUI) (not shown) and/or other interfaces 119 to enable one or more remote users of client computing systems 110 to interact over one or more intervening computer networks 100 with the CDD system 140 to configure and create one or more decision modules to include as part of an automated control system to use with each of one or more target systems to be controlled.

In particular, target system 1 160 and target system 2 170 are example target systems illustrated in this example, although it will be appreciated that only one target system or numerous target systems may be available in particular embodiments and situations, and that each such target system may include a variety of mechanical, electronic, chemical, biological, and/or other types of components to implement operations of the target system in a manner specific to the target system. In this example, the one or more users (not shown) may interact with the CDD system 140 to generate an example automated control system 122 for target system 1, with the automated control system including multiple decision modules 124 in this example that will cooperatively interact to control portions of the target system 1 160 when later deployed and implemented. The process of the users interacting with the CDD system 140 to create the automated control system 122 may involve a variety of interactions over time, including in some cases independent actions of different groups of users, as discussed in greater detail elsewhere. In addition, as part of the process of creating and/or training or testing automated control system 122, it may perform one or more interactions with the target system 1 as illustrated, such as to obtain partial initial state information, although some or all training activities may in at least some embodiments include simulating effects of control actions in the target system 1 without actually implementing those control actions at that time.

After the automated control system 122 is created, the automated control system may be deployed and implemented to begin performing operations involving controlling the target system 1 160, such as by optionally executing the automated control system 122 on the one or more computing systems 190 of the CDD system 140, so as to interact over the computer networks 100 with the target system 1. In other embodiments and situations, the automated control system 122 may instead be deployed by executing local copies of some or all of the automated control system 122 (e.g., one or more of the multiple decision modules 124) in a manner local to the target system 1, as illustrated with respect to a deployed copy 121 of some or all of automated control system 1, such as on one or more computing systems (not shown) that are part of the target system 1.

In a similar manner to that discussed with respect to automated control system 122, one or more users (whether the same users, overlapping users, or completely unrelated users to those that were involved in creating the automated control system 122) may similarly interact over the computer network 100 with the CDD system 140 to create a separate automated control system 126 for use in controlling some or all of the target system 2 170. In this example, the automated control system 126 for target system 2 includes only a single decision module 128 that will perform all of the control actions for the automated control system 126. The automated control system 126 may similarly be deployed and implemented for target system 2 in a manner similar to that discussed with respect to automated control system 122, such as to execute locally on the one or more computing systems 190 and/or on one or more computing systems (not shown) that are part of the target system 2, although a deployed copy of automated control system 2 is not illustrated in this example. It will be further appreciated that the automated control systems 122 and/or 126 may further include other components and/or functionality that are separate from the particular decision modules 124 and 128, respectively, although such other components and/or functionality are not illustrated in FIG. 1.

The network 100 may, for example, be a publicly accessible network of linked networks, possibly operated by various distinct parties, such as the Internet, with the CDD system 140 available to any users or only certain users over the network 100. In other embodiments, the network 100 may be a private network, such as, for example, a corporate or university network that is wholly or partially inaccessible to non-privileged users. In still other embodiments, the network 100 may include one or more private networks with access to and/or from the Internet.

Thus, while the CDD system 140 in the illustrated embodiment is implemented in an online manner to support various users over the one or more computer networks 100, in other embodiments a copy of the CDD system 140 may instead be implemented in other manners, such as to support a single user or a group of related users (e.g., a company or other organization), such as if the one or more computer networks 100 are instead an internal computer network of the company or other organization, and with such a copy of the CDD system optionally not being available to other users external to the company or other organizations. The online version of the CDD system 140 and/or local copy version of the CDD system 140 may in some embodiments and situations operate in a fee-based manner, such that the one or more users provide various fees to use various operations of the CDD system, such as to perform interactions to generate decision modules and corresponding automated control systems, and/or to deploy or implement such decision modules and corresponding automated control systems in various manners. In addition, the CDD system 140, each of its components (including component 142 and optional other components 117, such as one or more CDD Control Action Determination components and/or one or more CDD Coordinated Control Management components), each of the decision modules, and/or each of the automated control systems may include software instructions that execute on one or more computing systems (not shown) by one or more processors (not shown), such as to configure those processors and computing systems to operate as specialized machines with respect to performing their programmed functionality.

Figure 2:
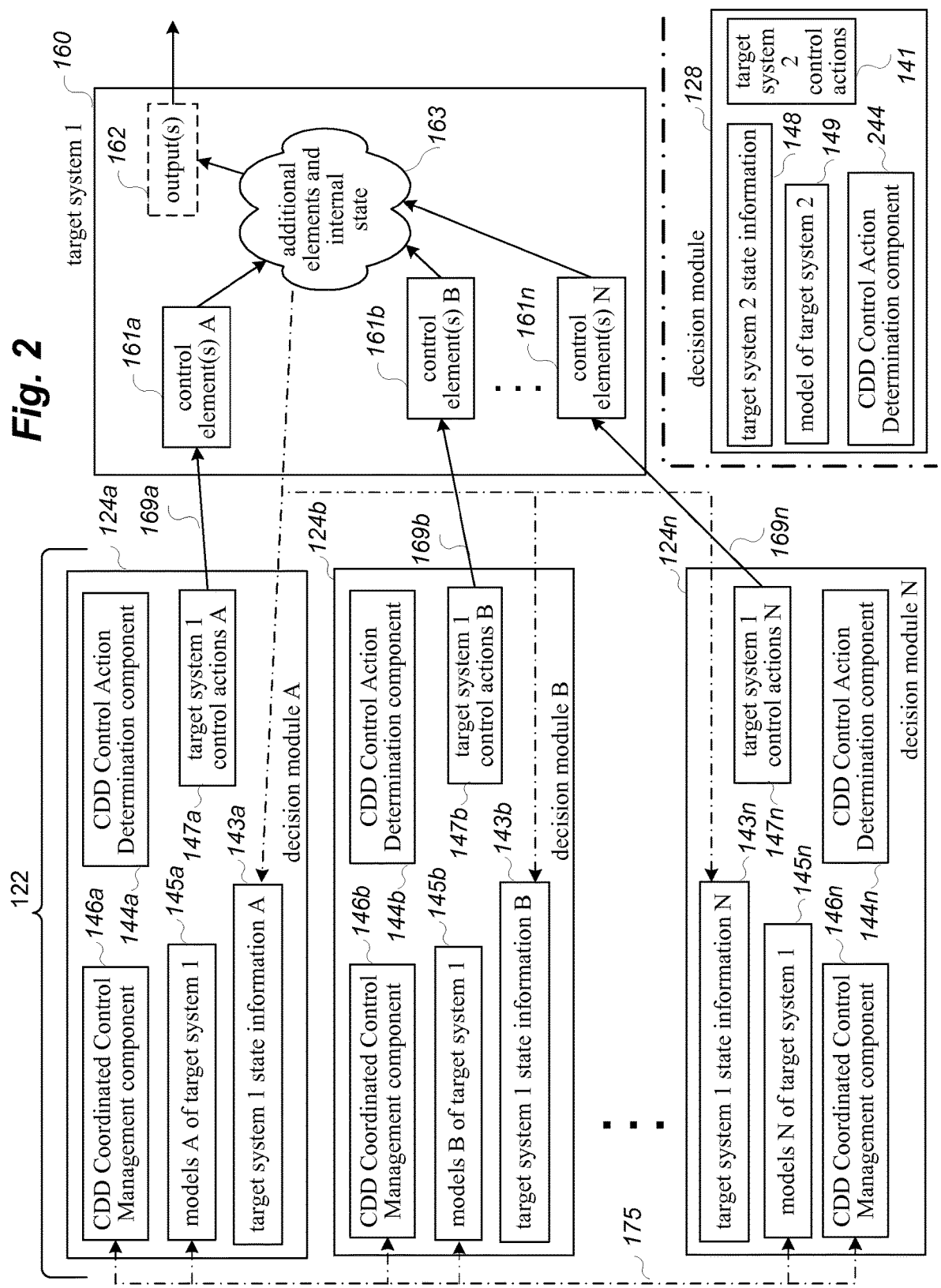
FIG. 2 is a network diagram illustrating an example environment in which a system for performing cooperative distributed control of target systems may be implemented.

FIG. 2 is a network diagram illustrating an example environment in which a system for performing cooperative distributed control of target systems may be implemented, and in particular continues the examples discussed with respect to FIG. 1. In the example environment of FIG. 2, target system 1 160 is again illustrated, with the automated control system 122 now being deployed and implemented to use in actively controlling the target system 1 160. In the example of FIG. 2, the decision modules 124 are represented as individual decision modules 124a, 124b, etc., to 124n, and may be executing locally to the target system 1 160 and/or in a remote manner over one or more intervening computer networks (not shown). In the illustrated example, each of the decision modules 124 includes a local copy of a CDD Control Action Determination component 144, such as with component 144a supporting its local decision module 124a, component 144b supporting its local decision module 124b, and component 144n supporting its local decision module 124n. Similarly, the actions of the various decision modules 124 are coordinated and synchronized in a peer-to-peer manner in the illustrated embodiment, with each of the decision modules 124 including a copy of a CDD Coordinated Control Management component 146 to perform such synchronization, with component 146a supporting its local decision module 124a, component 146b supporting its local decision module 124b, and component 146n supporting its local decision module 124n.

As the decision modules 124 and automated control system 122 execute, various interactions 175 between the decision modules 124 are performed, such as to share information about current models and other state of the decision modules to enable cooperation and coordination between various decision modules, such as for a particular decision module to operate in a partially synchronized consensus manner with respect to one or more other decision modules (and in some situations in a fully synchronized manner in which the consensus actions of all of the decision modules 124 converge). During operation of the decision modules 124 and automated control system 122, various state information 143 may be obtained by the automated control system 122 from the target system 160, such as initial state information and changing state information over time, and including outputs or other results in the target system 1 from control actions performed by the decision modules 124.

The target system 1 in this example includes various control elements 161 that the automated control system 122 may manipulate, and in this example each decision module 124 may have a separate group of one or more control elements 161 that it manipulates (such that decision module A 124a performs interactions 169a to perform control actions A 147a on control elements A 161a, decision module B 124b performs interactions 169b to perform control actions B 147b on control elements B 161b, and decision module N 124n performs interactions 169n to perform control actions N 147n on control elements N 161n). Such control actions affect the internal state 163 of other elements of the target system 1, including optionally to cause or influence one or more outputs 162. As operation of the target system 1 is ongoing, at least some of the internal state information 163 is provided to some or all of the decision modules to influence their ongoing control actions, with each of the decision modules 124a-124n possibly having a distinct set of state information 143a-143n, respectively, in this example.

As discussed in greater detail elsewhere, each decision module 124 may use such state information 143 and a local model 145 of the decision module for the target system to determine particular control actions 147 to next perform, such as for each of multiple time periods, although in other embodiments and situations, a particular automated control system may perform interactions with a particular target system for only one time period or only for some time periods. For example, the local CDD Control Action Determination component 144 for a decision module 124 may determine a near-optimal location solution for that decision module's local model 145, and with the local CDD Coordinated Control Management component 146 determining a synchronized consensus solution to reflect other of the decision modules 124, including to update the decision module's local model 145 based on such local and/or synchronized solutions that are determined. Thus, during execution of the automated control system 122, the automated control system performs various interactions with the target system 160, including to request state information, and to provide instructions to modify values of or otherwise manipulate control elements 161 of the target system 160. For example, for each of multiple time periods, decision module 124a may perform one or more interactions 169a with one or more control elements 161a of the target system, while decision module 124b may similarly perform one or more interactions 169b with one or more separate control elements B 161b, and decision module 124n may perform one or more interactions 169n with one or more control elements N 161n of the target system 160. In other embodiments and situations, at least some control elements may not perform control actions during each time period.

While example target system 2 170 is not illustrated in FIG. 2, further details are illustrated for decision module 128 of automated control system 126 for reference purposes, although such a decision module 128 would not typically be implemented together with the decision modules 124 controlling target system 1. In particular, the deployed copy of automated control system 126 includes only the single executing decision module 128 in this example, although in other embodiments the automated control system 126 may include other components and functionality. In addition, since only a single decision module 128 is implemented for the automated control system 126, the decision module 128 includes a local CDD Control Action Determination component 244, but does not in the illustrated embodiment include any local CDD Coordinated Control Management component, since there are not other decision modules with which to synchronize and interact.

While not illustrated in FIGS. 1 and 2, the distributed nature of operations of automated control systems such as those of 122 allow partially decoupled operations of the various decision modules, include to allow modifications to the group of decision modules 124 to be modified over time while the automated control system 122 is in use, such as to add new decision modules 124 and/or to remove existing decision modules 124. In a similar manner, changes may be made to particular decision modules 124 and/or 128, such as to change rules or other restrictions specific to a particular decision module and/or to change goals specific to a particular decision module over time, with a new corresponding model being generated and deployed within such a decision module, including in some embodiments and situations while the corresponding automated control system continues control operations of a corresponding target system. In addition, while each automated control system is described as controlling a single target system in the examples of FIGS. 1 and 2, in other embodiments and situations, other configurations may be used, such as for a single automated control system to control multiple target systems (e.g., multiple inter-related target systems, multiple target systems of the same type, etc.), and/or multiple automated control systems may operate to control a single target system, such as by each operating independently to control different portions of that target control system. It will be appreciated that other configurations may similarly be used in other embodiments and situations.

Figure 3:
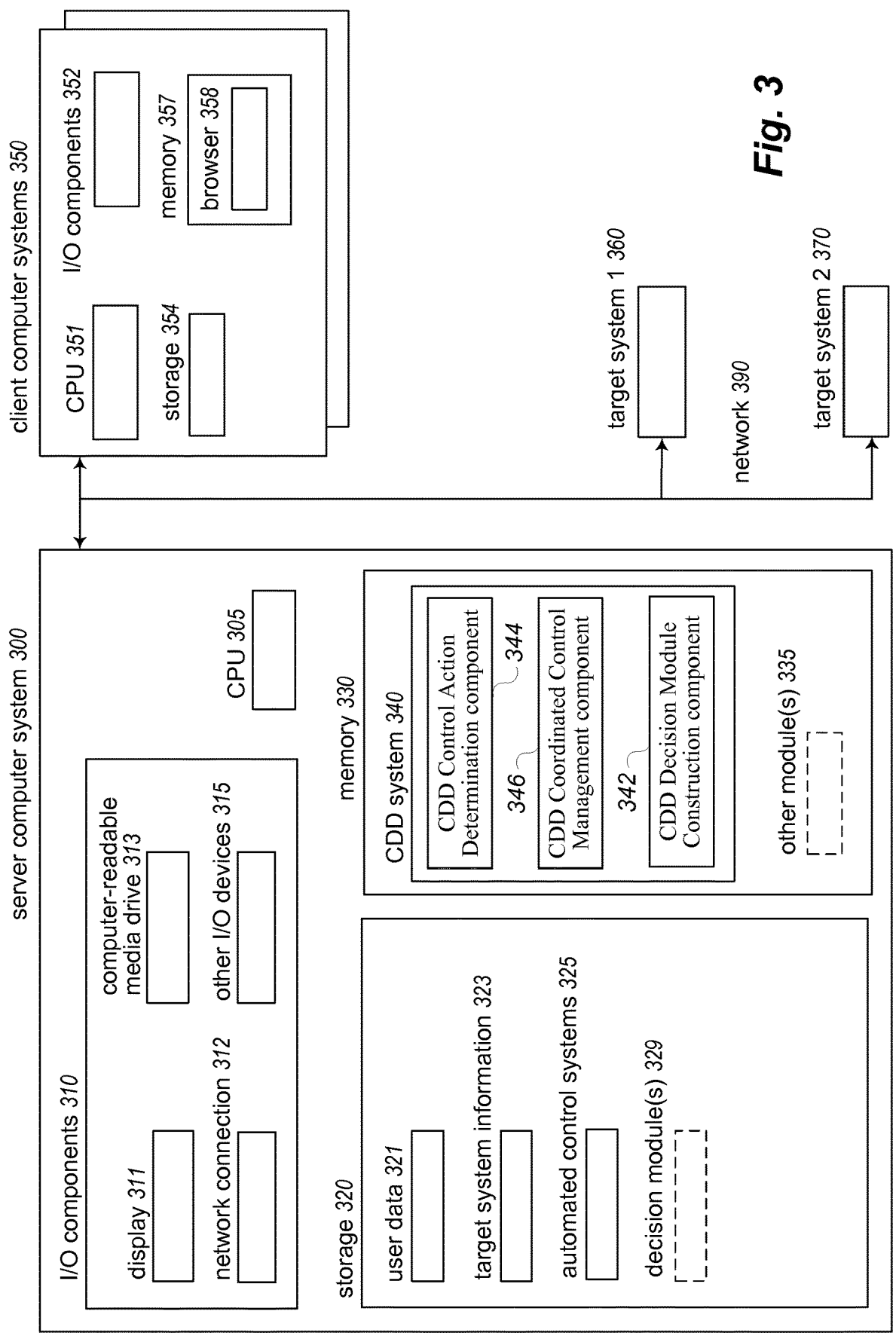
FIG. 3 is a block diagram illustrating example computing systems suitable for executing an embodiment of a system for performing cooperative distributed control of target systems in configured manners.

FIG. 3 is a block diagram illustrating example computing systems suitable for performing techniques for implementing automated control systems to control or otherwise manipulate at least some operations of specified physical systems or other target systems in configured manners. In particular, FIG. 3 illustrates a server computing system 300 suitable for providing at least some functionality of a CDD system, although in other embodiments multiple computing systems may be used for the execution (e.g., to have distinct computing systems executing the CDD Decision Module Construction component for initial configuration and setup before run-time control occurs, and one or more copies of the CDD Control Action Determination component 344 and/or the CDD Coordinated Control Managements component 346 for the actual run-time control). FIG. 3 also illustrates various client computer systems 350 that may be used by customers or other users of the CDD system 340, as well as one or more target systems (in this example, target system 1 360 and target system 2 370, which are accessible to the CDD system 340 over one or more computer networks 390).

The server computing system 300 has components in the illustrated embodiment that include one or more hardware CPU ("central processing unit") computer processors 305, various I/O ("input/output") hardware components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated client computer systems 350 may each have components similar to those of server computing system 300, including one or more CPUs 351, I/O components 352, storage 354, and memory 357, although some details are not illustrated for the computing systems 350 for the sake of brevity. The target systems 360 and 370 may also each include one or more computing systems (not shown) having components that are similar to some or all of the components illustrated with respect to server computing system 300, but such computing systems and components are not illustrated in this example for the sake of brevity.

The CDD system 340 is executing in memory 330 and includes components 342-346, and in some embodiments the system and/or components each includes various software instructions that when executed program one or more of the CPU processors 305 to provide an embodiment of a CDD system as described elsewhere herein. The CDD system 340 may interact with computing systems 350 over the network 390 (e.g., via the Internet and/or the World Wide Web, via a private cellular network, etc.), as well as the target systems 360 and 370 in this example. In this example embodiment, the CDD system includes functionality related to generating and deploying decision modules in configured manners for customers or other users, as discussed in greater detail elsewhere herein. The other computing systems 350 may also be executing various software as part of interactions with the CDD system 340 and/or its components. For example, client computing systems 350 may be executing software in memory 357 to interact with CDD system 340 (e.g., as part of a Web browser, a specialized client-side application program, etc.), such as to interact with one or more interfaces (not shown) of the CDD system 340 to configure and deploy automated control systems (e.g., stored automated control systems 325 that were previously created by the CDD system 340) or other decision modules 329, as well as to perform various other types of actions, as discussed in greater detail elsewhere. Various information related to the functionality of the CDD system 340 may be stored in storage 320, such as information 321 related to users of the CDD system (e.g., account information), and information 323 related to one or more target systems.

It will be appreciated that computing systems 300 and 350 and target systems 360 and 370 are merely illustrative and are not intended to limit the scope of the present invention. The computing systems may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system or device may comprise any combination of hardware that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated CDD system 340 and its components may in some embodiments be distributed in additional components. Similarly, in some embodiments some of the functionality of the CDD system 340 and/or CDD components 342-346 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the CDD system 340 and/or the CDD components 342-346) and/or data structures, such as by execution of software instructions of the one or more software programs and/or by storage of such software instructions and/or data structures. Furthermore, in some embodiments, some or all of the systems and/or components may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
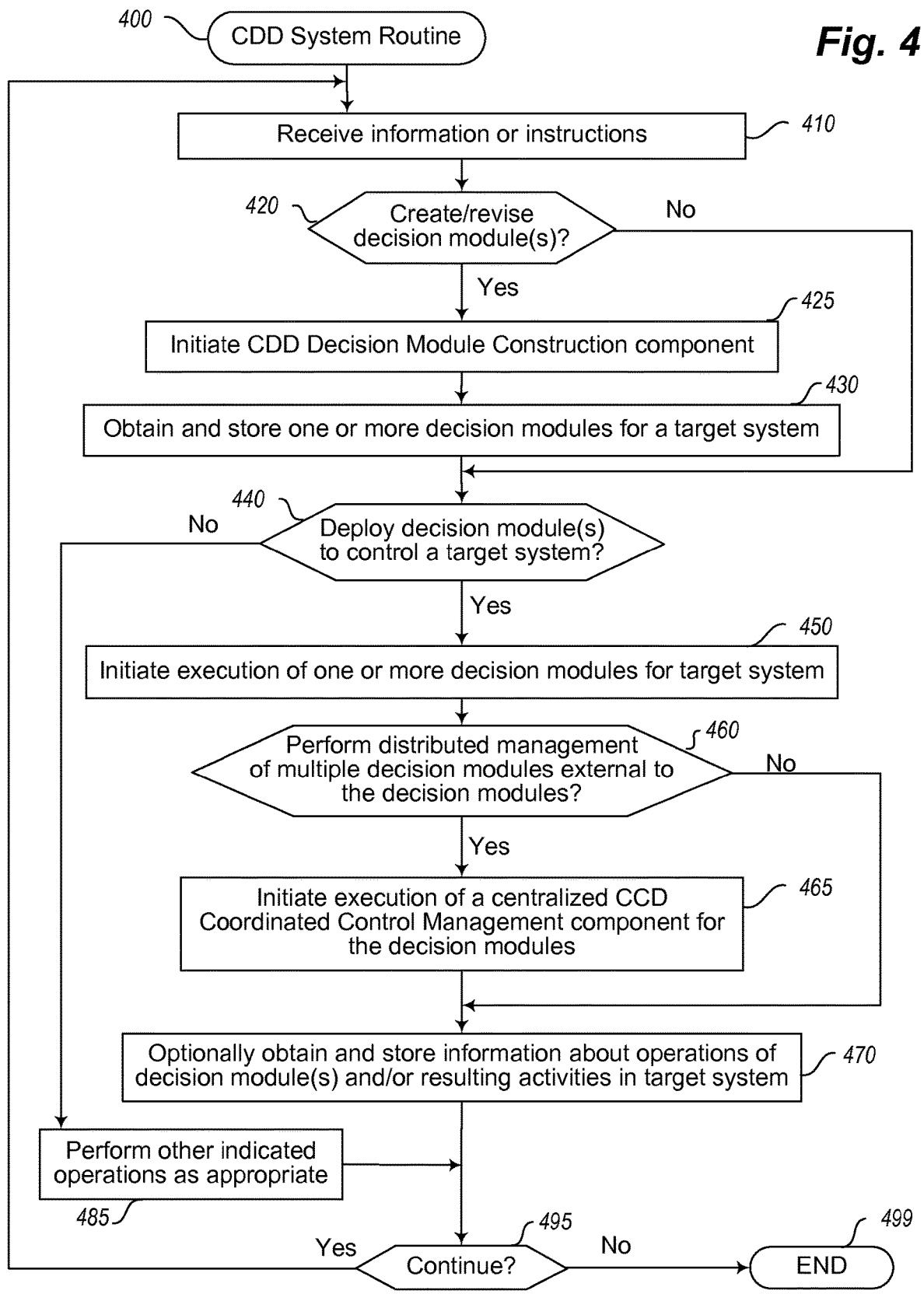
FIG. 4 illustrates a flow diagram of an example embodiment of a Collaborative Distributed Decision (CDD) System routine.

FIG. 4 is a flow diagram of an example embodiment of a Collaborative Distributed Decision (CDD) system routine 400. The routine may, for example, be provided by execution of the CDD system 340 of FIG. 3 and/or the CDD system 140 of FIG. 1, such as to provide functionality to construct and implement automated control systems for specified target systems.

The illustrated embodiment of the routine begins at block 410, where information or instructions are received. If it is determined in block 420 that the information or instructions of block 410 include an indication to create or revise one or more decision modules for use as part of an automated control system for a particular target system, the routine continues to block 425 to initiate execution of a Decision Module Construction component, and in block 430 obtains and stores one or more resulting decision modules for the target system that are created in block 425. One example of a routine for such a Decision Module Construction component is discussed in greater detail with respect to FIGS. 5A-5B.

After block 430, or if it is instead determined in block 420 that the information or instructions received in block 410 are not to create or revise one or more decision modules, the routine continues to block 440 to determine whether the information or instructions received in block 410 indicate to deploy one or more created decision modules to control a specified target system, such as for one or more decision modules that are part of an automated control system for that target system. The one or more decision modules to deploy may have been created immediately prior with respect to block 425, such that the deployment occurs in a manner that is substantially simultaneous with the creation, or in other situations may include one or more decision modules that were created at a previous time and stored for later use. If it is determined to deploy one or more such decision modules for such a target system, the routine continues to block 450 to initiate the execution of those one or more decision modules for that target system, such as on one or more computing systems local to an environment of the target system, or instead on one or more remote computing systems that communicate with the target system over one or more intermediary computer networks (e.g., one or more computing systems under control of a provider of the CDD system).

After block 450, the routine continues to block 460 to determine whether to perform distributed management of multiple decision modules being deployed in a manner external to those decision modules, such as via one or more centralized Coordinated Control Management components. If so, the routine continues to block 465 to initiate execution of one or more such centralized CDD Coordinated Control Management components for use with those decision modules. After block 465, or if it is instead determined in block 460 to not perform such distributed management in an external manner (e.g., if only one decision module is executed, if multiple decision modules are executed but coordinate their operations in a distributed peer-to-peer manner, etc.), the routine continues to block 470 to optionally obtain and store information about the operations of the one or more decision modules and/or resulting activities that occur in the target system, such as for later analysis and/or reporting.

If it is instead determined in block 440 that the information or instructions received in block 410 are not to deploy one or more decision modules, the routine continues instead to block 485 to perform one or more other indicated operations if appropriate. For example, such other authorized operations may include obtaining results information about the operation of a target system in other manners (e.g., by monitoring outputs or other state information for the target system), analyzing results of operations of decision modules and/or activities of corresponding target systems, generating reports or otherwise providing information to users regarding such operations and/or activities, etc. In addition, in some embodiments the analysis of activities of a particular target system over time may allow patterns to be identified in operation of the target system, such as to allow a model of that target system to be modified accordingly (whether manually or in an automated learning manner) to reflect those patterns and to respond based on them. In addition, as discussed in greater detail elsewhere, distributed operation of multiple decision modules for an automated control system in a partially decoupled manner allows various changes to be made while the automated control system is in operation, such as to add one or more new decision modules, to remove one or more existing decision modules, to modify the operation of a particular decision module (e.g., by changing rules or other information describing the target system that is part of a model for the decision module), etc. In addition, the partially decoupled nature of multiple such decision modules in an automated control system allows one or more such decision modules to operate individually at times, such as if network communication issues or other problems prevent communication between multiple decision modules that would otherwise allow their individualized control actions to be coordinated—in such situations, some or all such decision modules may continue to operate in an individualized manner, such as to provide useful ongoing control operations for a target system even if optimal or near-optimal solutions cannot be identified from coordination and synchronization between a group of multiple decision modules that collectively provide the automated control system for the target system.

After blocks 470 or 485, the routine continues to block 495 to determine whether to continue, such as until an explicit indication to terminate is received. If it is determined to continue, the routine returns to block 410, and otherwise continues to block 499 and ends.

Figure 5A:
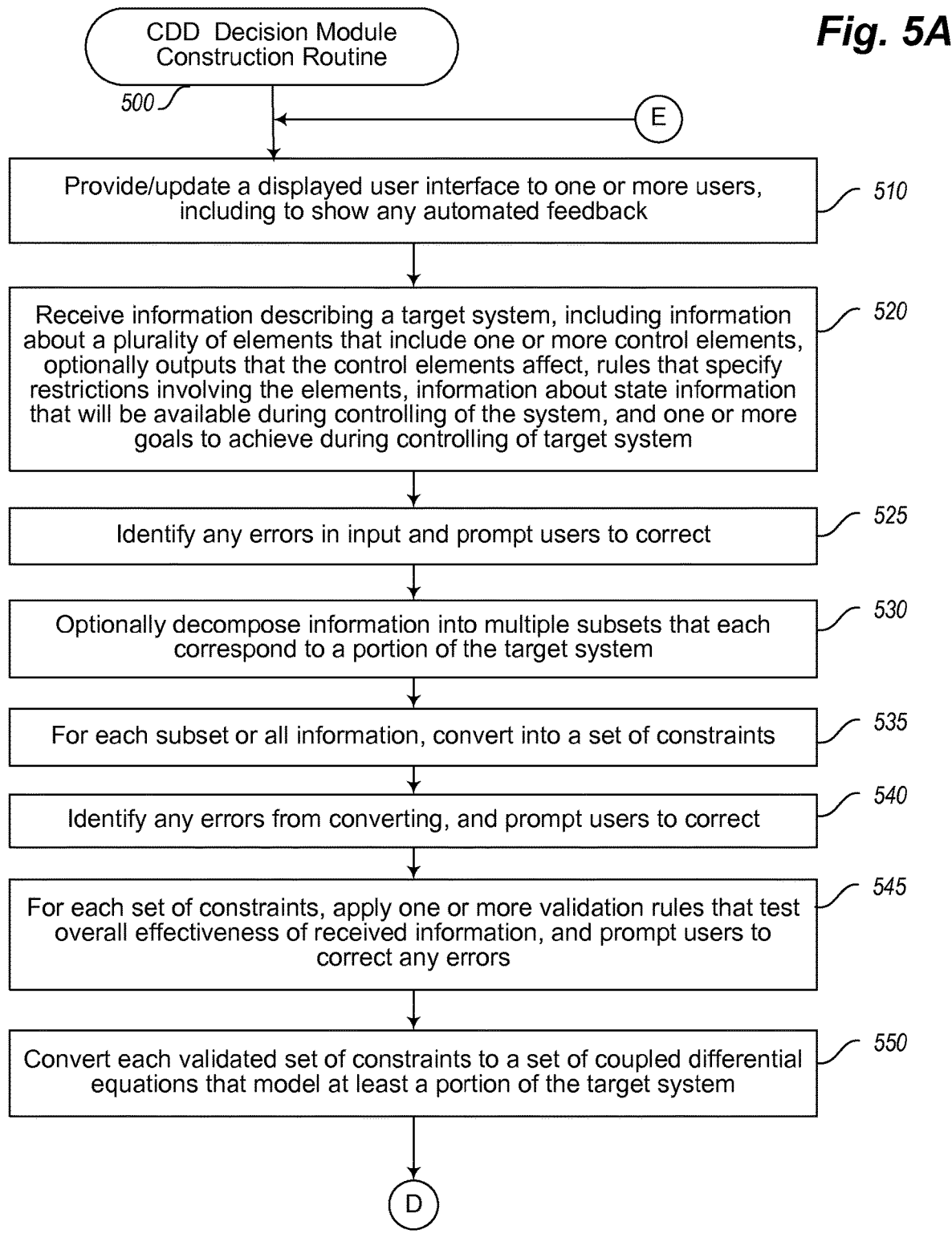
FIGS. 5A-5B illustrate a flow diagram of an example embodiment of a CDD Decision Module Construction routine.
Figure 5B:
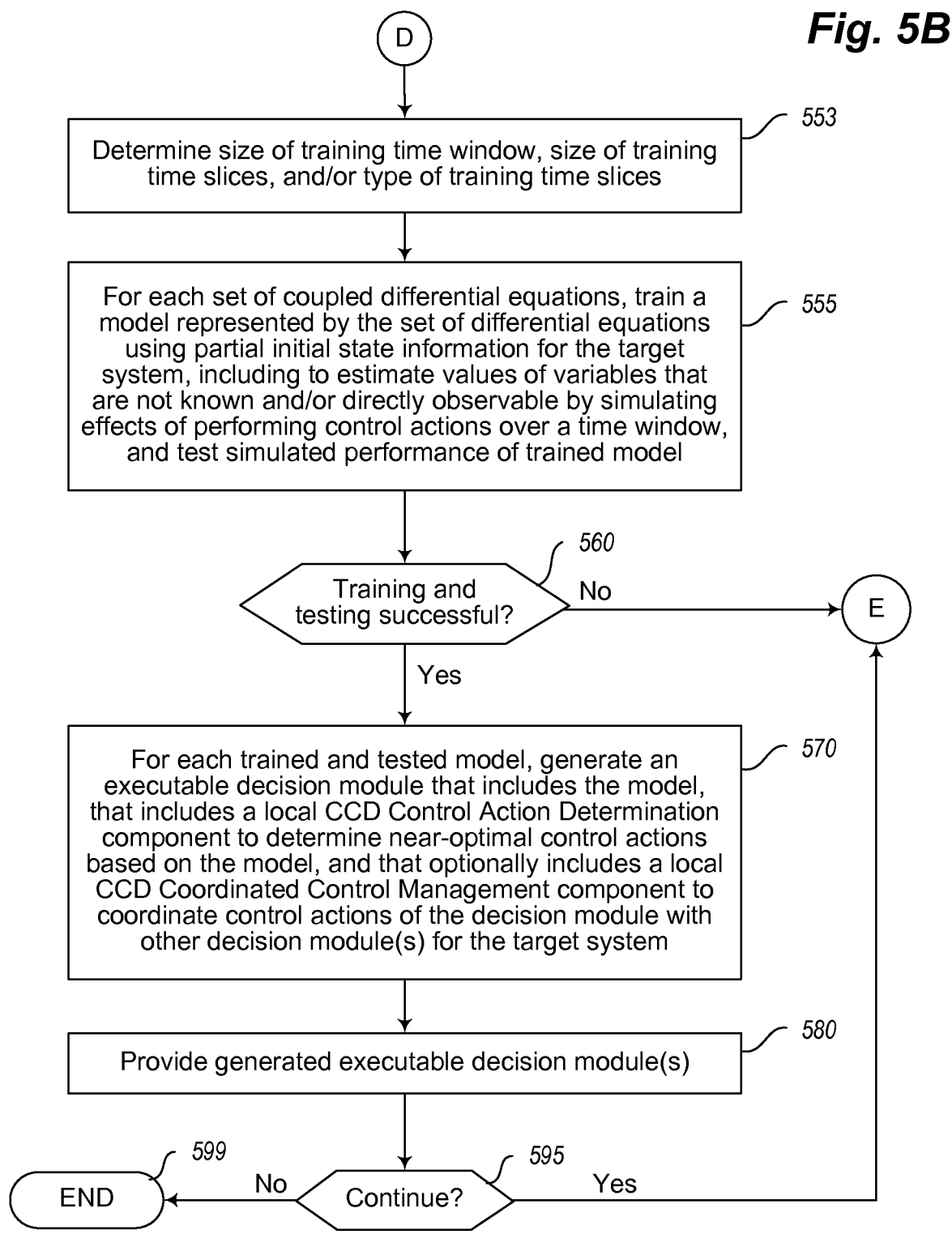

FIGS. 5A-5B illustrate a flow diagram of an example embodiment of a CDD Decision Module Construction routine 500. The routine may, for example, be provided by execution of the component 342 of FIG. 3 and/or the component 142 of FIG. 1, such as to provide functionality to allow users to provide information describing a target system of interest, and to perform corresponding automated operations to construct one or more decision modules to use to control the target system in specified manners. While the illustrated embodiment of the routine interacts with users in particular manners, such as via a displayed GUI (graphical user interface), it will be appreciated that other embodiments of the routine may interact with users in other manners, such as via a defined API (application programming interface) that an executing program invokes on behalf of a user. In some embodiments, the routine may further be implemented as part of an integrated development environment or other software tool that is available for one or more users to use, such as by implementing an online interface that is available to a variety of remote users over a public network such as the Internet, while in other embodiments a copy of the CDD system and/or particular CDD components may be used to support a single organization or other group of one or more users, such as by being executed on computing systems under the control of the organization or group. In addition, the CDD Decision Module Construction component may in some embodiments and situations be separated into multiple sub-components, such as a rules editor component that users interact with to specify rules and other description information for a target system, and a rules compiler engine that processes the user-specified rules and other information to create one or more corresponding decision modules.

The illustrated embodiment of the routine 500 begins at block 510, where the routine provides or updates a displayed user interface to one or more users, such as via a request received at an online version of component that is implementing the routine, or instead based on the routine being executed by one or more such users on computing systems that they control. While various operations are shown in the illustrated embodiment of the routine as occurring in a serial manner for the purpose of illustration, it will be appreciated that user interactions with such a user interface may occur in an iterative manner and/or over multiple periods of time and/or user sessions, including to update a user interface previously displayed to a user in various manners (e.g., to reflect a user action, to reflect user feedback generated by operation of the routine or from another component, etc.), as discussed further below.

After block 510, the routine continues to block 520 to receive information from one or more such users describing a target system to be controlled, including information about a plurality of elements of the target system that include one or more manipulatable control elements and optionally one or more outputs that the control elements affect, information about rules that specify restrictions involving the elements, information about state information that will be available during controlling of the system (e.g., values of particular elements or other state variables), and one or more goals to achieve during the controlling of the target system. It will be appreciated that such information may be obtained over a period of time from one or more users, including in some embodiments for a first group of one or more users to supply some information related to a target system and for one or more other second groups of users to independently provide other information about the target system, such as to reflect different areas of expertise of the different users and/or different parts of the target system.

After block 520, the routine continues to block 525 to identify any errors that have been received in the user input, and to prompt the user(s) to correct those errors, such as by updating the display in a corresponding manner as discussed with respect to block 510. While the identification of such errors is illustrated as occurring after the receiving of the information in block 520, it will be appreciated that some or all such errors may instead be identified as the users are inputting information into the user interface, such as to identify syntax errors in rules or other information that the users specify. After block 525, the illustrated embodiment of the routine continues to block 530 to optionally decompose the information about the target system into multiple subsets that each correspond to a portion of the target system, such as with each subset having one or more different control elements that are manipulatable by the automated control system being created by the routine, and optionally have overlapping or completely distinct goals and/or sets of rules and other information describing the respective portions of the target system. As discussed in greater detail elsewhere, such decomposition, if performed, may in some situations be performed manually by the users indicating different sub-groups of information that they enter, and/or in an automated manner by the routine based on an analysis of the information that has been specified (e.g., based on the size of rules and other descriptive information supplied for a target system, based on inter-relationships between different rules or goals or other information, etc.). In other embodiments, no such decomposition may be performed.

After block 530, the routine continues to block 535 to, for each subset of target system description information (or for all the received information if no such subsets are identified), convert that subset (or all the information) into a set of constraints that encapsulate the restrictions, goals, and other specified information for that subset (or for all the information). In block 540, the routine then identifies any errors that occur from the converting process, and if any are identified, may prompt the user to correct those errors, such as in a manner similar to that described with respect to blocks 525 and 510. While not illustrated in this example, the routine may in some situations in blocks 525 and/or 540 return to block 510 when such errors are identified, to display corresponding feedback to the user(s) and to allow the user(s) to make corrections and re-perform following operations such as those of blocks 520-540. The errors identified in the converting process in block 540 may include, for example, errors related to inconsistent restrictions, such as if the restrictions as a group are impossible to satisfy.

After block 540, the routine continues to block 545 to, for each set of constraints (or a single constraint set if no subsets were identified in block 530), apply one or more validation rules to the set of constraints to test overall effectiveness of the corresponding information that the constraints represent, and to prompt the one or more users to correct any errors that are identified in a manner similar to that with respect to blocks 525, 540 and 510. Such validation rules may test one or more of controllability, observability, stability, and goal completeness, as well as any user-added validation rules, as discussed in greater detail elsewhere. In block 550, the routine then converts each validated set of constraints to a set of coupled differential equations that model at least a portion of the target system to which the underlying information corresponds.

After block 550, the routine continues to block 553 to perform activities related to training a model for each set of coupled differential equations, including to determine one or more of a size of a training time window to use, size of multiple training time slices within the time window, and/or a type of training time slice within the time window. In some embodiments and situations, the determination of one or more such sizes or types of information is performed by using default or pre-specified information, while in other embodiments and situations the users may specify such information, or an automated determination of such information may be performed in one or more manners (e.g., by testing different sizes and evaluating results to find sizes with the best performance). Different types of time slices may include, for example, successions of time slices that overlap or do not overlap, such that the training for a second time slice may be dependent only on results of a first time slice (if they do not overlap) or instead may be based at least in part on updating information already determined for at least some of the first time slice (if they do overlap in part or in whole). After block 553, the routine continues to block 555 to, for each set of coupled differential equations representing a model, train the model for that set of coupled differential equations using partial initial state information for the target system, including to estimate values of variable that are not known and/or directly observable for the target system by simulating effects of performing control actions over the time window, such as for successive time slices throughout the time window, and to test the simulated performance of the trained model. Additional details related to training and testing are included elsewhere herein.

After block 555, the routine continues to block 560 to determine whether the training and testing was successful, and if not returns to block 510 to display corresponding feedback information to the users to allow them to correct errors that caused the lack of success. If it is instead determined in block 560 that the testing and training were successful, however, the routine continues instead to block 570 to generate an executable decision module for each trained and tested model that includes that model, as well as a local CCD Control Action Determination component that the decision module will use when executed to determine optimal or near-optimal control actions to perform for the target system based on the information included in the model, and in light of the one or more goals for that decision module. The generated executable decision module may in some embodiments and situations further include a local CCD Coordinated Control Management component to coordinate control actions of multiple decision modules that collectively will provide an automated control system for the target system, such as by synchronizing respective models of the various decision modules over time. After block 570, the routine continues to block 580 to provide the generated executable decision modules for use, including to optionally store them for later execution and/or deployment.

After block 580, the routine continues to block 595 to determine whether to continue, such as until an explicit indication to terminate is received. If it is determined to continue, the routine returns to block 510, and otherwise continues to block 599 and ends.

Figure 6A:
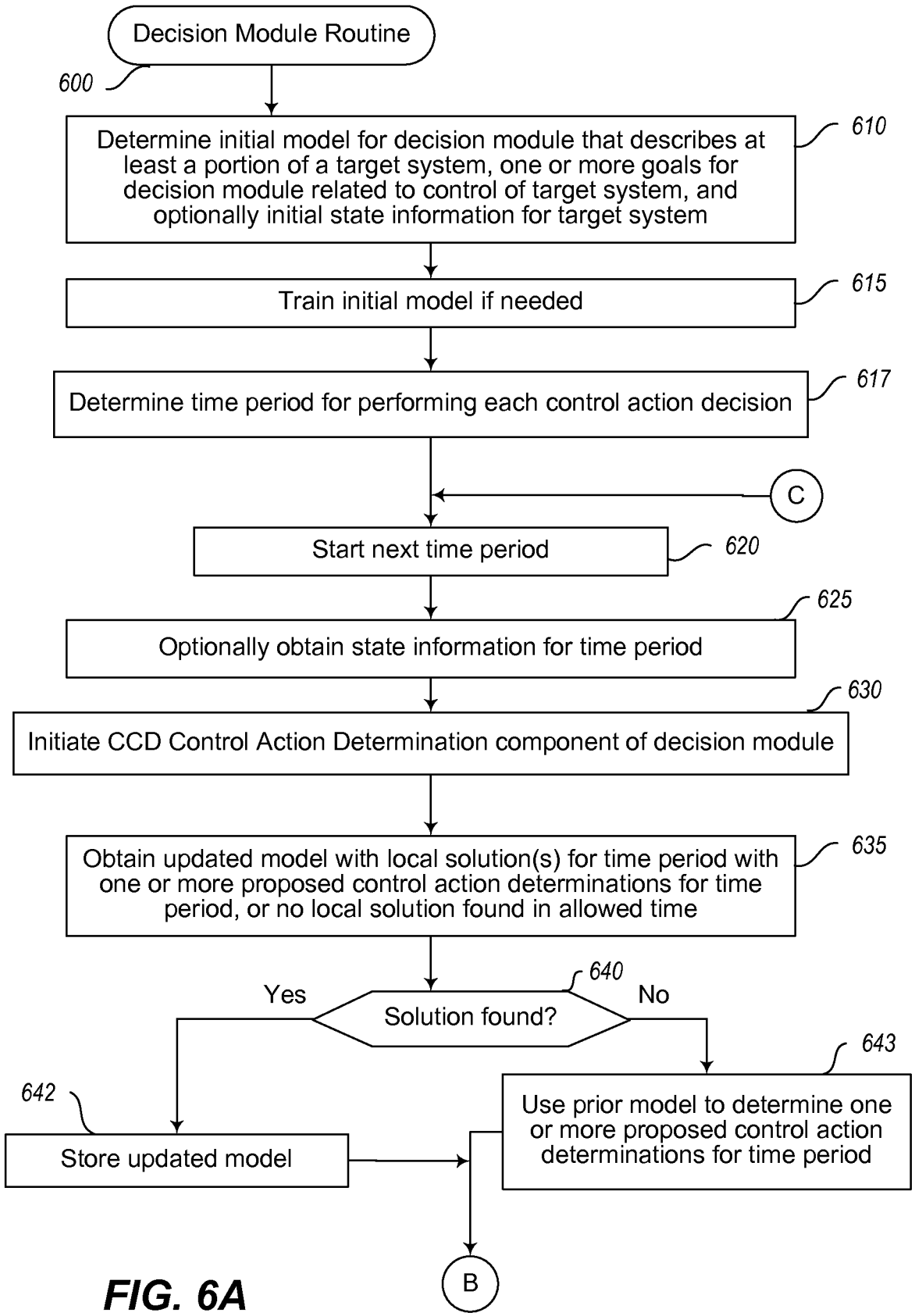
FIGS. 6A-6B illustrate a flow diagram of an example embodiment of a decision module routine.
Figure 6B:
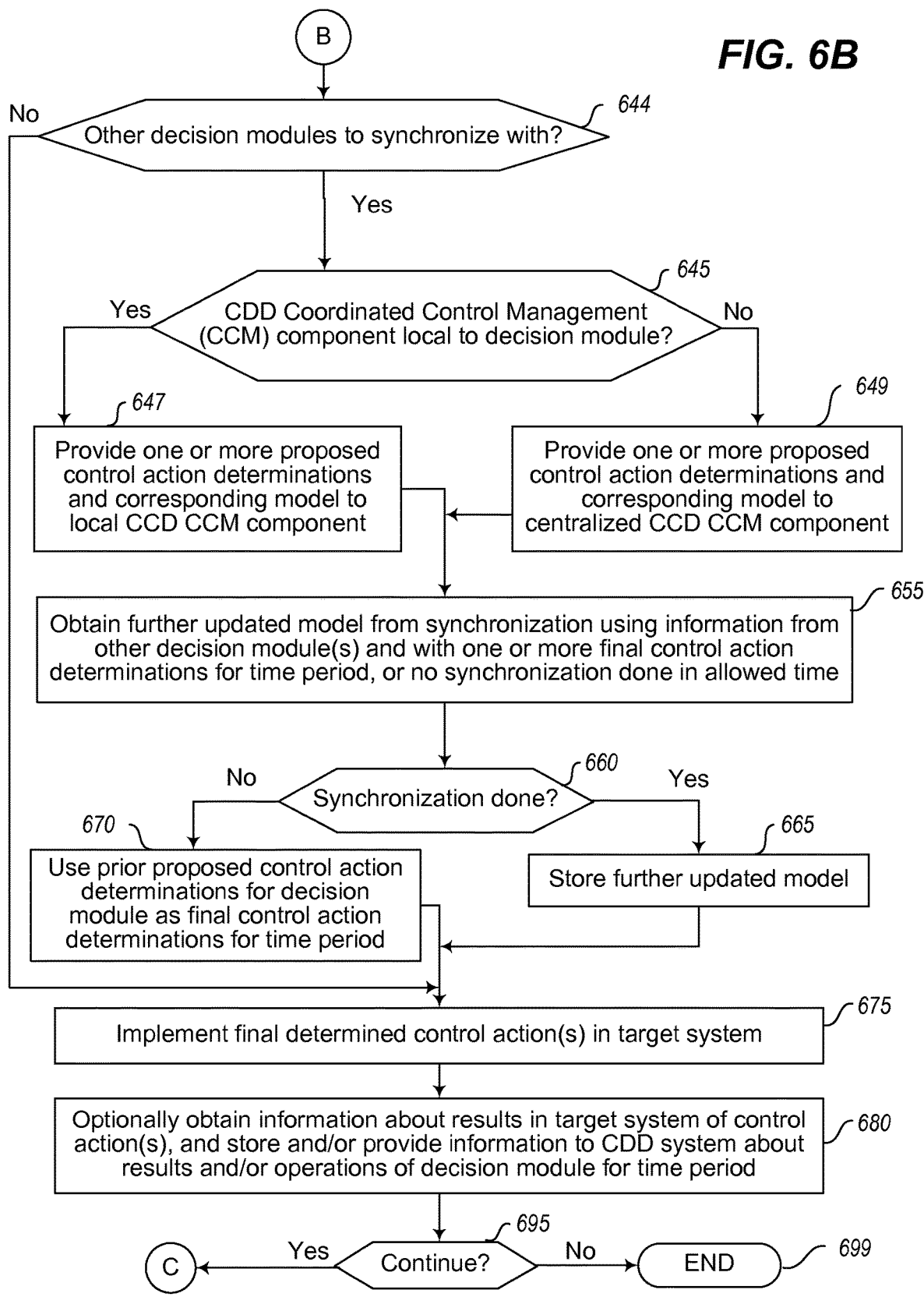

FIGS. 6A-6B illustrate a flow diagram of an example embodiment of a routine 600 corresponding to a generic representation of a decision module that is being executed. The routine may, for example, be provided by execution of a decision module 329 or as part of an automated control system 325 of FIG. 3 and/or a decision module 124 or 128 of FIG. 1 or 2, such as to provide functionality for controlling at least a portion of a target system in a manner specific to information and a model encoded for the decision module, including to reflect one or more goals to be achieved by the decision module during its controlling activities. As discussed in greater detail elsewhere, in some embodiments and situations, multiple decision modules may collectively and cooperatively act to control a particular target system, such as with each decision module controlling one or more distinct control elements for the target system or otherwise representing or interacting with a portion of the target system, while in other embodiments and situations a single decision module may act alone to control a target system. The routine 600 further reflects actions performed by a particular example decision module when it is deployed in controlling a portion of a target system, although execution of at least portions of a decision module may occur at other times, such as initially to train a model for the decision module before the decision module is deployed, as discussed in greater detail with respect to the CDD Decision Module Construction routine 500 of FIGS. 5A-5B.

The illustrated embodiment of the routine 600 begins at block 610, where an initial model for the decision module is determined that describes at least a portion of a target system to be controlled, one or more goals for the decision module to attempt to achieve related to control of the target system, and optionally initial state information for the target system. The routine continues to block 615 to perform one or more actions to train the initial model if needed, as discussed in greater detail with respect to blocks 553 and 555 of FIGS. 5A-5B—in some embodiments and situations, such training for block 615 is performed only if initial training is not done by the routine 500 of FIGS. 5A-5B, while in other embodiments and situations the training of block 615 is performed to capture information about a current state of the target system at a time that the decision module begins to execute (e.g., if not immediately deployed after initial creation and training) and/or to re-train the model at times as discussed in greater detail with respect to routine 700 of FIGS. 7A-7B as initiated by block 630.

After block 615, the routine continues to block 617 to determine a time period to use for performing each control action decision for the decision module, such as to reflect a rate at which control element modifications in the target system are needed and/or to reflect a rate at which new incoming state information is received that may alter future manipulations of the control elements. The routine then continues to block 620 to start the next time period, beginning with a first time period moving forward from the startup of the execution of the decision module. Blocks 620-680 are then performed in a loop for each such time period going forward until execution of the decision module is suspended or terminated, although in other embodiments a particular decision module may execute for only a single time period each time that it is executed.

In block 625, the routine optionally obtains state information for the time period, such as current state information that has been received for the target system or one or more related external sources since the last time period began, and/or by actively retrieving current values of one or more elements of the target system or corresponding variables as needed. In block 630, the routine then initiates execution of a local CCD Control Action Determination component of the decision module, with one example of such a routine discussed in greater detail with respect to routine 700 of FIGS. 7A-7B. In block 635, the results of the execution of the component in block 630 are received, including to either obtain an updated model for the decision module with a local solution for the current time period and decision module that includes one or more proposed control action determinations that the decision module may perform for the current time period, or to receive an indication that no local solution was found for the decision module in the allowed time for the execution of the component in block 630. It is then determined in block 640 whether a solution was found, and if so continues to block 642 to store the updated model for the decision module, and otherwise continues to block 643 to use the prior model for the decision module to determine one or more control action determinations that are proposed for the current time period based on a previous model (e.g., that does not reflect recent changes in state information and/or recent changes in activities of other decision modules, if any), as discussed in greater detail with respect to routine 700 of FIGS. 7A-7B.

After blocks 642 or 643, the routine continues to block 644 to determine if other decision modules are collectively controlling portions of the current target system, such as part of the same automated control system as the local decision module, and if so continues to block 645. Otherwise, the routine selects the local proposed control actions of the decision module as a final determined control action to perform, and continues to block 675 to implement those control actions for the current time period.

If there are other operating decision modules, the routine in block 645 determines if the local decision module includes a local copy of a CDD Coordinated Control Management (CCM) component for use in synchronizing the proposed control action determinations for the decision module's local solutions with activities of other decision modules that are collectively controlling the same target system. If so, the routine continues to block 647 to provide the one or more proposed control action determinations of the decision module and the corresponding current local model for the decision module to the local CDD CCM component, and otherwise continues to block 649 to provide the one or more proposed control action determinations for the decision module and the corresponding local model of the decision module to one or more centralized CDD CCM components.

After blocks 647 or 649, the routine continues to block 655 to obtain results of the actions of the CDD CCM component(s) in blocks 647 or 649, including to either obtain a further updated model resulting from synchronization of the local model for the current decision module with information from one or more other decision modules, such that the further updated model indicates one or more final control action determinations to perform for the time period for the current decision module, or an indication that no such synchronization was completed in the allowed time. The routine continues to block 660 to determine whether the synchronization was completed, and if so continues to block 665 to store the further updated model from the synchronization, and otherwise continues to block 670 to use the prior proposed control action determinations locally to the decision module as the final control action determinations for the time period.

After blocks 665 or 670, the routine continues to block 675 to implement the one or more final determined control actions for the decision module in the target system, such as by interacting with one or more effectuators in the target system that modify values or otherwise manipulate one or more control elements of the target system, or by otherwise providing input to the target system to cause such modifications or other manipulations to occur. In block 680, the routine optionally obtains information about the results in the target system of the control actions performed, and stores and/or provides information to the CDD system about such obtained results and/or about the activities of the decision module for the current time period.

After block 680, the routine continues to block 695 to determine whether to continue, such as until an indication to terminate or suspend is received (e.g., to reflect an end to current operation of the target system or an end of use of the decision module to control at least a portion of the target system). If it is determined to continue, the routine returns to block 620 to start the next time period, and otherwise continues to block 699 and ends.

Figure 7A:
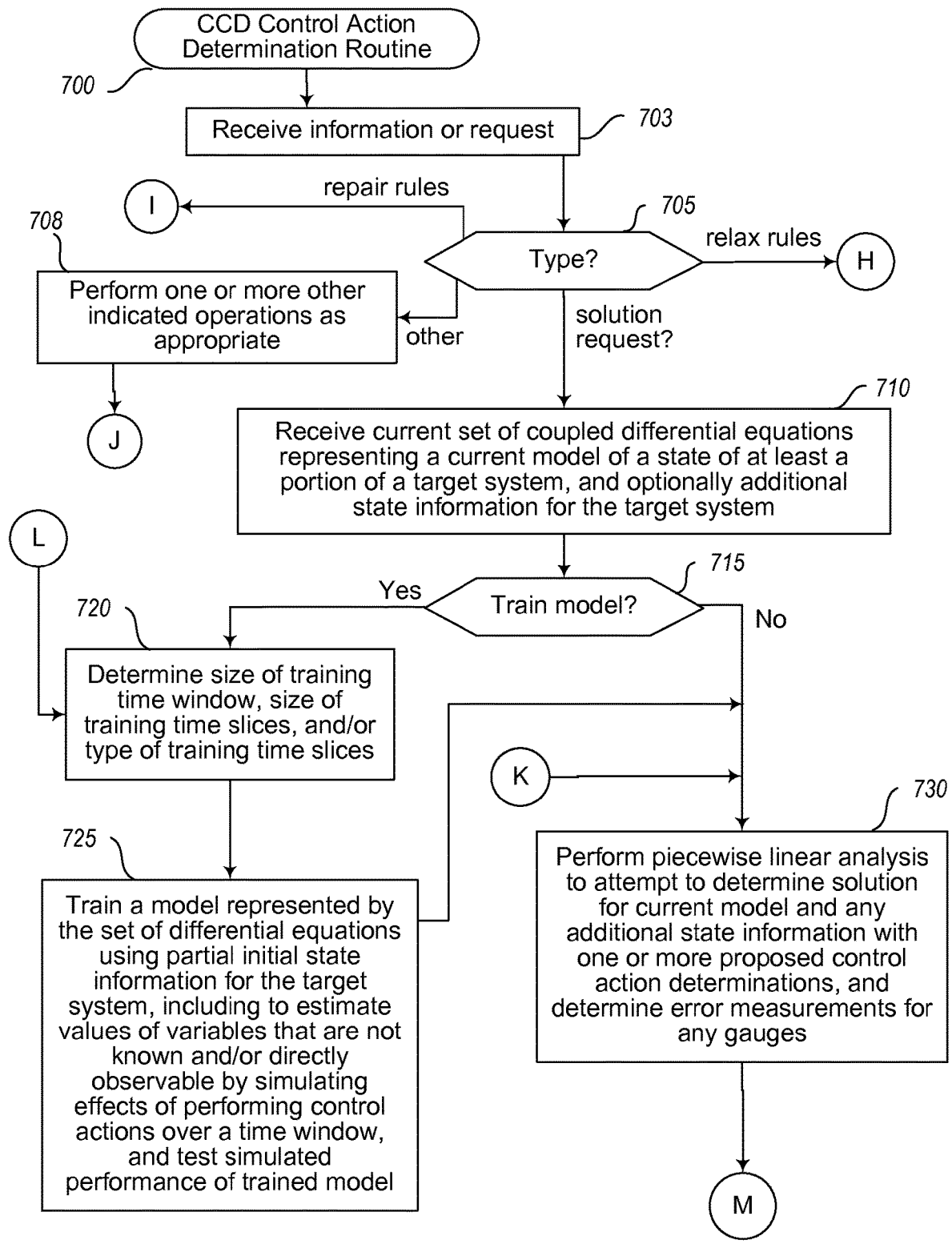
FIGS. 7A-7B illustrate a flow diagram of an example embodiment of a CDD Control Action Determination routine.
Figure 7B:
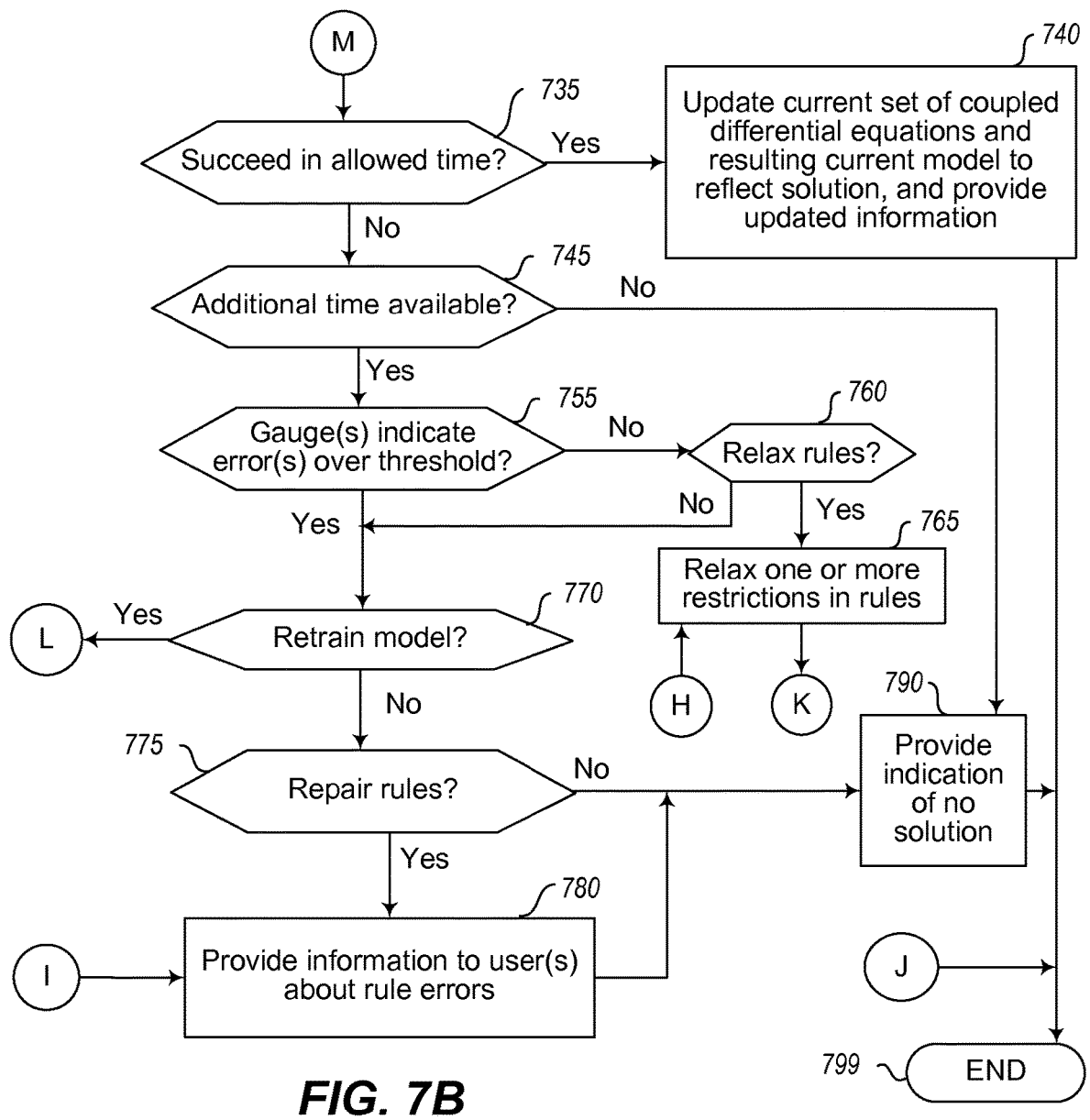

FIGS. 7A-7B are a flow diagram of a example embodiment of a CDD Control Action Determination routine 700. The routine may, for example, be provided by execution of the component 344 of FIG. 3 and/or components 144*a-n* or 244 of FIG. 2, such as to determine control actions for a decision module to propose and/or implement for a target system during a particular time period, including in some embodiments to perform an optimization to determine near-optimal actions (e.g., within a threshold of an optimal solution) to perform with respect to one or more goals if possible. While the illustrated embodiment of the routine is performed in a manner local to a particular decision module, such that some or all decision modules may each implement a local version of such a routine, in other embodiments the routine may be implemented in a centralized manner by one or more components with which one or more decision modules interact over one or more networks, such as with a particular decision module indicated to be used at a particular time rather than acting on behalf of the local decision module.

The illustrated embodiment of the routine 700 begins at block 703, where information or a request is received. The routine continues to block 705 to determine a type of the information or request, and to proceed accordingly. In particular, if a request is received in block 703 to attempt to determine a solution for a current time period given a current model of the local decision module, the routine continues to block 710 to begin to perform such activities, as discussed in greater detail with respect to block 710-790. If it is instead determined in block 705 that a request to relax one or more rules or other restrictions for the current model of the local decision module is received, such as discussed in greater detail with respect to blocks 760 and 765, the routine continues to block 765. If it is determined in block 705 that a request is received to repair one or more rules or other restrictions for the current model of the local decision module, such as discussed in greater detail with respect to blocks 775 and 780, the routine continues to block 780 to obtain user input to use during the rule repair process (e.g., to interact with a CDD Decision Module Construction component, or to instead interact with one or more users in another manner), such as to allow the current model for the local decision module to later be updated and replaced based on further resulting user actions, or if operation of the target system can be suspended, to optionally wait to further perform the routine 700 until such an updated model is received. If it is instead determined in block 705 that the information or request is of another type, the routine continues instead to block 708 to perform one or more other indicated operations as appropriate, and to then proceed to block 799. Such other indicated operations may include, for example, receiving information about current models and/or control actions proposed or performed by one or more other decision modules that are collectively controlling a target system with the local decision module (such as for use in synchronizing the model of the local decision module with such other decision modules by generating a consensus or converged shared model, as discussed in greater detail with respect to routine 800 of FIGS. 8A-8B), to receive updates to a model or underlying information for the model for use in ongoing operation of the routine 700 (e.g., from a CDD Decision Module Construction component, such as results from interactions performed in block 780), to receive current state information for the target system, such as for use as discussed in routine 600 of FIGS. 6A-6B, etc.

If it determined in block 705 that a request for a solution was received in block 703 for a current time period and based on a current model of the local decision module, the routine continues to block 710 to receive a current set of coupled differential equations that represent the current model for the local decision module of at least a portion of the target system, optionally along with additional state information for the target system for the current time. The routine then continues to block 715 to determine whether to train or re-train the model, such as if the routine is called for a first time upon initial execution of a corresponding decision module or if error measurements from ongoing operations indicate a need for re-training, as discussed in greater detail with respect to blocks 755, 770 and 730. If it is determined to train or re-train the model, the routine continues to block 720 to determine one or more of the size of a training time window, size of training time slices within the time window, and/or type of training time slices within the training time window, such as in a manner similar to that previously discussed with respect to block 553 of routine 500 of FIGS. 5A-5B. After block 720, the routine continues to block 725 to use partial initial state information for the target system to train the model, including to estimate values of state variables for the target system that are not known and/or directly observable, by simulating effects of performing control actions over the time window for each of the time slices, as discussed in greater detail with respect to block 555 of routine 500 of FIGS. 5A-5B.

After block 725, or if it is instead determined in block 715 not to train or re-train the model, the routine continues to block 730 to perform a piecewise linear analysis to attempt to determine a solution for the current model and any additional state information that was obtained in block 710, with the solution (if determined) including one or more proposed control action determinations for the local decision module to take for a current time period, as well as in some embodiments to use one or more model error gauges to make one or more error measurements with respect to the current model, as discussed in greater detail elsewhere. The routine then continues to block 735 to determine if the operations in block 730 determined a solution within a amount of time allowed for the operation of block 730 (e.g., a defined subset or fraction of the current time period), and if so continues to block 740 to update the current set of coupled differential equations and the resulting current model for the local decision module to reflect the solution, with the resulting updated information provided as an output of the routine 700.

If it is instead determined in block 735 that the operations in block 730 did not determine a solution, the routine continues to block 745 to determine if additional time is available within the current time period for further attempts to determine a solution, and if not continues to block 790 to provide output of the routine 700 indicating that no solution was determined for the current time period.

If additional time is available within the current time period, however, the routine continues to perform blocks 755-780 to perform one or more further attempts to identify the solution—it will be appreciated that one or more of the operations of blocks 755-780 may be repeatedly performed multiple times for a given time period if sufficient time is available to continue further solution determination attempts. In particular, the routine continues to block 755 if additional time is determined to be available in block 745, where it determines whether the measurements from one or more gauges indicate model error measurements that are over one or more thresholds indicating modifications to the model are needed, such as based on the model error measurements from the gauges discussed with respect to block 730. If not, the routine continues to block 760 to determine whether there are one or more rules or other restrictions in the current model that are available to be relaxed for the current time period (that have not previously attempted to be relaxed during the time period, if this is not the first pass through this portion of the routing for the current time period), and if so continues to block 765 to relax one or more such rules or other restrictions and to return to block 730 to re-attempt the piecewise linear analysis with the revised model based on those relaxed rules or other restrictions.

If it is instead determined in block 755 that the model error measurements from one or more of the gauges are sufficient to satisfy one or more corresponding thresholds, the routine continues instead to block 770 to determine whether to re-train the model based on one or more of the gauges indicating sufficient errors to do so, such as based on accumulated errors over one or more time periods of updates to the model. If so, the routine returns to block 720 to perform such re-training in blocks 720 and 725, and then continues to block 730 to re-attempt the piecewise linear analysis with the resulting re-trained model.

If it is instead determined in block 770 not to re-train the model (or if the model was re-trained already for the current time period and the resulting re-attempt in block 730 again failed to find a solution), the routine continues to block 775 to determine whether the model error measurements from one or more of the gauges indicate a subset of one or more rules or other restrictions in the model that potentially have errors that need to be repaired. If so, the routine continues to block 780 to provide information to one or more users via the CDD Decision Module Construction component, to allow the users to revise the rules or other restrictions as appropriate, although in other embodiments some or all such rule repair activities may instead be attempted or performed in an automated manner. After block 780, or if it is instead determined in block 775 not to repair any rules, the routine continues to block 790 to provide an indication that no solution was determined for the current time period. After blocks 740, 708, or 790, the routine continues to block 799 and ends. It will be appreciated that if the routine 700 was instead implemented as a centralized routine that supports one or more decision modules remote from the executing component for the routine, the routine 700 may instead return to block 703 to await further information or requests.

Figure 8A:
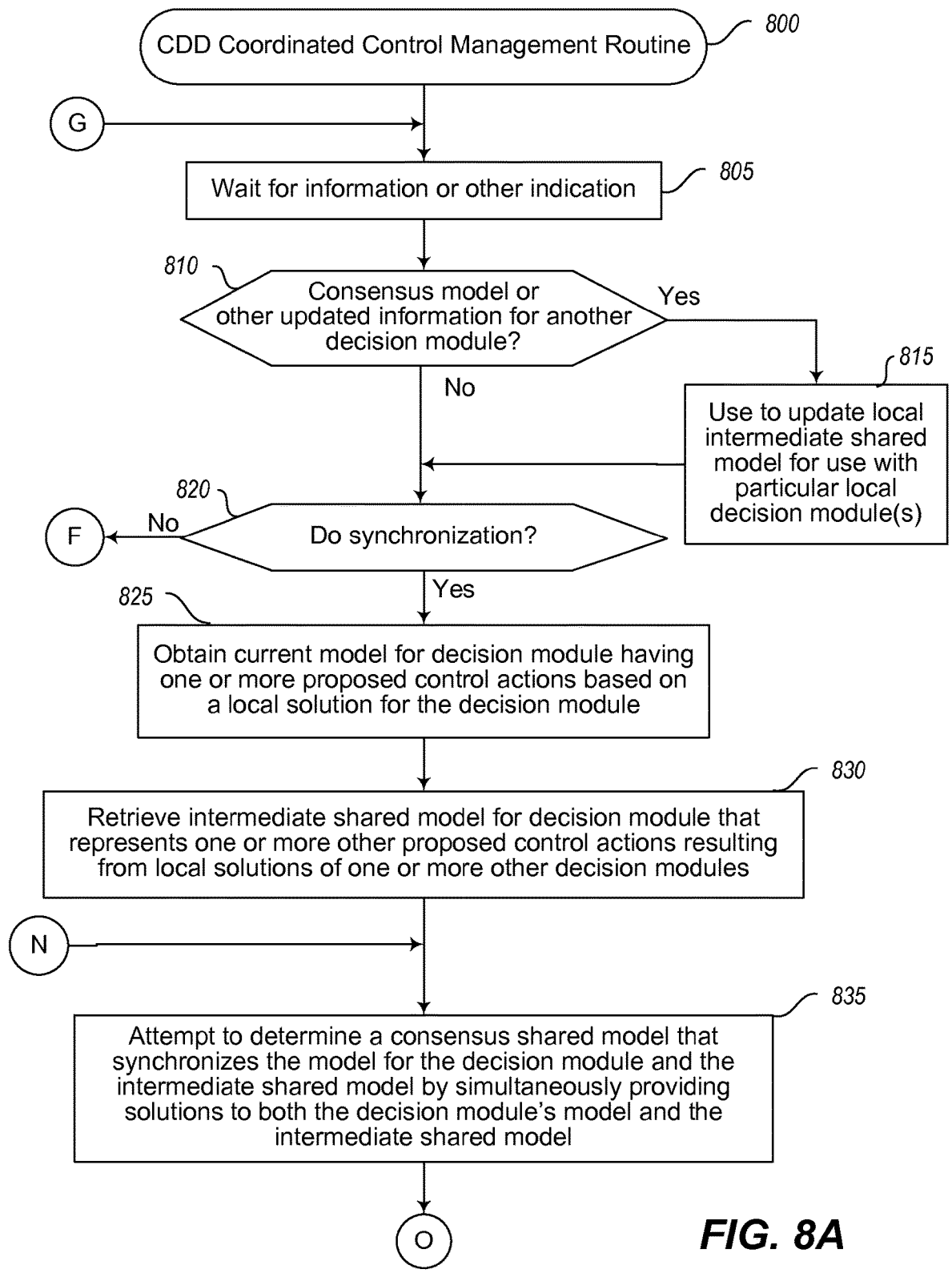
FIGS. 8A-8B illustrate a flow diagram of an example embodiment of a CDD Coordinated Control Management routine.
Figure 8B:
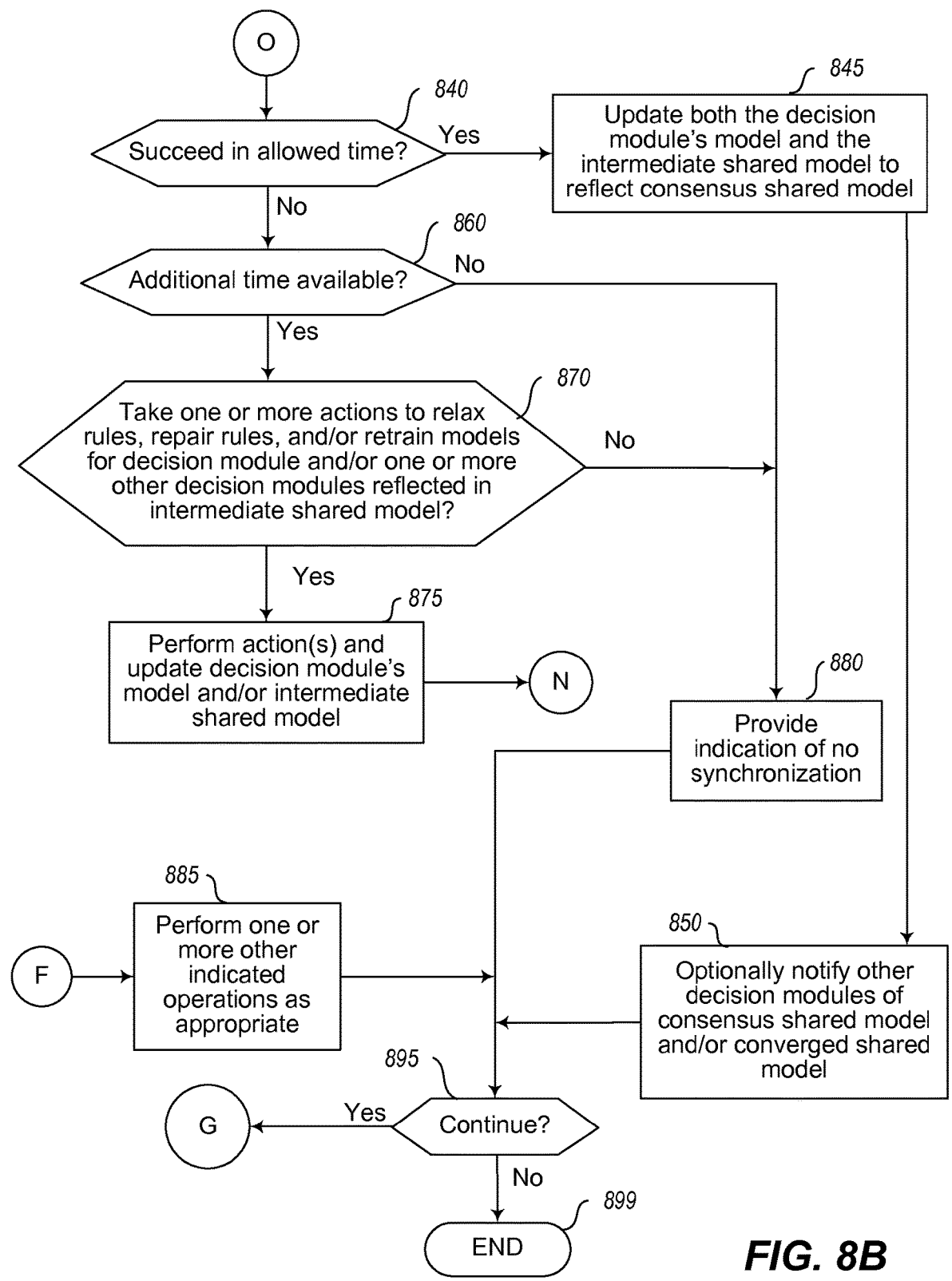

FIGS. 8A-8B are a flow diagram of an example embodiment of a CDD Coordinated Control Management routine 800. The routine may, for example, be provided by execution of the component 346 of FIG. 3 and/or the components 146a-n of FIG. 2, such as to attempt to synchronize current models and their proposed control actions between multiple decision modules that are collectively controlling a target system. In the illustrated embodiment of the routine, the synchronization is performed in a pairwise manner between a particular local decision module's local current model and an intermediate shared model for that decision module that is based on information about the current state of one or more other decision modules, by using a Pareto game technique to determine a Pareto equilibrium if possible that is represented in a consensus shared model, although in other embodiments other types of synchronization methods may be used. In addition, in the illustrated embodiment, the routine 800 is performed in a local manner for a particular local decision module, such as by being included within that local decision module, although in other embodiments the routine 800 may be implemented in a centralized manner to support one or more decision modules that are remote from a computing system implementing the component for the routine and that communicate with those decision modules over one or more computer networks, such as with a particular decision module indicated to be used at a particular time rather than acting on behalf of the local decision module.

The illustrated embodiment of the routine 800 begins at block 805, where it waits to receive information or another indication. The routine continues to block 810 to determine if a consensus model or other updated information for another decision module has been received, such as from a copy of the routine 800 executing for that other decision module, and if so continues to block 815 to use the received information to update local intermediate shared model information for use with the local decision module on whose behalf the current copy of the routine 800 is executing, as discussed in greater detail with respect to block 830. If it is instead determined in block 810 that the information or request received in block 805 is not information related to one or more other decision modules, or after block 815, the routine continues to block 820 to determine whether to currently perform a synchronization for the current local model of the local decision module by using information about an intermediate shared model of the local decision module that includes information for one or more other decision modules, such as to do such synchronization each time that an update to the local decision module's model is received (e.g., based on operation of the routine 700 for a copy of the CDD Control Action Determination component local to that decision module) in block 805 and/or each time that information to update the local decision module's intermediate shared model is received in block 805 and used in block 815, or instead as explicitly indicated in block 805—if the synchronization is to currently be performed, the routine continues to block 825 and begins to perform blocks 820-880 related to such synchronization activities. Otherwise, the routine continues to block 885 to perform one or more other indicated operations as appropriate, such as to receive requests from the CDD system or other requestor for current information about operation of the routine 800 and/or to provide corresponding information to one or more entities (e.g., to reflect prior requests), etc.

If it is determined in block 820 that synchronization is to be currently performed, such as based on updated model-related information that is received in block 805, the routine continues to block 825 to obtain a current local model for the local decision module to use in the synchronizing, with the model including one or more proposed control actions to perform for a current time period based on a local solution for the local decision module. The routine then continues to block 830 to retrieve information for an intermediate shared model of the local decision module that represents information for one or more other decision modules (e.g., all other decision modules) that are collectively participating in controlling the target system, with that intermediate shared model similarly representing one or more other proposed control actions resulting from local solutions of those one or more other decision modules, optionally after partial or complete synchronization has been performed for those one or more other decision modules between themselves.

The routine then continues to block 835 to attempt to determine a consensus shared model that synchronizes the current model of the local decision module and the intermediate shared model by simultaneously providing solutions to both the local decision module's current model and the intermediate shared model. In some embodiments, the operations of block 835 are performed in a manner similar to that discussed with respect to blocks 710-730 of routine 700 of FIG. 7A-7B, such as if the local model and the intermediate shared model are combined to create a combination model for whom one or more solutions are to be identified. As discussed in greater detail elsewhere, in some embodiments, the local current model and intermediate shared model may each be represented by a Hamiltonian function to enable a straightforward creation of such a combined model in an additive manner for the respective Hamiltonian functions, with the operations of routines 600 and/or 700 of FIGS. 6A-6B and 7A-7B, respectively, similarly representing the models that they update and otherwise manipulate using such Hamiltonian functions.

After block 835, the routine continues to block 840 to determine whether the operations of block 835 succeeded in an allowed amount of time, such as a fraction or other portion of the current time period for which the synchronization is attempted to be performed, and if so the routine continues to block 845 to update both the local model and the intermediate shared model of the local decision module to reflect the consensus shared model. As earlier noted, if sufficient time is allowed for each decision module to repeatedly determine a consensus shared model with changing intermediate shared models representing one or more other decision modules of a collective group, the decision modules of the collective group may eventually converge on a single converged shared model, although in other embodiments and situations there may not be sufficient time for such convergence to occur, or other issues may prevent such convergence. After block 845, the routine continues to block 850 to optionally notify other decision modules of the consensus shared model determined for the local decision module (and/or of a converged shared model, if the operations of 835 were a last step in creating such a converged shared model), such as if each of the notified decision modules is implementing its own local version of the routine 800 and the provided information will be used as part of an intermediate shared model of those other decision modules that includes information from the current local decision module's newly constructed consensus shared model.

If it is instead determined in block 840 that a synchronization did not occur in the allowed time, the routine continues to perform blocks 860-875 to re-attempt the synchronization with one or more modifications, sometimes repeatedly if sufficient time is available, and in a manner similar to that discussed with respect to blocks 745-780 of routine 700 of FIGS. 7A-7B. In the illustrated example, the routine determines in block 860 if additional time is available for one or more such re-attempts at synchronization, and if not the routine continues to block 880 to provide an indication that no synchronization was performed within the allowed time. Otherwise, the routine continues to block 870 to take one or more actions to perform one or more of relaxing rules or other restrictions, repairing rules or other restrictions, and/or re-training a model, with respect to one or both of the current model of the local decision module and/or one or more other decision modules whose information is represented in the intermediate shared model of the local decision module. If it is determined in block 870 to proceed in this manner, the routine continues to block 875 to perform corresponding actions, sometimes one at a time in a manner similar to that discussed with respect to routine 700, including to cause resulting updates to the current model of the local decision module and/or to the local intermediate shared model of the local decision module, after which the routine returns to block 835 to re-attempt to synchronize the local model and the intermediate shared model of the local decision module.

If it is instead determined in block 870 that no further actions are to be performed with respect to relaxation, repair and/or re-training, the routine continues instead to block 880. After blocks 850, 880 or 885, the routine continues to block 895 to determine whether to continue, such as until an explicit indication to terminate or suspend operation of the routine 800 is received, such as to reflect an end to operation of the target system and/or an end to use of the local decision module and/or a collective group of multiple decision modules to control the target system. If it is determined to continue, the routine returns to block 805, and otherwise continues to block 899 and ends.

Figure 9:
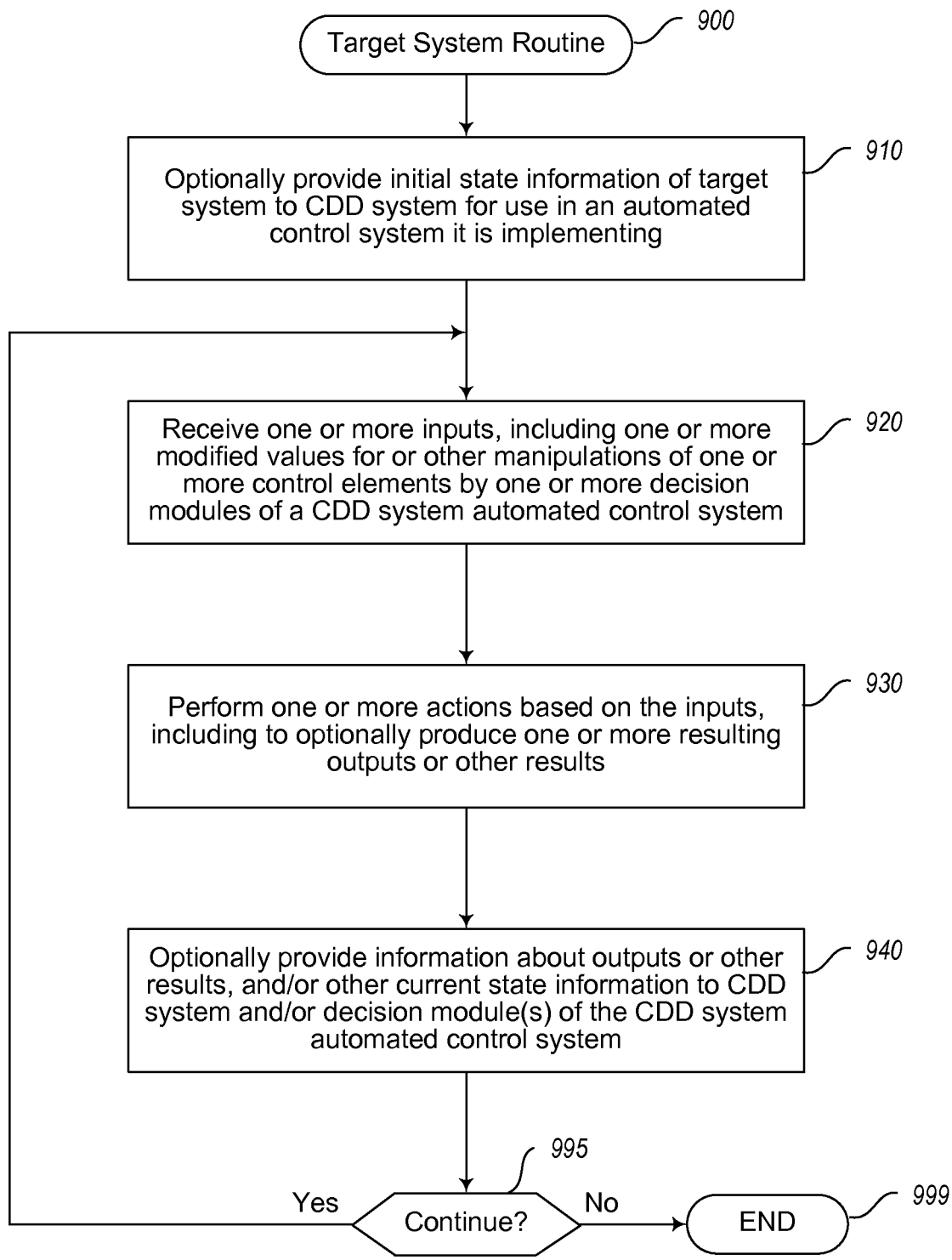
FIG. 9 illustrates a flow diagram of an example embodiment of a routine for a target system being controlled.

FIG. 9 illustrates a flow diagram of an example embodiment of a routine 900 performed for a representative generic target system, with respect to interactions between the target system and one or more decision modules that are controlling at least a portion of the target system. The routine may, for example, be provided by execution of a target system 360 and/or 370 of FIG. 3, and/or a target system 160 and/or 170 of FIGS. 1 and 2, such as to implement operations specific to the target system. It will be appreciated that the illustrated embodiment of the routine focuses on interactions of the target system with the one or more decision modules, and that many or all such target systems will perform many other operations in a manner specific to those target systems that are not illustrated here for the purpose of brevity.

The routine begins at block 910, where it optionally provides initial state information for the target system to a CDD system for use in an automated control system of the CDD system for the target system, such as in response to a request from the CDD system or its automated control system for the target system, or instead based on configuration specific to the target system (e.g., to be performed upon startup of the target system). After block 910, the routine continues to block 920 to receive one or more inputs from a collective group of one or more decision modules that implement the automated control system for the target system, including one or more modified values for or other manipulations of one or more control elements of a plurality of elements of the target system that are performed by one or more such decision modules of the automated control system. As discussed in greater detail elsewhere, the blocks 920, 930, 940 may be repeatedly performed for each of multiple time periods, which may vary greatly in time depending on the target system (e.g., a microsecond, a millisecond, a hundredth of a second, a tenth of a second, a second, 2 seconds, 5 seconds, 10 seconds, 15 seconds, 30 seconds, a minute, 5 minutes, 10 minutes, 15 minutes, 30 minutes, an hour, etc.).

After block 920, the routine continues to block 930 to perform one or more actions in the target system based on the inputs received, including to optionally produce one or more resulting outputs or other results within the target system based on the manipulations of the control elements. In block 940, the routine then optionally provides information about the outputs or other results within the target system and/or provides other current state information for the target system to the automated control system of the CDD system and/or to particular decision modules of the automated control system. The routine then continues to block 995 to determine whether to continue, such as until an explicit indication to terminate or suspend operation of the target system is received. If it is determined to continue, the routine returns to block 920 to begin a next set of control actions for a next time period, and otherwise continues to block 999 and ends. As discussed in greater detail elsewhere, state information that is provided to a particular decision module may include requests from external systems to the target system, which the automated control system and its decision modules may determine how to respond to in one or more manners.

The following sections describe a variety of specific, non-exclusive embodiments in which some or all of the described techniques may be implemented. It will be appreciated that particular details of particular embodiments may not be included in or true for all embodiments, and that the described embodiments may be implemented individually or in combination with any and all other combinations of other embodiments.

The following discusses several non-exclusive example embodiment, in which one or more specified embodiments of the Collaborative Distributed Decision system are each referred to as a Collaborative Distributed Inferencing (CDI) system or a Cooperative Distributed Inferencing Platform (CDIP), in which one or more specified embodiments of the Decision Module Construction component are each referred to as the "Rules Builder" or including or being performed by a "Rule Conversion Engine" (RCE) or a "CDL Compiler" or a "Rule(s) Entry Interface" (REI) or a "Rules and Goals UI", in which one or more specified embodiments of the Control Action Determination component are each referred to as having "chattering" subcomponents or performing "chattering" functionality or including or being performed by a "Query Response Engine" (QRE) or an "Optimization Element" or via "Hamiltonian-Chattering Control", in which one or more specified embodiments of the Coordinated Control Management component are each referred to as having or performing "mean field" information or functionality or including or being performed by a "Tellegen" agent or a "Pareto Multi-Criteria Optimization Engine" (PMOE) or a "Pareto element", in which decision modules are referred to as "agents" or "peer agents" or "agent nodes" or "decision elements", in which an automated control system may include a "cluster" of agents and in some cases is referred to as a "distributed architecture", in which a target system is referred to as an "application domain", in which a decision module's stored information about a target system includes an "Internal Heterogeneous Database" (IHDB) and/or a "Domain Rules Knowledge Base", in which a decision module's consensus shared model is referred to as an "internal optimum" generated using mean field information, in which changes propagated from one decision module to others is referred to as a "delta", etc.

Further details related to an example CDI system are shown below and included in provisional U.S. Patent Application No. 62/015,018, filed Jun. 20, 2014 and entitled "Methods And Systems For Cooperative Distributed Inferencing," which is hereby incorporated by reference in its entirety. In addition, further details related to example details of using gauges to perform model error measurements are included in provisional U.S. Patent Application No. 62/182,796, filed Jun. 22, 2015 and entitled "Gauge Systems," which is also hereby incorporated by reference in its entirety. Furthermore, further details related to examples of using the CDD system in particular manners with particular types of target systems are included in provisional U.S. Patent Application No. 62/182,968, filed Jun. 22, 2015 and entitled "Applications Of Cooperative Distributed Control Of Target Systems," which is also hereby incorporated by reference in its entirety—the example types of target systems discussed include, for example, a vehicle being controlled, controlling inventory management, controlling a micro-grid electrical generation facility, controlling activities in a day trader financial setting, etc.

| Current notation | Comments |
| --- | --- |
| t | Notation for algorithmic time. |
| q(t) | Notation of canonical coordinate vector for entire system. |
| q | Notation of canonical coordinate vector dropping time dimension. |
| $q^{(f)}$ | Notation of canonical coordinate vector for specific function $f$. |
| $\dot{q}$ | Notation of first time derivative of canonical coordinate vector. |
| $\ddot{q}$ | Notation of second time derivative of canonical coordinate vector. |
| h | Notation of HEAD of Horn clause. |
| $\varphi(q)$ | Notation of generic proposition. |
| $\sigma(q)$ | Notation of generic proposition alternate to $\varphi$. |
| $T_i$ | Notation of the TV of a soft rule. |
| $\check{r}(q; \varphi, \sigma)$ | Generic equational form relating two propositions. |
| $\varphi(q)$ | Notation of the equational form of $\varphi(q)$. |
| $\varphi_Q(q)$ | Notation for proposition defined by the query. |
| $\varphi_Q(q)$ | Notation for equation defined by the query. |
| J(q) | Notation for minimization function for the query. |
| $\mathcal{L}$ | Notation for static Lagrangian |
| $\mathcal{L}_k^{(o, T)}$ | Notation for total static Lagrangian for $DE_k$. |
| q | |
| $\{p_\alpha\}$ | |
| $u^{(k)}$ | |
| $H_k^{(o)}$ | Primary Hamiltonian for the absolute rules for $DE_k$. |
| $H_k^{(A)}$ | Hamiltonian for the Tellegen agent of the total Hamiltonian's rules. |
| $H_k^{(T)}$ | Total Hamiltonian for $DE_k$. |

Overview

This document introduces and specifies the architecture for the Cooperative Distributed Inferencing Platform (CDIP). The primary instance of this is the Distributed Architecture (DA) for resolving queries by accessing both an Internal Heterogeneous Database (IHDB) populated by a special class of Horn Clause rules and external data sources referred to as sensors.

The architecture implements a network of active devices at its nodes. These devices are called Decision Elements (DE's). The DE's cooperate in the resolution of a query posed to one or several of them. The DE's in a given DA are referred to as the team.

Every DE in a team is programmed to transform rules in its domain, determined by a posed query, into an ordinary differential equation (ODE), whose dependent variables represent internal variables and parameters. The dependent variables include unknowns of the query posed to the DE. The DE's in the architecture are synchronized via a Pareto multi criteria optimization strategy.

The components of the CDIP include:
  Application requirements that the system is designed to accommodate.
  Functional requirements that satisfy the application requirements and pertain directly to the construction and operation of the system components.
  Subcomponents which are necessary to implement the functional requirements
  Limitations which highlight noteworthy constraints which are inherent the specified implementation of the architecture.
  Architectural flow describes key aspects of the architecture that indicate how the system is to be constructed given the specified essence and key behavior of the subcomponents.
  Software realization of the architecture describes the key pieces of software necessary for system implementation.
  Data describes the kinds of data the system is expected to accept as input and produce as output.
  Data exchange protocols reference key data types and structures that need to be exchanged across the system and the protocols for exchange.
  Environment describes the particulars of the environments that the system will be able to operate in and therefore should be tested in.
  Testing describes how the system should be tested given the data and operating environments.
Subcomponents Subcomponents are fundamental parts of the architecture that perform particular roles. This section contains descriptions for each of the subcomponents of the architecture. The subcomponents are: The Distributed Architecture (DA).
  The Internal Heterogeneous Database (IHDB).
  The Rule Entry Interface (REI).
  The Rule Editor (RE).
  The External Knowledge Base (EKB).
  The Sensor Ingestion Interface (SII).
  The Rule Conversion Engine (RCE).
  The Decision Element (DE).
  The Query Language Interface (QLI).
  The Minimization Function Generator (MFG).
  The Query Response Engine (QRE).
  The Pareto Multi-Criteria Optimization Engine (PMOE).
Distributed Architecture (DA)

The DA is a platform of interacting components called DE's. The DE's collaborate in the resolution of a query posed by one of them. The DE's implement a distributed, dynamic optimization process, herein referred as the optimization process (OP). OP implements an optimization process that computes an answer to the active queries as a function of data stored in two categories of repositories: IHDB and EKB's. These repositories of the data needed to implement OP given a query.

The EKB's are a collection of public or private repositories of knowledge relevant to the DE posing a query. A DE has a list of external repositories (LER). Each entry in an LER includes 1) a protocol, 2) a heading sub-list, and 3) a translation grammar. Each protocol entry prescribes the access procedure to the corresponding knowledge repository. Each heading sub-list entry contains a summary of the knowledge contents of the corresponding repository. Finally, each translation grammar entry provides a procedure for converting knowledge elements of the corresponding repository in to the rule representation in the IHDB of the DE.

Functional characteristics of this architecture and in particular, the DE's, IHDB, and the sensors are described, including the following concepts:
  The DA
  A process for resolving queries by accessing the IHDB and External Knowledge Bases (EKB's) through sensors
  The constitution of DE's
  A query and corresponding rules transformation into an ODE
  The orchestration of a team of DE's through a Pareto multi criteria optimization strategy
  The Internal Heterogeneous Database (IHDB)
  Composition of IHDB as a Set of Knowledge Components The IHDB encodes knowledge about the implemented application. The IHDB is divided into knowledge components (KC's). Each KC is consulted and updated by a DE in the DA. Any pair of KC's may have an overlapping set of rules by which they operate, but there is no a priori constraint on intersections or inclusion. The collection of KC's constitutes the existing knowledge of the system.

Algorithmic Formulation of a Rule

A KC is a collection of rules, written in a restrictive Horn clause format. The rules are logic entities. When a rule is instantiated, it has a logic value. The logic values a rule can have are taken from the interval [0,1]. The entire system of rules is evaluated using variables and parameters which are collectively referred to as the generalized coordinates of the system and are indexed as follows:

$$q(t)=\{q^{(1)}(t), \ldots, q^{(N)}(t)\}. \quad (3.2\text{-}1)$$

The time argument t refers to the algorithmic time of the system which means that it has no other meaning than as a continuous index with respect to the evolution of the system. There is therefore no requirement that it correspond to a physical aspect of the system although this may naturally occur. Physical time may be represented specifically by a canonical coordinate of choice $q^{(i)}(t)$. Alternatively, we may refer to the q's without expressly stating the independent time argument and write $$q(t)=\{q^{(1)}, \ldots, q^{(N)}\}. \quad (3.2\text{-}2)$$

Then we should also note that the time derivatives are referred to notationally as $$\dot{q} = \frac{dq(t)}{dt}, \ddot{q} = \frac{d^2q(t)}{dt^2} \quad (3.2\text{-}3)$$

These coordinates are referred to variously as q depending on the context and the expected arguments of the function to which they are applied. When it is necessary to distinguish between more than one q in equational form we generally write $q_f$ where f denotes the reference function or appropriate domain. Typically, we assume without loss of generality the entire set of canonical coordinates q is an argument to any function, term or proposition. In practice, we may further assume it is possible to apply the particular required coordinates as need to mathematical construct in question.

The rules in each knowledge component are of three types: absolute rules, hard rules, and soft rules. Absolute rules and hard rules take logic value 0 (false) or 1 (true) when instantiated. Soft rules take any value in the interval [0,1].

The format of the restrictive Horn Clauses in the IHDB is illustrated in Equation 3.2-2. A Horn Clause is an object composed of two objects a HEAD and a BODY connected by backward Implication (⇐). The logic implication transfers the logic value of the BODY to the HEAD. If the rule is an absolute rule or a hard rule, the logic value is 1 (if the BODY is logically true) or 0 (if the BODY is logically false). If the rule is a soft rule, the logic value transferred by the body is any number in [0, 1].

The HEAD is a data structure composed of two objects: A name, h, and a list of arguments described by the argument vector $q=(q^{(1)}, \ldots, q^{(n)})$. The list of arguments includes variables and parameters. The variables take values in the domain of the rule and the parameters are constants passed to the rule and unchanged by the instantiation of the rule. The domain of the rule is a set of values that each of its variables can take. In general, variables can take values over numerical or symbolic domains. As an example, a symbolic domain can be a list of diseases. A numeric domain can be a set of pairs of numbers representing blood pressure.

For the applications of CDI, the domains for variables are: real numbers, complex numbers (floating point and floating point complex numbers), integer numbers, binary numbers and symbolic token on finite domains.

The BODY of a clause is a data structure composed of one or more terms, denoted $\varphi_i(q)$. The composition operation is extended- and, denoted by: ∧. The extended- and works as a regular and in absolute rules and hard rules and as a functional product[2] on soft rules.

A rule with a head but not a body is called a fact. A fact's truth value is determined on the basis of the instantiation of its variables.

Each term in the body of a rule is an extended disjunction (or denoted by ∨) of sub-terms. The ∨ operator behaves like the standard-or for absolute and hard rules and behaves in a functional form, described later, when connecting sub-terms encoding heads of soft rules.

A sub-term is either the HEAD of a rule, a relation or a truth valuation (TV). When it is a HEAD it may have the same name as the one in the HEAD of the rule but with different arguments. This provides a recursive mechanism for rule evaluation.

When a rule has a sub-term that is the head of another rule it is said that the two rules are chained together by the corresponding sub-term. Note that a rule can be chained to several rules via corresponding sub-terms.

Constraint Domains

Constraint domains augment the BODY clause of Horn clauses to facilitate dynamic programming. Constraints are specified as a relationship between terms. Define the relationship between two terms $$\varphi(q) rel \sigma(q). \quad (3.2\text{-}4)$$

as a member of the following set $$rel \in \{=, \neq, \leq, \geq, \text{statistical propagation}\}. \quad (3.2\text{-}5)$$

A relation can be of two types numeric or symbolic. Numeric relations establish equational forms between two functional forms. (For the initial phase only polynomial and affine linear functional forms will be considered.)

In general, an equational form is a set of one or more relations. For numeric relations, $\varphi(q)$ rel $\sigma(q)$, rel∈ $\{=, \neq, \leq, \geq, <, >,$ statistical propagation$\}$. The table below gives the relations considered and their symbols.

TABLE EE

| Numeric Relation | Symbol | Code Form |
|---|---|---|
| Equality | = | φ = σ |
| Disequation | ≠ | φ \ = σ |
| Less-inequality | < | φ < σ |
| Less-Equal | ≤ | φ =< σ |
| Great-equality | > | φ > σ |
| Great- inequality | ≥ | φ >= σ |

The adopted code forms are the ones used in constraint logic programming.

A symbolic relation can be of two types: inclusion and constraint. Inclusion relations are of the form:

$$q \in \text{Set} \quad (3.2\text{-}6)$$

Where x is a variable or a parameter, ∈ is the inclusion symbol and Set is a set of symbolic forms or a set of numbers or a composite set of the form shown in the table below.

TABLE FF

| Composite Set | Symbol | Code Form |
|---|---|---|
| Intersection | ∩ | Set1/\Set2 |
| Union | ∪ | Set1\/Set2 |
| Complement | \ | \Set |

Constraint forms of the symbolic relational type may be one or a set of the forms presented in the table below For numeric relations, $\varphi(q)$ rel $\sigma(q)$, rel$\in\{=, \neq, \subset, \supset, \subseteq, \supseteq\}$.

TABLE GG

| Symbolic Relation | Symbol | Code Form |
|---|---|---|
| Equal | = | $\varphi\# = \sigma$ |
| Not Equal | ≠ | $\varphi\#\backslash= \sigma$ |
| Is Contained | ⊂ | $\varphi\# < \sigma$ |
| Contains | ⊃ | $\varphi\# > \sigma$ |
| Is Contained or Equal | ⊆ | $\varphi\# =< \sigma$ |
| Contains or Equal | ⊇ | $\varphi\# >= \sigma$ |

A TV is either a variable or a constant with values in the interval [0,1]. The TV of a Horn Clause that is an absolute rule or a hard rule can only take two values: 1 or 0. The TV when instantiated is 0 or 1. If the TV for an absolute or hard rule is 1, the rule is said to be in inactive state; if the TV is 0, the rule is said to be in active state.

The TV, $T_i$, of a soft rule satisfies $$0 \leq T_i \leq 1. \quad (3.2\text{-}7)$$

If $T_i$ above satisfies, $$T_i \geq T_{threshold} \quad (3.2\text{-}8)$$

the soft clause is said to be in inactive state. If $$T_i < T_{threshold}, \quad (3.2\text{-}9)$$

the soft clause is said to be in active state, where $T_{threshold}$ is a constant in [0,1] defined for each soft clause. The default value is 0.5.

This concludes the description of the knowledge representation. The instantiation process of the goal in a DE, as function of its knowledge base, is carried out by the inference engine of the DE. This process is the central component of CDI and will be described later on the document.

Summary of Terminology

The following table summarizes the terminology we have just reviewed.

TABLE HH

| Reference term | Definition |
|---|---|
| proposition | Defined as a construct as in the propositional calculus where the proposition takes on the value of true or false. |
| term | Recursively according to its assigned subterm. |
| sub-term | A sub-term may be a Horn clause, a relation between two other sub-terms or an extended truth valuation depending on the context of absolute, hard or soft rules. In the case of absolute and hard rules it may be evaluated as a proposition. In the case of soft rules it takes a value on the interval [0, 1] and is considered to be active or true in the case that it exceeds its specific threshold. |
| Horn clause | A disjunction of terms with at most one positive term. |

TABLE HH-continued

| Reference term | Definition |
|---|---|
| definite clause | A Horn clause with exactly one positive term. |
| goal clause | A Horn clause with no positive terms. |
| fact | A definite clause with no negative terms. |
| head | The positive term of a definite clause. |
| inactive state | The case when a rule will not apply for constrained optimization. |
| active state | The case when a rule will apply for constrained optimization. |
| truth value, TV | The value that is used to determine whether a rule is active or inactive. |

Horn Clause Example

The following example illustrates a Horn clause:

has_fever(name, temperature, white_count, heartrate, blood_pressure)⇐(temperature>37)/\((heartrate≥70)\/bp(name, temperature, blood_pressure)\/wc(name, white_count))  (3.2-10)

The clause establishes under which conditions the patient of name name, has a fever. The variables in clause are:
name, temperature, white_count, heartrate, blood_pressure.

When instantiated they represent, respectively, the name of the patient, his current body temperature, his white blood cell count, his heart rate range, and his blood pressure.

The clause body includes other clauses: bp (blood pressure) and wc (white count).

This completes the specification of the rule-based framework. The next step is to specify a complete process for converting all rules of this form to a set of equations.

Rule Entry Interface (REI)

The Rule Entry Interface provides a mechanism for:
Providing an API for the entry of rules into the IHDB.
Validating the specification of rules to be inserted into the IHDB.
Routing the rules to the appropriate DE's for insertion to their respective KC's.

Rule Editor (RE)

The Rule Editor allows users to specify rules associated with the systems to be interrogated.

External Knowledge Base (EKB)
It may be distributed or not
It may be persisted or not
It may be persisted locally or remotely to an agent
It may or may not be architecturally co-located with the IHDB
A sensor may include any source of data used by the agent
It may use various types of buses for data communication
Sensors may or may not be co-located with agents/DEs Rule Conversion Engine (RCE)

The rule conversion engine converts rules of the IHDB into equations.

Method for Specification of a Simple Term as an Equation

Consider the term $\varphi(q)$ with the following truth assignment.

$$\varphi(q) = \begin{cases} T & q \in \mathcal{D}_\varphi \\ F & q \in \mathcal{D}_\varphi \subset \mathcal{D} \end{cases} \quad (3.6\text{-}1)$$

Then we can define the set of arguments which yield positive truth assignment.

$$\{q \in D_\varphi | \varphi(q) \leftarrow T\}. \quad (3.6\text{-}2)$$

Define the corresponding equation $\check{\varphi}(q)$ of the term $\varphi(q)$ as $$\check{\varphi}(q) = \begin{cases} 1 & \varphi(q) \leftarrow T \\ 0 & \varphi(q) \leftarrow F \end{cases} \quad (3.6\text{-}3)$$

Then extend the range of $\check{\varphi}(a)$ to the closed unit interval $$\check{\varphi}(q) \to [0,1]. \quad (3.6\text{-}4)$$

Revisiting the taxonomy of absolute, hard and soft rules, we recognize that hard and soft rules (terms in this example) can take values along the interval $$0 \leq \check{\varphi}(q) \leq 1. \quad (3.6\text{-}5)$$

And for absolute rules we add the constraint $\check{\varphi}(a) \to \{0,1\}$ $$\check{\varphi}(q)(1-\check{\varphi}(q))=0. \quad (3.6\text{-}6)$$

Conversion of Fundamental Clauses of Propositional Calculus to Equations

Define the following notation for the propositional calculus.

TABLE II

| Symbol | Function |
|---|---|
| $\wedge$ | And |
| $\vee$ | Or |
| $\Rightarrow$ | Implication |
| $\sim$ | Not |
| $\exists$ | Exists |
| $\forall$ | All |
| Fuzzy rule | |

Theorem 3.6.1. Given the method for the specification of equations from propositions, we prove the following transformations.

TABLE JJ

| Proposition | Equation |
|---|---|
| $\sim\varphi(q)$ | $1 - \check{\varphi}(q)$ |
| $\varphi(q) \wedge \sigma(q)$ | $\check{\varphi}(q) \cdot \check{\sigma}(q)$ |
| $\varphi(q) \vee \sigma(q)$ | $\check{\varphi}(q) + \check{\sigma}(q) - \check{\varphi}(q) \cdot \check{\sigma}(q)$ |
| $\varphi(q) \Rightarrow \sigma(q)$ | $1 - \check{\varphi}(q) + \check{\varphi}(q) \cdot \check{\sigma}(q)$ |
| $\varphi_1(q) \wedge \varphi_2(q) \wedge \ldots \wedge \varphi_{k-1}(q) \wedge \varphi(q) \Rightarrow \varphi(q)$ (tail recursive) | $\check{\varphi}(n,q) = \dfrac{\check{h}(n-1,q)}{\check{\sigma}(n,q)\check{\varphi}(n-1,q)-1}$ |

Proof by Enumeration for Equational Representation of Conjunction

Define the function $\check{r}(q; \varphi, \sigma)$ which represents the equation corresponding to conjunction ($\wedge$). Verify by enumeration the correspondence of the mathematical equation values corresponding to the mapping T→1 and F→0.

TABLE KK

| $\varphi(q)$ | $\wedge$ | $\sigma(q)$ | $\check{r}(q; \varphi, \sigma) = \check{\varphi}(q) \cdot \check{\sigma}(q)$ |
|---|---|---|---|
| T | T | T | $1 = 1 \cdot 1$ |
| T | F | F | $0 = 1 \cdot 0$ |
| F | F | T | $0 = 0 \cdot 1$ |
| F | F | F | $0 = 0 \cdot 0$ |

Proof by Enumeration for Equational Representation of Disjunction

Define the function $\check{r}(q; \varphi, \sigma)$ which represents the equation corresponding to disjunction ($\vee$). Verify by enumeration the correspondence of the mathematical equation values corresponding to the mapping T→1 and F→0.

TABLE LL

| $\varphi(q)$ | $\vee$ | $\sigma(q)$ | $\check{r}(q; \varphi, \sigma) = \check{\varphi}(q) + \check{\sigma}(q) - \check{\varphi}(q) \cdot \check{\sigma}(q)$ |
|---|---|---|---|
| T | T | T | $1 = 1 + 1 - 1 \cdot 1$ |
| T | T | F | $1 = 1 + 0 - 1 \cdot 0$ |
| F | T | T | $1 = 0 + 1 - 0 \cdot 1$ |
| F | F | F | $0 = 0 + 0 - 0 \cdot 0$ |

Proof by Enumeration for Equational Representation of Negation

Define the function $\check{r}(q; \varphi, \sigma)$ which represents the equation corresponding to negation ($\vee$). Verify by enumeration the correspondence of the mathematical equation values corresponding to the mapping T→1 and F→0.

TABLE MM

| $\varphi(q)$ | $\sim\varphi(q)$ | $\check{r}(q; \varphi, \sigma) = 1 - \check{\varphi}(q)$ |
|---|---|---|
| T | F | $0 = 1 - 1$ |
| F | T | $1 = 1 - 0$ |

Proof by Enumeration for Equational Representation of Implication

Define the function $\check{r}(q; \varphi, \sigma)$ which represents the equation corresponding to disjunction ($\Rightarrow$). First note the equivalence of $$\varphi(q) \Rightarrow \sigma(q) \text{ and } \sim\varphi(q) \vee \sigma(q). \quad (3.6\text{-}7)$$

Verify by enumeration the correspondence of the mathematical equation values corresponding to the mapping T→1 and F→0.

TABLE NN

| $\sim\varphi(q)$ | $\vee$ | $\sigma(q)$ | $\check{r}(q; \varphi, \sigma) = 1 - \check{\varphi}(q) + \check{\varphi}(q) \cdot \check{\sigma}(q)$ |
|---|---|---|---|
| T | T | T | $1 = 1 - 1 + 1 \cdot 1$ |
| T | F | F | $0 = 1 - 1 + 1 \cdot 0$ |
| F | T | T | $1 = 1 - 0 + 0 \cdot 1$ |
| F | T | F | $1 = 1 - 0 + 0 \cdot 0$ |

Proof for Equational Representation of Tail Recursion

Tail recursion is propositionally defined as $$\varphi(q) \Leftarrow \varphi_1(q) \wedge \varphi_2(q) \wedge \ldots \wedge \varphi_{k-1}(q) \wedge \varphi(q) \quad (3.6\text{-}8)$$

where s represent the current state. To develop an equational representation of the recursive formulation, first define the general function $\check{\varphi}(n, q)$ where n represents the $n^{th}$ iteration of the tail recursion ad $\check{\varphi}(n, q)$ is the logical consequent. Then rewrite the above formulation using the recursive step.

$$\tilde{\varphi}_1(n,q) \wedge \tilde{\varphi}_2(n,q) \wedge \ldots \wedge \tilde{\varphi}_{k-1}(n,q) \wedge \tilde{\varphi}(n-1,q) \Rightarrow \varphi(n,q) \quad (3.6\text{-}9)$$

Define $$\tilde{\sigma}(n,q) \equiv \tilde{\varphi}_1(n,q) \wedge \tilde{\varphi}_2(n,q) \wedge \ldots \wedge \tilde{\varphi}_{k-1}(n,q)$$

$$\tilde{r}(n-1,q) \equiv \tilde{\sigma}(n,q) \wedge \tilde{\varphi}(n-1,q) \quad (3.6\text{-}10)$$

Then the tail recursion is rewritable as $$\tilde{\sigma}(n,q) \wedge \tilde{\varphi}(n-1,q) \Rightarrow \tilde{\varphi}(n,q)$$

$$\tilde{r}(n-1,q) \Rightarrow \tilde{\varphi}(n,q) \quad (3.6\text{-}11)$$

According to the equational representation of implication, let $$\check{h}(n-1,q)=1-[|\$]\$\tilde{}\$\$[|\$]\$\tilde{}\:\hat{A}\tilde{H}[|\$]\$\tilde{}\:\hat{gj}(n,q)\cdot$$
$$[|\$]\$\tilde{}\$\$[|\$]\$\tilde{}\:\hat{A}\tilde{H}[|\$]\$\tilde{}\:\hat{gJ}(n-1,q)+[|\$]$$
$$\$\tilde{}\$\$[|\$]\$\tilde{}\:\hat{A}\tilde{H}[|\$]\$\tilde{}\:\hat{gj}(n,q)\cdot[|\$]\$\tilde{}\$\$[|\$]$$
$$\$\tilde{}\:\hat{A}\tilde{H}[|\$]\$\tilde{}\:\hat{gJ}(n-1,q)\cdot[|\$]\$\tilde{}\$\$[|\$]\$\tilde{}\:\hat{A}\tilde{H}$$
$$[|\$]\$\tilde{}\:\hat{gJ}(n,q). \qquad (3.6\text{-}12)$$

Since by definition $\tilde{r}(n-1, q)=[|\$]\$\tilde{}\$\$[|\$]\$\tilde{}\:\hat{A}\tilde{H}[|\$]\$\tilde{}\:\hat{gj}(n, q)\cdot[|\$]\$\tilde{}\$\$[|\$]\$\tilde{}\:\hat{A}\tilde{H}[|\$]\$\tilde{}\:\hat{gJ}(n-1, q)$. Then $$\check{\varphi}(n, q) = \frac{\hat{h}(n-1, q) + \hat{\sigma}(n, q)\cdot\hat{\varphi}(n-1, q) - 1}{\hat{\sigma}(n, q)\cdot\hat{\varphi}(n-1, q)} \qquad (3.6\text{-}13)$$

with boundary condition n=0.

Converting Rules Based System of Inference to the Problem of Constrained Minimization
  Consider the following example.
  Converting Rules to Constraints
The preceding discussion has established an algorithm for convert rules of the form $$h(q) \Leftarrow \varphi_1(q) \wedge \varphi_2(q) \wedge \ldots \wedge \varphi_m(q) \qquad (3.6\text{-}14)$$

To constraints of the form $$\check{h}(q)=\check{\varphi}_1(q)\cdot\check{\varphi}_2(q)\cdot\ldots\cdot\check{\varphi}_m(q). \qquad (3.6\text{-}15)$$

Decision Element (DE)
A diagram of the Decision Element Architecture is shown in illustration OO.
It is composed six elements:
  Programmable search engine (PSE)
  Internal heterogeneous database (IHDB)
  Inference engine (IE)
  Inference rule base (IRB)
  API/user interface
  Network interface (NI)
  List of External Repositories (LER)
A DE has a List of External Repositories (LER). Each entry in an LER includes 1) a protocol, 2) a heading sub-list, and 3) a translation grammar. Each protocol entry prescribes the access procedure to the corresponding external knowledge repository. Each heading sub-list entry contains a summary of the knowledge contents of the corresponding repository. Finally, each translation grammar entry provides a procedure for converting knowledge elements of the corresponding repository in to the rule representation in the IHDB of the DE.
  Programmable Search Engine
The programmable search engine implements a standard hashing algorithm for detecting active rules as a function of the current instantiation of the variables in a variable buffer (VB) of the IE, and the contents of the active rule buffer (ARB). The VB contains the variables that form part of the query and all additional variables incorporated to this buffer during the inference process (IP). The VB includes all relevant data from the EKB beneficial to perform the query. The IP will be described below. The ARB contains all the currently active rules in the IP.
The search hashing algorithm is characterized by the search rules in the Inference Rule Base.
  Internal Heterogeneous Database
The IHDB is the repository of the application clauses associated with the DE. These encode the domain of knowledge characterizing the expertise of the DE. For example in a medical application, a decision element may deal with expertise on heart illnesses, and the corresponding clauses might encode diagnoses and treatments for these diseases.

Inference Engine
The IE encodes an algorithm, the IP, for assigning values to the variables appearing in the query.
  Inference Rule Types
The DE incorporates inference rules (IR) that are a collection of rules for transforming and inferring instantiations of the goal. These rules provide the Inference Engine with directives for processing database rules to give a satisfactory instantiation to a given query or to request additional information so that a satisfactory instantiation can be generated. They are organized according to their functionality as follows. (See Illustration PP)
  Equation Rules
These rules include the formal rules for inference. This includes all rules for natural language modeling from first principles.
  Optimizer Rules
These rules include rules for finding the interior point in optimization.
  Search Rules
These rules include rules for identifying the nature of insufficient potential. The goal is to apply these rules to acquire additional information required to satisfy the optimization goal.
  Adaptation Rules
Adaptation rules are used to update the soft rules to relax them further to reduce the complexity and constrains of the optimization problem. The adaptation also serves to update the search rules to improve information acquisition.
  Language Statistics and Pattern Rules
These rules embody the machine learning models.
  Network Rules
These rules define how information is distributed over the network and what information is available from which resources.
  Hybridization Rules
The rules define how other rules may be combined.
  User Interface
The UI provides the utilities for entering queries, pragma rules, displaying query answers, status and for general interaction with the IE.
  Network Interface
The NI provides a generic mechanism for interacting with other DE's via a procedure termed companionship. The companionship procedure implements the active coupling for the cooperation of the DE's in query resolution. This procedure is not hierarchical and implements a Pareto Agreement set strategy as the mechanism for CDI.
  Query Language Interface (QLI)
Information about the QLI is available elsewhere herein.
  Process for Determining Active Constraints
The process for determining active constraints is available elsewhere herein.
  Minimization Function Generator (MFG) and Determining Active Constraints
The minimization function generator converts a query to a minimization function. Again, we assume without loss of generality the entire set of canonical coordinates q is an argument to any proposition $\varphi_i$. In practice, we may further assume it is possible to apply the particular required coordinates as need to the proposition or function in question. Then let $\varphi^{(k)}$ be the set of propositions associated with $DE_k$ in the context of query Q. These propositions are composed of the proposition associated with the query $\varphi_Q(q)$, and other propositions $\varphi_i(q)$, comprising the constraints of the system. The proposition $\varphi_Q(q)$ associated with a given query Q can be converted to an equation $\varphi_Q(q)$. Queries that are satisfiable specify a set.

$$\{q|\varphi_Q(q) \leftarrow T\} \qquad (3.10\text{-}1)$$

Similarly, a satisfied query represented as an equation is also a set $$\{q|\check{\varphi}_Q(q)=1\}. \qquad (3.10\text{-}2)$$

Relaxing the values that $\check{\varphi}_Q(\bullet)$ can take to include the unit interval so that soft rules are incorporated yields the following constrained optimization expression. Let $J(q)=(\check{\varphi}_Q(q)-1)^2$. Then specify the optimization $$\min_{q} J(q) \quad (3.10\text{-}3)$$

Subject to:
1. $\check{\varphi}_Q(q) \leq 1$
2. $\check{\varphi}_Q(q) \geq 0$
3. A knowledge base on the set $\{\check{\varphi}_1(q), \ldots, \check{\varphi}_n(q), \ldots, \check{\varphi}_{n+s}(q)\} \subseteq \check{\varphi}^{(k)}$ which represents a further set of active constraints specific to the problem:
   a. $\check{\varphi}_i(q) \geq 0$ for $1 \leq i \leq n$,
   b. $\check{\varphi}_i(q) \leq 1$ or, equivalently $-(\check{\varphi}_i(q)-1) \geq 0$ for $1 \leq i \leq n$,
   c. and in the case of absolute rules $\check{\varphi}_l(q)(1-\check{\varphi}_l(q))=0$ for $n < l \leq n+s$.

Introduce the indicator functions $$V^{-}_{\check{\varphi}_i} = \begin{cases} 0 & \check{\varphi}_i(q) \geq 0 \\ \infty & \check{\varphi}_i(q) < 0 \end{cases} \quad (3.10\text{-}4)$$

and $$V^{+}_{\check{\varphi}_i} = \begin{cases} 0 & 1-\check{\varphi}_i(q) \geq 0 \\ \infty & 1-\check{\varphi}_i(q) < 0 \end{cases} \quad (3.10\text{-}5)$$

which yields the two logarithmic barrier functions $$\check{V}^{-}_{\check{\varphi}_i} = -\log(\check{\varphi}_i(q)) \quad (3.10\text{-}6)$$

and $$\check{V}^{+}_{\check{\varphi}_i} = -\log(1-\check{\varphi}_i(q)). \quad (3.10\text{-}7)$$

According to the method of Lagrange multipliers, combine this with the equality constraints to form the static Lagrangian function $$\mathcal{L}\left(q; \check{\varphi}_Q, \check{\varphi}^{(k)}, \omega_1^{(+)}, \ldots, \omega_n^{(+)}, \omega_{n+1}^{(-)}, \ldots, \omega_{2n}^{(-)}, \omega_{2n+1}^{(\lambda)}, \ldots, \omega_{2n+s}^{(\lambda)}, \omega_{2n+s+1}^{(Q)}, \omega_{2n+s+2}^{(Q)}\right) =$$

$$\check{\varphi}_Q(q) + \sum_{i=1}^{n}\left[\omega_i^{(+)} \check{V}^{+}_{\check{\varphi}_i} + \omega_{n+i}^{(-)} \check{V}^{-}_{\check{\varphi}_i}\right] + \sum_{l=1}^{s} \omega_{2n+l}^{(\lambda)} \check{\varphi}_l(q)\left(1 - \check{\varphi}_l(q)\right) =$$

$$\omega_{2n+s+1}^{(Q)} \log(\check{\varphi}_Q(q)) - \omega_{2n+s+2}^{(Q)} \log(1 - \check{\varphi}_Q(q)), \quad (3.10\text{-}8)$$

the roots of which can be found using a formulation of Newton-Raphson. Since $\mathcal{L}$ here includes absolute, hard and soft rules we may call it the total static Lagrangian for $DE_k$ and refer to it as $\mathcal{L}_k^{(T)}$.

Construct Equations of Motion

Information for equations of motion is available elsewhere herein.

Query Response Engine (QRE) which Includes Process for Constructing Differential Equations Application of Newton-Raphson Consider a continuous analog of the independent variables of $\mathcal{L}(\bullet)$ $$q = q(t) = \begin{bmatrix} q^{(1)}(t) \\ \vdots \\ q^{(v)}(t) \end{bmatrix} \quad (3.12\text{-}1)$$

where each of the v total independent variables of $\mathcal{L}(\bullet)$ is mapped to its corresponding position in q(t), the column vector that is represented with a lower-case q. To reiterate, the independent variable t refers algorithmic time as opposed to physical time which may also be represented in the system. The corresponding unconstrained optimization goal can be written as $$\min_{q_1,\ldots,q_v} \mathcal{L}(q^{(1)}(t), \ldots, q^{(v)}(t)) \quad (3.12\text{-}2)$$

so that $\nabla L(q)$ $$\nabla \mathcal{L}(q(t)) = \begin{bmatrix} \frac{\partial \mathcal{L}}{\partial q^{(1)}} \\ \vdots \\ \frac{\partial \mathcal{L}}{\partial q^{(v)}} \end{bmatrix} = \begin{bmatrix} \nabla \mathcal{L}_1 \\ \vdots \\ \nabla \mathcal{L}_v \end{bmatrix} = 0, \quad (3.12\text{-}3)$$

with positive definite Hessian matrix $$\nabla^2 \mathcal{L}(q(t)) = \quad (3.12\text{-}4)$$

$$\begin{bmatrix} \frac{\partial \mathcal{L}}{\partial q^{(1)} \partial q^{(1)}} & \cdots & \frac{\partial \mathcal{L}}{\partial q^{(1)} \partial q^{(v)}} \\ \vdots & \ddots & \vdots \\ \frac{\partial \mathcal{L}}{\partial q^{(v)} \partial q^{(1)}} & \cdots & \frac{\partial \mathcal{L}}{\partial q^{(v)} \partial q^{(v)}} \end{bmatrix} = \begin{bmatrix} \nabla \mathcal{L}_{11} & \cdots & \nabla \mathcal{L}_{1v} \\ \vdots & \ddots & \vdots \\ \nabla \mathcal{L}_{v1} & \cdots & \nabla \mathcal{L}_{vv} \end{bmatrix} \Rightarrow 0.$$

Write the recursion for Newton's method $$q_{(k+1)}(t) = q_{(k)}(t) - (\nabla^2 \mathcal{L}(q_{(k)}(t)))^{-1} \nabla \mathcal{L}(q_{(k)}(t)). \quad (3.12\text{-}5)$$

This is equivalently rewritten $$\frac{q_{(k+1)}(t) - q_{(k)}(t)}{\delta} = -\frac{1}{\delta}(\nabla^2 \mathcal{L}(q_{(k)}(t)))^{-1} \nabla \mathcal{L}(q_{(k)}(t)). \quad (3.12\text{-}6)$$

Via continualization we approximate the derivative $$\dot{q}(t) = \frac{dq(t)}{dt} = -(\nabla^2 \mathcal{L}(q(t)))^{-1} \nabla \mathcal{L}(q(t)). \quad (3.12\text{-}7)$$

Translation of Inverted Matrix

Consider M, an invertible and positive definite matrix. Then we make the following provable assertions.
1. $A^T A$ is symmetric.
2. $-A^T A$ has negative eigenvalues.

Define $$\frac{dM(t)}{dt} = -A^T A M(t) + A^T \quad (3.12\text{-}8)$$

Then as $t \to \infty$, $M(t) \to A^{-1} = \nabla^2 \mathcal{L}(q_{(k)}(t))^{-1}$. Using (3.12-3) and (3.12-4) approximate q(t) by rewriting the derivative in the context of M(t). This yields the following two equations.

$$\dot{q}(t) = -M(t)\nabla L(q(t)) = \begin{bmatrix} m_{11} & \cdots & m_{1v} \\ \vdots & \ddots & \vdots \\ m_{v1} & \cdots & m_{vv} \end{bmatrix} \begin{bmatrix} \nabla \mathcal{L}_1 \\ \vdots \\ \nabla \mathcal{L}_v \end{bmatrix} = \begin{bmatrix} m_{11}\nabla \mathcal{L}_1 + \cdots + m_{1v}\nabla \mathcal{L}_v \\ \vdots \\ m_{v1}\nabla \mathcal{L}_1 + \cdots + m_{vv}\nabla \mathcal{L}_v \end{bmatrix} \qquad (3.12\text{-}9)$$

$$\frac{dM(t)}{dt} = -\left(\nabla^2 \mathcal{L}(q(t))\right)^T \left(\nabla^2 \mathcal{L}(q(t))\right) M(t) + \left(\nabla^2 \mathcal{L}(q(t))\right)^T \qquad (3.12\text{-}10)$$

$$= -\begin{bmatrix} \nabla \mathcal{L}_{11} & \cdots & \nabla \mathcal{L}_{v1} \\ \vdots & \ddots & \vdots \\ \nabla \mathcal{L}_{1v} & \cdots & \nabla \mathcal{L}_{vv} \end{bmatrix} \begin{bmatrix} \nabla \mathcal{L}_{11} & \cdots & \nabla \mathcal{L}_{1v} \\ \vdots & \ddots & \vdots \\ \nabla \mathcal{L}_{v1} & \cdots & \nabla \mathcal{L}_{vv} \end{bmatrix} \begin{bmatrix} m_{11} & \cdots & m_{1v} \\ \vdots & \ddots & \vdots \\ m_{v1} & \cdots & m_{vv} \end{bmatrix} + \begin{bmatrix} \nabla \mathcal{L}_{11} & \cdots & \nabla \mathcal{L}_{v1} \\ \vdots & \ddots & \vdots \\ \nabla \mathcal{L}_{1v} & \cdots & \nabla \mathcal{L}_{vv} \end{bmatrix}$$

$$= -\begin{bmatrix} \nabla \mathcal{L}_{11}^2 + \cdots + \nabla \mathcal{L}_{v1}^2 & \cdots & \nabla \mathcal{L}_{11}\nabla \mathcal{L}_{1v} + \cdots + \nabla \mathcal{L}_{v1}\nabla \mathcal{L}_{vv} \\ \vdots & \ddots & \vdots \\ \nabla \mathcal{L}_{11}\nabla \mathcal{L}_{1v} + \cdots + \nabla \mathcal{L}_{v1}\nabla \mathcal{L}_{vv} & \cdots & \nabla \mathcal{L}_{1v}^2 + \cdots + \nabla \mathcal{L}_{vv}^2 \end{bmatrix} \begin{bmatrix} m_{11} & \cdots & m_{1v} \\ \vdots & \ddots & \vdots \\ m_{v1} & \cdots & m_{vv} \end{bmatrix} + \begin{bmatrix} \nabla \mathcal{L}_{11} & \cdots & \nabla \mathcal{L}_{v1} \\ \vdots & \ddots & \vdots \\ \nabla \mathcal{L}_{1v} & \cdots & \nabla \mathcal{L}_{vv} \end{bmatrix}$$

$$= \begin{bmatrix} \left(\nabla \mathcal{L}_{11}^2 + \cdots + \nabla \mathcal{L}_{v1}^2\right)m_{11} + \cdots & & \left(\nabla \mathcal{L}_{11}^2 + \cdots + \nabla \mathcal{L}_{v1}^2\right)m_{1v} + \cdots \\ +(\nabla \mathcal{L}_{11}\nabla \mathcal{L}_{1v} + \cdots + \nabla \mathcal{L}_{v1}\nabla \mathcal{L}_{vv})m_{v1} & \cdots & +(\nabla \mathcal{L}_{11}\nabla \mathcal{L}_{1v} + \cdots + \nabla \mathcal{L}_{v1}\nabla \mathcal{L}_{vv})m_{vv} \\ +\nabla \mathcal{L}_{11} & & +\nabla \mathcal{L}_{v1} \\ \vdots & \ddots & \vdots \\ (\nabla \mathcal{L}_{11}\nabla \mathcal{L}_{1v} + \cdots + \nabla \mathcal{L}_{v1}\nabla \mathcal{L}_{vv})m_{11} + \cdots & & (\nabla \mathcal{L}_{11}\nabla \mathcal{L}_{1v} + \cdots + \nabla \mathcal{L}_{v1}\nabla \mathcal{L}_{vv})m_{1v} + \cdots \\ +\left(\nabla \mathcal{L}_{1v}^2 + \cdots + \nabla \mathcal{L}_{vv}^2\right)m_{v1} & \cdots & +\left(\nabla \mathcal{L}_{1v}^2 + \cdots + \nabla \mathcal{L}_{vv}^2\right)m_{vv} \\ +\nabla \mathcal{L}_{1v} & & +\nabla \mathcal{L}_{vv} \end{bmatrix}$$

$$= \begin{bmatrix} \nabla m_{11} & \cdots & \nabla m_{1v} \\ \vdots & \ddots & \vdots \\ \nabla m_{v1} & \cdots & \nabla m_{vv} \end{bmatrix}$$

The approximation proceeds as follows, applying the Magnus expansion to compute the integral:

1. Fix $M(0) = \nabla^2 \mathcal{L}(q(0))$ and $= \nabla^2 \mathcal{L}(q(t))$.
2. Use the variation of constants formula to solve $$M(T) = e^{-[\nabla^2 \mathcal{L}(q(T))]^2 t} M(0) + \left[ \int_0^T e^{-[\nabla^2 \mathcal{L}(q(\tau))]^2 (T-\tau)} d\tau \right] \nabla^2 \mathcal{L}(q(T))$$

The following is computation flow, flowing down unless otherwise indicated: (1) Initialize $q_0$, $k=0$ and express the Hessian $A(q) = \nabla^2 \mathcal{L}$ symbolically; (2) Evaluate the Hessian at $q_k$: $A_k = A(q_k) = \nabla^2 \mathcal{L}(q_k)$; (3) If $\|A_k - A_{k-1}\| \geq \epsilon$, solve $\dot{M}(t) = -(A_k)^2 M(t) + A_k$ for large $t=T$. $M(t) \approx A_k^{-1}$; (4) Integrate $\dot{q}(t) = -\text{Gain} \cdot M(T) \nabla \mathcal{L}(q(t))$ from $t_k$ to $t_k + \tau$ with initial condition $q_k$. Set $q_{k+1} = q(t_k + \tau)$; (5) Continue?; (6) if yes, $t_{k+1} \leftarrow t_k + \tau | k \leftarrow k+1$, and return to (2); (7) if no, Stop.

Process for Determining Dynamic Lagrangian Via Hemholtz Equations Given $$G_i(\ddot{q}, \dot{q}, q) = \sum_{j=1}^{n} W_{i,j}(\dot{q}, q)(\dot{q}, q) \ddot{q}^{(j)} + K_i(\dot{q}, q) = 0 \quad j = 1, \ldots, n \qquad (3.12\text{-}11)$$

If the three conditions $$\frac{\partial G_i}{\partial \dot{q}^{(j)}} = \frac{\partial G_j}{\partial \dot{q}^{(i)}}, \qquad (3.12\text{-}12)$$

$$\frac{\partial G_i}{\partial \dot{q}^{(j)}} + \frac{\partial G_j}{\partial \dot{q}^{(i)}} = \frac{d}{dt}\left(\frac{\partial G_i}{\partial \dot{q}^{(j)}} + \frac{\partial G_j}{\partial \dot{q}^{(i)}}\right),$$

$$\frac{\partial G_i}{\partial q^{(j)}} - \frac{\partial G_j}{\partial q^{(i)}} = \frac{1}{2}\frac{d}{dt}\left(\frac{\partial G_i}{\partial \dot{q}^{(j)}} - \frac{\partial G_j}{\partial \dot{q}^{(i)}}\right),$$

with $i, j = 1, \ldots, n$ hold, then $$\sum_{j=1}^{n} \frac{\partial^2 L}{\partial \dot{q}^{(j)} \partial \dot{q}^{(i)}} \ddot{q}^{(j)} + \frac{\partial^2 L}{\partial q^{(j)} \partial \dot{q}^{(i)}} - \frac{\partial L}{\partial q^{(i)}} = G_i, \ i = 1, \ldots, n \qquad (3.12\text{-}13)$$

This is a second order, linear hyperbolic differential equation on the Lagrangian L. It can be solved efficiently by the method of characteristics.
Let $$G(\ddot{q}, \dot{q}, q) = \begin{bmatrix} q(t) \\ \dot{q}(t) \\ \dot{M}(t) \end{bmatrix} \qquad (3.12\text{-}14)$$

$$= \begin{bmatrix} q^{(1)} \\ \vdots \\ q^{(v)} \\ m_{11}\nabla \mathcal{L}_1 + \cdots + m_{1v}\nabla \mathcal{L}_v \\ \vdots \\ m_{v1}\nabla \mathcal{L}_1 + \cdots + m_{vv}\nabla \mathcal{L}_v \\ \nabla m_{11} \\ \vdots \\ \nabla m_{v1} \\ \vdots \\ \nabla m_{1v} \\ \vdots \\ \nabla m_{vv} \end{bmatrix}$$

Process for Determining Hessian Rank of Dynamic Lagrangian

Information for determining Hessian rank of dynamic Lagrangian is available elsewhere herein.

Converting the Lagrangian to the Hamiltonian Via the Legendre Transformation.

In our formulation the Lagrangian, $L_k^{(T)}(q, \dot{q}; \omega)$, may be converted to the Hamiltonian using the Legendre transformation, so that $$H_k^{(T)}(q, p; \omega) = \frac{\partial L_k^{(T)}}{\partial \dot{q}} \dot{q} - L_k^{(T)}(q, \dot{q}; \omega) \qquad (3.12\text{-}15)$$

$$= p^T \dot{q} - L_k^{(T)}(q, \dot{q}; \omega)$$

Pareto Multi-Criteria Optimization Engine (PMOE)

Consider the problem of determining the relaxed Pareto optimal solution to a given system query at a given time step. There are N decision elements, $k=1, \ldots, N$. A given decision element, $DE_k$, has the following associated parameters which are constituent to the ARB:

A generalized set of coordinates relevant to $DE_k$, q.

A generalized set of linearly independent momenta $\{p_a\}$ where the index a refers the linearly independent momenta selected from the canonical set p.

A set of control parameters $\omega$ for hard a soft rules of the system, where $0 \leq \omega_i \leq 1$.

The ARB has the following components which determine the constraints of $DE_k$:

The Hamiltonian which identifies the fundamental dynamics of the system of the system for the k'th decision element denoted $$H_k^{(o)}(q, \{p_a\}). \tag{3.13-1}$$

The summation of the first class constraints of the system, which is $$\sum_i \omega_i f_i(q^{(i)}, \omega_i) \tag{3.13-2}$$

The summation of the second class constraints of the system which is $$\sum_i g_i(q^{(i)}, \omega_i) \tag{3.13-3}$$

The Tellegen agent which is a function of the Hamiltonians of the absolute rules of the other N−1 decision elements in the system $$H_k^{(A)} = F_k^{(A)}(H_1^{(T)}, \ldots, H_{k-1}^{(T)}, H_{k+1}^{(T)}, \ldots, H_k^{(T)}) \tag{3.13-4}$$

The total Hamiltonian of the system is denoted $H^{(T)}$.

Approximations to the various Hamiltonian's are denoted $\hat{H}_k^{(A)}$, $\hat{H}^{(T)}$ and $\hat{H}_k^{(o)}$ for the Tellegen, total, and DE-level Hamiltonians respectively.

System Initialization

Determining the relaxed Pareto optimal point of the system is a process which includes:

Initialization of N decision elements.

Synchronization through companionship of each of the N decision elements with its respective Tellegen agent.

System Operation

Illustration SS shows how decision elements interact with the network, receive queries, and return results. In this example, the distributed system effectively implements an abstract classifier that has no real implementation. The DE's receive sensor data from the network which includes new available information which may benefit classification. The user submits a query that is received by a DE which then returns a result.

Gauge Systems in a Hamiltonian Domain

The time integral of the Lagrangian $L(q, \dot{q})$ is the action $S_L$ defined as $$S_L = \int_{t_1}^{t_2} L(q, \dot{q}) dt$$

where $$\dot{q} = \frac{dq(t)}{dt}.$$

The Lagrangian conditions for stationarity are first that $$\frac{d}{dt} L_{\dot{q}^{(n)}} - L_{q^{(n)}} = 0 \tag{3.14-1}$$

where $n=1, \ldots, N$, $$L_{\dot{q}^{(n)}} = \frac{\partial L}{\partial \dot{q}^{(n)}}, \text{ and } L_{q^{(n)}} = \frac{\partial L}{\partial q^{(n)}}.$$

And, secondarily $$\left[\sum_{n'=1}^{N} \ddot{q}^{(n')}\right] L_{\dot{q}^{(n)} \dot{q}^{(n)}} = L_{q^{(n)}} - \dot{q}^{(n)} L_{\dot{q}^{(n)} q^{(n)}} \tag{3.14-2}$$

where $$\ddot{q}^{(n')} = \frac{d^2 q^{(n')}}{dt^2} \text{ and } L_{\dot{q}^{(n)} q^{(n)}} = \frac{\partial^2 L}{\partial (\dot{q}^{(n)})^2}.$$

The generalized accelerations $\ddot{q}^{(n)}$ are immediately determined if $L_{\dot{q}^{(n)} \dot{q}^{(n)}}$ is invertible, or equivalently $$\det(L_{\dot{q}^{(n)} \dot{q}^{(n)}}) \neq 0 \tag{3.14-3}$$

for $i=1, \ldots, N$. If for some n, $\det(L_{\dot{q}^{(n)} \dot{q}^{(n)}}) = 0$, the acceleration vector $\ddot{q}^{(n)}$ will not be uniquely determined.

The departing point for the Hamiltonian approach is the definition of conjugate momentum $$p_n = L_{\dot{q}^{(n)}} \tag{3.14-4}$$

where $n=1, \ldots, N$. We will see that (3.14-3) is the condition of non-invertibility of $$L_{\dot{q}\dot{q}} = \begin{bmatrix} L_{\dot{q}^{(1)} \dot{q}^{(1)}} & \cdots & L_{\dot{q}^{(1)} \dot{q}^{(N)}} \\ \vdots & \ddots & \vdots \\ L_{\dot{q}^{(N)} \dot{q}^{(1)}} & \cdots & L_{\dot{q}^{(N)} \dot{q}^{(N)}} \end{bmatrix}$$

of the velocities of the functions of the coordinates q and momenta p. In other words, in this case, the momenta defined in (3.14-4) are not all independent. Define the relations that follow from (3.14-4) as $$\varphi_m(q, p) \tag{3.14-5}$$

where $m=1, \ldots, M$. Write (3.14-4) in vector notation as $$p = L_{\dot{q}}(q, \dot{q}).$$

Then compatibility demands $$\varphi_m(q, L_{\dot{q}}(q, \dot{q})) = 0$$

is an identity with $m=1, \ldots, M$.

Relations specified in (3.14-5) are called primary constraints. For simplicity let's assume that rank $(L_{\dot{q}\dot{q}})$ is constant throughout the phase space, $(q, \dot{q})$, so that (3.14-5)

defines a submanifold smoothly embedded in the phase space. This manifold is known as the primary constraint surface. Let $$\text{rank}(L_{q\dot{q}})=N-M' \quad (3.14\text{-}6)$$

Then there are M' independent constraints among (3.14-5) and the primary constraint surface is a phase space submanifold of dimension 2N−M'.

We do not assume that all the constraints are linearly independent so that $$M' \leq M. \quad (3.14\text{-}7)$$

It follows from (3.14-5) that the inverse transformation from the p's to the q's is multivalued. That is, given q, p that satisfies (3.14-5), the inverse image (q, q̇) that satisfies $$p = \left(\frac{\partial L}{\partial \dot{q}}\right)^T \quad (3.14\text{-}8)$$

is not unique, since (3.14-8) defines a map from a 2N-dimensional manifold (q, q̇) to the smaller (2N−M')-dimensional manifold. Thus the inverse image of the points of (3.14-5) form a manifold of dimension M'.

Conditions on the Constraint Function

There exist many equivalent ways to represent a given surface by means of equations of the form of (3.14-5). For example the surface $p_1=0$ can be represented equivalently by $p_1^2=0$, $\sqrt{|p_1|}=0$, or redundantly by $p_1=0$ and $p_1^2=0$. To use the Hamiltonian formalism, it is necessary to impose some restrictions which the regularity conditions for the constraints.

Regularity Conditions

The (2N−M')-dimensional constraint surface $\phi_m(q, p)$ should be covered of open region: in each region the constraints can be split into independent constraints $$\{\phi_{m'}|m'=1, \ldots, M'\}.$$

Their Jacobian matrix $$\left\{\frac{\partial \phi_{m'}}{\partial p_n, q^{(n)}}\right\} = \begin{bmatrix} \frac{\partial \phi_1}{\partial p_1, q^{(1)}} & \cdots & \frac{\partial \phi_1}{\partial p_n, q^{(n)}} \\ \vdots & \ddots & \vdots \\ \frac{\partial \phi_{m'}}{\partial p_1, q^{(1)}} & \cdots & \frac{\partial \phi_{m'}}{\partial p_n, q^{(n)}} \end{bmatrix}$$

with m'=1, . . . , M' and n=1, . . . , N, is of rank M'.

The dependent constraints ($\phi_m$, m=M'+1, . . . , M of the other $\phi_m=0 \Rightarrow \phi_m=0$. Alternatively the condition on the Jacobian.

1. The function $\phi_{m'}$ can be taken locally as the first M' coordinates of a new regular system in the vicinity of the constraint surface or the differentials $d\phi_1, \ldots, d\phi_{M'}$ are locally linearly independent:

$$d\phi_1 \wedge \ldots \wedge d\phi_M \neq 0 \quad (3.14\text{-}9)$$

2. The variations $\delta\phi_{m'}$ are of order $\epsilon$ for arbitrary variations $\delta q^{(i)}$, $\delta p_i$ of order $\epsilon$ (Dirac's approach).

Theorem 3.14.1. If a smooth, phase space function G vanishes on $\{\phi_m=0\}$ then $$G = \sum_{m=1}^{M} g^{(m)} \phi_m \quad (3.14\text{-}10)$$

Proof: (local proof). Set $\phi_{m'}$, m'=1, . . . , M' as coordinates $(y_{m'}, x_\alpha)$ with $y_{m'}=\phi_{m'}$. In these coordinates G(0, x)=0 and $$G(y, x) = \int_0^1 \frac{d}{dt} G(ty, x) dt \quad (3.14\text{-}11)$$

$$= \sum_{m'=1}^{M'} y_{m'} \int_0^1 \frac{\partial}{\partial y_{m'}} G(ty, x) dt$$

$$= \sum_{m'=1}^{M'} g^{(m')}(y, x) \phi_{m'}(y, x)$$

with $$g^{(m')}(y, x) = \int_0^1 \frac{\partial}{\partial y_{m'}} G(ty, x) dt.$$

Theorem 3.14.2. If the sum $\Sigma(\lambda^{(n)}\delta q^{(n)}+\mu_n\delta p_n)=0$ for arbitrary variations $\delta q^{(i)}$, $\delta p_i$ tangent to the constraint surface $\{\phi_m(q, p)=0|m=1, \ldots, M\}$, then $$\lambda^{(n)} = \sum_{m=1}^{M} u^{(m)} \frac{\partial \phi_m}{\partial q^{(n)}} \quad (3.14\text{-}12)$$

$$\mu_n = \sum_{m=1}^{M} u^{(m)} \frac{\partial \phi_m}{\partial p_n} \quad (3.14\text{-}13)$$

Proof. The dimension of $\{\phi_m\}$ is 2N−M'. Thus the variations at a point (p, q) forms a 2N−M' dimensional space $$\sum_{n=1}^{N} (\lambda^{(n)} \delta q^{(n)} + \mu_n \delta p_n) = 0 \quad (3.14\text{-}14)$$

By the singularity assumption, there exists exactly M' solutions to (3.14-14). Clearly, the gradients $$\left\{\frac{\partial \phi_{m'}}{\partial q^{(n)}}\right\} \text{ and } \left\{\frac{\partial \phi_{m'}}{\partial p_n}\right\}$$

and are linearly independent. They are the basis for solutions to (3.14-14).

Note that in the presence of redundant constraints, the functions $u^{(m)}$ exist but are not unique.

Canonical Hamiltonian

The Hamiltonian in canonical coordinates is $$H(q, p) = \sum_{n=1}^{N} \dot{q}^{(n)} p_n - L(q, \dot{q}) \quad (3.14\text{-}15)$$

The rate q̇ enters through the combination through conjugate momenta defined for each coordinate $$p_n(q, \dot{q}) = L_{\dot{q}^{(n)}}(q, \dot{q}) \quad (3.14\text{-}16)$$

This remarkable property is essential for the Hamiltonian approach. It is verified by evaluating the change $\delta H$ involved by arbitrary independent variations of position and velocities.

$$\delta H = \sum_{n=1}^{N} \left( \dot{q}^{(n)} \delta p_n + \delta \dot{q}^{(n)} p_n \right) - \delta L = \qquad (3.14\text{-}17)$$

$$\sum_{n=1}^{N} \left( \dot{q}^{(n)} \delta p_n + \delta \dot{q}^{(n)} p_n \right) - \sum_{n=1}^{N} \left( L_{q^{(n)}} \delta q^{(n)} + L_{\dot{q}^{(n)}} \delta \dot{q}^{(n)} \right)$$

Utilizing (3.14-16) in (3.14-17) yields $$\delta H = \sum_{n=1}^{N} \left( \dot{q}^{(n)} \delta p_n - L_{q^{(n)}} \delta q^{(n)} \right) \qquad (3.14\text{-}18)$$

The Hamiltonian defined by (3.14-15) is not unique as a function of p, q. This can be inferred from (3.14-18) by noticing that $\{\delta p_n | n=1, \ldots, N\}$ are not all independent. They are restricted to preserve the primary constraints $\phi_m \approx 0$ which are identities when the p's are expressed as functions of q's via (3.14-16).

Using the definition of the differential in several variables applied to $\delta H = \delta H(\{q^{(n)}\}, \{p_n\})$, (3.14-18) can be rewritten $$\sum_{n=1}^{N} \left( \frac{\partial H}{\partial q^{(n)}} \delta q^{(n)} + \frac{\partial H}{\partial p_n} \delta p_n \right) = \sum_{n=1}^{N} \left( \dot{q}^{(n)} \delta p_n - \delta q^{(n)} \frac{\partial L}{\partial q^{(n)}} \right) \qquad (3.14\text{-}19)$$

or $$\sum_{n=1}^{N} \left( \frac{\partial H}{\partial q^{(n)}} + \frac{\partial L}{\partial q^{(n)}} \right) \delta q^{(n)} + \sum_{n=1}^{N} \left( \frac{\partial H}{\partial p_n} - \dot{q}^{(n)} \right) \delta p_n = 0$$

From theorem 2 we then conclude for each n that.

$$\frac{\partial H}{\partial q^{(n)}} + \frac{\partial L}{\partial q^{(n)}} = \sum_{m=1}^{M} u^{(m)} \frac{\partial \phi_m}{\partial q^{(n)}} \qquad (3.14\text{-}20)$$

and $$\frac{\partial H}{\partial p_n} - \dot{q}^{(n)} = \sum_{m=1}^{M} u^{(m)} \frac{\partial \phi_m}{\partial p_n}.$$

So for each n:

$$\dot{q}^{(n)} = \frac{\partial H}{\partial p_n} + \sum_{m=1}^{M} u^{(m)} \frac{\partial \phi_m}{\partial p_n}, \; n = 1, \ldots, N \qquad (3.14\text{-}21)$$

and $$-\frac{\partial L}{\partial q^{(n)}} = \frac{\partial H}{\partial q^{(n)}} + \sum_{m=1}^{M} u^{(m)} \frac{\partial \phi_m}{\partial q^{(n)}}, \; n = 1, \ldots, N. \qquad (3.14\text{-}22)$$

Note that if the constraints are independent, the vectors $$\sum_{n=1}^{N} \frac{\partial \phi_m}{\partial p_n},$$

$m=1, \ldots, M$ are also independent because of the regularity conditions (this is proved later). Hence no two sets of $\{u^{(m)}|m=1, \ldots, M\}$ can yield the same velocities via (3.14-21).

Thus, using $$\dot{q}^{(n)} = \frac{\partial H}{\partial p_n} + \sum_{m=1}^{M} u^{(m)}(q, \dot{q}) \frac{\partial \phi_m}{\partial p_n}(q, p(q, \dot{q}))$$

we can find $u^{(m)}(p, \dot{q})$. If we define the transformation from (q, $\dot{q}$) to the manifold $\{\phi_m(q, p)=0 | m=1, \ldots, M\}$, from q, $\dot{q}$, u→q, p, u by $q=q, n=1, \ldots, N$ $p_n = L_{\dot{q}^{(n)}}(q, \dot{q}), n=1, \ldots, N-M'$ $u^{(m)} = u^{(m)}(q, \dot{q}), m=1, \ldots, M'$ We see that this transformation is invertible since one has from q, p, u→q, $\dot{q}$, u $q = q$ $$\dot{q}^{(n)} = \frac{\partial H}{\partial p_n} + \sum_{m=1}^{M} u^{(m)} \frac{\partial \phi_m}{\partial p_n}$$

$\phi_m(q, p) = 0$

Thus invertibility of the Legendre transformation when $\det(L_{\dot{q}\dot{q}}) = 0$ can be regained at the prices of adding extra variables.

Action Principle of the Hamiltonian Form

With (3.14-21) and (3.14-22) we can rewrite (3.14-1) in the equivalent Hamiltonian form $$\dot{q}^{(n)} = \frac{\partial H}{\partial p_n} + \sum_{m=1}^{M} u^{(m)} \frac{\partial \phi_m}{\partial p_n} \qquad (3.14\text{-}23)$$

$$\dot{p}_n = -\frac{\partial H}{\partial p_n} - \sum_{m=1}^{M} u^{(m)} \frac{\partial \phi_m}{\partial p_n}$$

$\phi_m(q, p) = 0, m = 1, \ldots, M'$

The Hamiltonian Equations (3.14-23) can be derived from the following variational principle:

$$\delta \int_{t_1}^{t_2} \left[ \sum_{n=1}^{N} \dot{q}^{(n)} p_n - H - \sum_{m=1}^{M} u^{(m)} \phi_m \right] = 0 \qquad (3.14\text{-}24)$$

for arbitrary variations of $\delta q^{(n)}$, $\delta p_n$, and $\delta u^{(m)}$ subject to $\delta q(t_1) = \delta q(t_2) = 0$ where the $u^{(m)}$ appear now as Lagrange multipliers enforcing the primary constraints $\phi_m(q,p)=0, m=1, \ldots, M.$ Let F(p, q) be an arbitrary function of the canonical variables, then $$\frac{dF}{dt} = \sum_{n=1}^{N} \frac{\partial F}{\partial q^{(n)}} \dot{q}_n + \sum_{n=1}^{N} \frac{\partial F}{\partial p_n} \dot{p}_n \qquad (3.14\text{-}25)$$

-continued $$= \sum_{n=1}^{N} \frac{\partial F}{\partial q^{(n)}} \left[ \frac{\partial H}{\partial p_n} + \sum_{m=1}^{M} u^{(m)} \frac{\partial \phi_m}{\partial p_n} \right] +$$

$$\sum_{n=1}^{N} \frac{\partial F}{\partial p_n} \left[ -\frac{\partial H}{\partial p_n} - \sum_{m=1}^{M} u^{(m)} \frac{\partial \phi_m}{\partial p_n} \right]$$

$$= [F, H] + \sum_{m=1}^{M} u^{(m)} [F, \phi_m]$$

The equation (3.14-25) introduces the new binary operator [•,•] which is the Poisson bracket and has the form $$[F, G] = \sum_{n=1}^{N} \left[ \frac{\partial F}{\partial q^{(n)}} \frac{\partial G}{\partial p_n} + \frac{\partial F}{\partial p_n} \frac{\partial G}{\partial q^{(n)}} \right] \quad (3.14\text{-}26)$$

$$= \sum_{n=1}^{N} \left[ F_{q^{(n)}} G_{p_n} + F_{p_n} G_{q^{(n)}} \right]$$

Secondary Constraints

The basic consistency condition is that the primary constraints be preserved in time. So for $$F(p,q) = \phi_m(q,p)$$

we should have that $\dot{\phi}_m = 0$. $\{\dot{\phi}_m(q, p) = 0\}$. So this means $$[\phi_m, H] + \sum_{m'=1}^{M'} u^{(m')} [\phi_m, \phi_{m'}] = 0 \quad (3.14\text{-}27)$$

This equation can either reduce to a relation independent of the $u^{(m')}$, or, it may impose a restriction on the u's.

$$u = -\{[\phi_m, \phi_{m'}]\}[\phi_m, H](q,p) \quad (3.14\text{-}28)$$

In the case (3.14-27) is independent of the u's (3.14-27) is called a secondary constraint. The fundamental difference of secondary constraints with respect to primary constraints is that primary constraints are the consequence of the definition (3.14-8) while secondary constraints depend on the dynamics.

If $X(q, p) = 0$ is an external constraint, we most impose a compatibility condition $$[X, H] + \sum_{m=1}^{M'} u^{(m)} [X, \phi_m] = 0 \quad (3.14\text{-}29)$$

Next we need to test whether this constraint:

$$\Phi(p, q) = [X, H] + \sum_{m=1}^{M'} u^{(m)} [X, \phi_m] = 0 \quad (3.14\text{-}30)$$
$$(3.14\text{-}31)$$

Implies new secondary constraints or whether it only restricts the u's. After the process is finished we are left with a number of secondary constraints which will be denoted by $$\phi_k = 0, k = M+1, \ldots, M+K$$

where K is the total number of secondary constraints. In general, it will be useful to denote all the constraints (primary and secondary) in a uniform way as $$\phi_j(q,p) = 0, j = 1, \ldots, M+K = J \quad (3.14\text{-}32)$$

We make the same regularity assumptions on the full set of constraints.

Weak and Strong Equations

Equation (3.14-32) can be written as $$\phi_j(\bullet) \approx 0 \quad (3.14\text{-}33)$$

To emphasize, the quantity $\phi_j$ is numerically restricted to be zero but does not vanish throughout the space. What this is means is that $\phi_j$ has non-zero Poisson brackets with the canonical variables.

Let F, G be functions that coincide on the manifold $\{\phi_j \approx 0 | j=1, \ldots, J\}$ are said the be weakly equal and denoted by $F \approx G$. On the other hand, an equation that holds throughout the entire phase space and not just on the submanifold $\{\phi_j \approx 0\}$ is called strong. Hence, by theorem 1

$$F \approx G \Leftrightarrow F - G = \sum_{j=1}^{J} c^{(j)}(p, q) \phi_j \quad (3.14\text{-}34)$$

Restrictions on the Lagrange Multipliers

Assume that we have found a complete set of constraints $$\{\phi_j \approx 0 \mid j = 1, \ldots, J\} \quad (3.14\text{-}35)$$

$$[\phi_j, H] + \sum_{m=1}^{M} u^{(m)} [\phi_j, \phi_m] \approx 0 \quad (3.14\text{-}36)$$

We consider (3.14-36) as a set of non-homogeneous linear equations with M≤J unknowns with coefficients that are functions of the q's and p's.

The general solution of (3.14-36) for each j is of the form $$u^{(m)} = U^{(m)} + V^{(m)}, m = 1, \ldots, M \quad (3.14\text{-}37)$$

with $V^{(m)}$ the solution of the homogeneous equation $$\sum_{m=1}^{M} V^{(m)} [\phi_j, \phi_m] \approx 0 \quad (3.14\text{-}38)$$

The most general solution of (3.14-38) is a linear combination of linearly independent solutions of $V_\alpha^{(m)}$ where $\alpha=1, \ldots, A$ with $A \leq M$. Under the assumption that the matrix $$\begin{bmatrix} [\phi_1, \phi_1] & \cdots & [\phi_1, \phi_M] \\ \vdots & \ddots & \vdots \\ [\phi_J, \phi_1] & \cdots & [\phi_J, \phi_M] \end{bmatrix} \quad (3.14\text{-}39)$$

is of constant rank, the number of independent solutions A is the same for all p, q. Thus the general solution to (3.14-36) can be written as $$u^{(m)} \approx U^{(m)} + \sum_{\alpha=1}^{A} v^{(\alpha)} V_\alpha^{(m)}, m = 1, \ldots, M \quad (3.14\text{-}40)$$

Irreducible and Reducible Cases

If the equations $\{\phi_j = 0 | j = 1, \ldots, J\}$ are not independent, one says that the constraints are reducible. The system is irreducible when the constraints are independent. However the separation of constraints into dependent and independent ones might be difficult to perform. It also may disturb invariance properties under some important symmetry. In some cases it may be impossible to separate irreducible from irreducible contexts. Reducible cases arise for example when the dynamical coordinates include p-form gauge fields.

Any irreducible set of constraints can always be replaced by a reducible set by introducing constraints of the ones already at hand. The formalism should be invariant under such replacements.

Total Hamiltonian

We now discuss details of the dynamic equation (3.14-25)

$$\dot{F} \approx \left[F, H' + \sum_{\alpha=1}^{A} V^{(\alpha)} \phi_\alpha\right] \quad (3.14\text{-}41)$$

where from (3.14-40)

$$H' = H + \sum_{m=1}^{M} U^{(m)} \phi_m \quad (3.14\text{-}42)$$

and $$\phi_\alpha = \sum_{m=1}^{M} V_\alpha^{(m)} \phi_m, \ \alpha = 1, \ldots, A$$

This is the result of theorem 3 (see below).

Theorem 3.

$$\left[F, \sum_{m=1}^{M} U^{(m)} \phi_m\right] \approx \sum_{m=1}^{M} U^{(m)}[F, \phi_m] \quad (3.14\text{-}43)$$

$$\left[F, \sum_{\alpha=1}^{A} V_\alpha^{(m)} \phi_m\right] \approx \sum_{\alpha=1}^{A} V_\alpha^{(m)}[F, \phi_m] \quad (3.14\text{-}44)$$

Proof.

$$\left[F, \sum_{m=1}^{M} U^{(m)} \phi_m\right] = \sum_{i=1}^{N} \left\{\frac{\partial F}{\partial q^{(i)}} \frac{\partial}{\partial p_i} \sum_{m=1}^{M} U^{(m)} \phi_m - \frac{\partial F}{\partial p_i} \frac{\partial}{\partial q^{(i)}} \sum_{m=1}^{M} U^{(m)} \phi_m\right\} =$$

$$\sum_{i=1}^{N} \left\{\frac{\partial F}{\partial q^{(i)}} \left[\sum_{m=1}^{M} \frac{\partial U^{(m)}}{\partial p_i} \phi_m + \sum_{m=1}^{M} U^{(m)} \frac{\partial \phi_m}{\partial p_i}\right]\right\} -$$

$$\sum_{i=1}^{N} \left\{\frac{\partial F}{\partial p_i} \left[\sum_{m=1}^{M} \frac{\partial U^{(m)}}{\partial q^{(i)}} \phi_m + \sum_{m=1}^{M} U^{(m)} \frac{\partial \phi_m}{\partial q^{(i)}}\right]\right\} =$$

$$\sum_{m=1}^{M} \{[F, U^{(m)}] \phi_m + U^{(m)}[F, \phi_m]\}$$

So $$\left[F, \sum_{m=1}^{M} U^{(m)} \phi_m\right] - \sum_{m=1}^{M} U^{(m)}[F, \phi_m] = \sum_{m=1}^{M} [F, U^{(m)}] \phi_m \quad (3.14\text{-}45)$$

and from (3.14-34) in (3.14-45), (3.14-43) follows. By a similar process we show (3.14-44). We now prove the validity of (3.14-41).

Theorem 4. Let F(q, p) be a regular function, then F(p, q) propagates in time according to the approximate equation (3.14-41).

Proof. From (3.14-25), $$\frac{dF}{dt} = [F, H] + \sum_{m=1}^{M} u^{(m)}[F, \phi_m]. \quad (3.14\text{-}46)$$

From (3.14-40) into (3.14-46) we obtain, $$\frac{dF}{dt} \approx [F, H] + \sum_{m=1}^{M} \left\{U^{(m)} + \sum_{\alpha=1}^{A} V^{(\alpha)} V_\alpha^{(m)}\right\}[F, \phi_m] \quad (3.14\text{-}47)$$

or $$\frac{dF}{dt} \approx [F, H] + \sum_{m=1}^{M} U^{(m)}[F, \phi_m] + \sum_{m=1}^{M} \sum_{\alpha=1}^{A} v^{(\alpha)} V_\alpha^{(m)}[F, \phi_m]$$

Thus from (3.14-43) and (3.14-44) of theorem 3, we get $$\frac{dF}{dt} \approx [F, H] + \sum_{m=1}^{M} [F, U^{(m)} \phi_m] + \sum_{\alpha=1}^{A} v^{(\alpha)}\left[F, \sum_{m=1}^{M} V_\alpha^{(m)} \phi_m\right] \quad (3.14\text{-}48)$$

$$\approx \left[F, H + \sum_{m=1}^{M} U^{(m)} \phi_m + \sum_{\alpha=1}^{A} v^{(\alpha)} \sum_{m=1}^{M} V_\alpha^{(m)} \phi_m\right]$$

$$\approx \left[F, H' + \sum_{m=1}^{M} U^{(m)} \phi_m + \sum_{\alpha=1}^{A} v^{(\alpha)} \phi_\alpha\right]$$

with $$H' = H + \sum_{m=1}^{M} U^{(m)} \phi_m \quad (3.14\text{-}49)$$

$$\phi_\alpha = \sum_{m=1}^{M} V_\alpha^{(m)} \phi_m \quad (3.14\text{-}50)$$

Now define $$H_T = H' + \sum_{\alpha=1}^{A} v^{(\alpha)} \phi_\alpha. \quad (3.14\text{-}51)$$

So we obtain $$\frac{dF}{dt} \approx [F, H_T] \quad (3.14\text{-}52)$$

First and Second Class Functions

The distinction between primary and secondary constraints is of little importance. We now consider a fundamental classification. It depends on the concept of first class and second class functions.

Definition 1. A function F(q, p) is said to be first class if its Poisson bracket with every constraint vanishes weakly, $[F, \phi_j] \approx 0$, $j=1, \ldots, J$. A function of the canonical variables that is not first class is called second class. Thus F is second class if $[F, \phi_k] \not\approx 0$ for at least one k, $k=1, \ldots, M$.

Theorem 5. If F and G are first class functions, then their Poisson bracket is also a first class function.

Proof: By Hypothesis, $$[F, \phi_j] = \sum_{k=1}^{M} f_j^{(k)} \phi_k \tag{3.14-53}$$

$$[G, \phi_j] = \sum_{l=1}^{M} g_j^{(l)} \phi_l \tag{3.14-54}$$

Applying the Jacobi identity, we get $$[[F, G], \phi_j] =$$

$$[F, [G, \phi_j]] - [G, [F, \phi_j]] = \left[F, \sum_{l=1}^{M} g_j^{(l)} \phi_l\right] - \left[G, \sum_{k=1}^{M} f_j^{(k)} \phi_k\right] =$$

$$\sum_i \left\{ \frac{\partial F}{\partial q^{(i)}} \frac{\partial}{\partial p_i} \sum_{l=1}^{M} g_j^{(l)} \phi_l - \frac{\partial F}{\partial p_i} \frac{\partial}{\partial q^{(i)}} \sum_{l=1}^{M} g_j^{(l)} \phi_l \right\} -$$

$$\sum_n \left\{ \frac{\partial G}{\partial q^{(n)}} \frac{\partial}{\partial p_n} \sum_{k=1}^{M} f_j^{(k)} \phi_k - \frac{\partial G}{\partial p_n} \frac{\partial}{\partial q^{(n)}} \sum_{k=1}^{M} f_j^{(k)} \phi_k \right\} =$$

$$\sum_i \left\{ \frac{\partial F}{\partial q^{(i)}} \sum_{l=1}^{M} \left\{ \frac{\partial g_j^{(l)}}{\partial p_i} \phi_l + g_j^{(l)} \frac{\partial \phi_l}{\partial p_i} \right\} - \frac{\partial F}{\partial p_i} \sum_{l=1}^{M} \left\{ \frac{\partial g_j^{(l)}}{\partial q^{(i)}} \phi_l + g_j^{(l)} \frac{\partial \phi_l}{\partial q^{(i)}} \right\} \right\} -$$

$$\sum_n \left\{ \frac{\partial G}{\partial q^{(n)}} \sum_{k=1}^{M} \left\{ \frac{\partial f_j^{(k)}}{\partial p_n} \phi_k + f_j^{(k)} \frac{\partial \phi_k}{\partial p_n} \right\} - \frac{\partial G}{\partial p_n} \sum_{k=1}^{M} \left\{ \frac{\partial f_j^{(k)}}{\partial q^{(n)}} \phi_k + f_j^{(k)} \frac{\partial \phi_k}{\partial q^{(n)}} \right\} \right\} =$$

$$\sum_{l=1}^{M} \left\{ \phi_l \sum_i \left\{ \frac{\partial F}{\partial q^{(i)}} \frac{\partial g_j^{(l)}}{\partial p_i} - \frac{\partial F}{\partial p_i} \frac{\partial g_j^{(l)}}{\partial q^{(i)}} \right\} + g_j^{(l)} \sum_i \left\{ \frac{\partial F}{\partial q^{(i)}} \frac{\partial \phi_l}{\partial q^{(i)}} - \frac{\partial F}{\partial p_i} \frac{\partial \phi_l}{\partial p_i} \right\} \right\} -$$

$$\sum_{k=1}^{M} \left\{ \phi_k \sum_n \left\{ \frac{\partial G}{\partial q^{(n)}} \frac{\partial f_j^{(k)}}{\partial p_n} - \frac{\partial G}{\partial p_n} \frac{\partial f_j^{(k)}}{\partial q^{(n)}} \right\} + f_j^{(k)} \sum_n \left\{ \frac{\partial G}{\partial q^{(n)}} \frac{\partial \phi_k}{\partial p_n} - \frac{\partial G}{\partial p_n} \frac{\partial \phi_k}{\partial q^{(n)}} \right\} \right\} =$$

$$\sum_{l=1}^{M} \left\{ \phi_l [F, g_j^{(l)}] + g_j^{(l)} [F, \phi_l] \right\} - \sum_{k=1}^{M} \left\{ \phi_k [G, f_j^{(k)}] + f_j^{(k)} [G, \phi_k] \right\} =$$

$$\sum_{l=1}^{M} [F, g_j^{(l)}] \phi_l - \sum_{k=1}^{M} [G, f_j^{(k)}] \phi_k + \sum_{l'=1}^{M} \left\{ \sum_{l=1}^{M} g_j^{(l)} f_l^{(l')} \right\} \phi_{l'} - \sum_{k'=1}^{M} \left\{ \sum_{k=1}^{M} f_j^{(k)} g_k^{(k')} \right\} \phi_{k'}$$

We now use theorem 5 to show the following.

Theorem 6. H' defined by (3.14-49) and $\phi_\alpha$ defined by (3.14-50) are first class functions.

Proof: This follows directly from (3.14-36) and (3.14-38).

We learn from theorem 6 that the total Hamiltonian defined by (3.14-51) is the sum of the first class Hamiltonian H' and the first class primary constraints $\phi_\alpha$ multiplied by arbitrary coefficients.

First Class Constraints as Generators of Gauge Transformations

Gauge transformations are transformations that do not change the physical state.

The presence of arbitrary functions of time $v^{(\alpha)}$, $\alpha=1, \ldots, A$ in the total Hamiltonian, $H_T$ (see (3.14-51)) imply that not all the q's and p's are observable given a set of q's and p's where the state of the physical system is uniquely determined. However the converse is not true: there is more than one set of values of the canonical variables that defines a state. To illustrate this, we see that if we give an initial set of values of physical state at time t, we expect the equations of motion to fully determine the state at other times. Thus any ambiguity in the value of the canonical variables at $t_2 \neq t_1$ should be irrelevant from the physical point of view.

A Derivation Example

We propose here an alternate formulation of Dirac's formalism.

Primary Constraints

Recall that the momenta, canonically conjugate to the generalized "coordinates" $q^{(j)}$, $j=1, \ldots, N$ is given by $$p_j = \frac{\partial L(q, \dot{q})}{\partial \dot{q}^{(j)}}, j = 1, \ldots, N. \tag{E-1}$$

For non-singular systems the equations allows us to express $\dot{q}^{(j)}$, $j=1, \ldots, N$ in terms of the canonical variables, $$\dot{q}^{(i)} = f_i(q, p), i = 1, \ldots, N \tag{E-2}$$

By performing a Legendre transformation $$H_c(p, q) = \sum_{i=1}^{N} p_i f(q, p) + L(q, f(p, q))$$

We obtain the Hamiltonian of the system $H_c$. And from this function we obtain the standard equations of motion of the system.

$$\dot{q} = \frac{\partial H_c}{\partial p} \tag{E-3}$$

$$\dot{p} = -\frac{\partial H_c}{\partial q}$$

For (E-2) to be well-defined we need to have the Hessian W of satisfy $$\det W \neq 0 \tag{E-4}$$

In this case the accelerations $\ddot{q}^{(i)}$ are uniquely determined by the $q^{(j)}$ and $\dot{q}^{(i)}$.

When det W≠0, the Hamiltonian equations of motion do not take the standard form, and we speak of a singular Lagrangian. For illustration purposes, consider a Lagrangian of the form $$L(q, \dot{q}) = \frac{1}{2} \sum_{i=1}^{N} \sum_{j=1}^{N} W_{ij}(q) \dot{q}^{(i)} \dot{q}^{(j)} + \sum_{i=1}^{N} \eta_i(q) \dot{q}^{(i)} - V(q) \tag{E-5}$$

with W a symmetric matrix. From (E-1), the canonical momentum for (E-5) is given by $$p_i = \frac{1}{2}\sum_{j=1}^{N} W_{ij}(q)\dot{q}^{(j)} + \eta_i(q), i = 1, \ldots, n. \quad (E\text{-}6)$$

If W is singular of rank $R_W$, then it possesses $N-R_W$ eigenvectors with corresponding zero eigenvalues. Then for eigenvectors $v_j^{(\alpha)}$ $$\sum_{j=1}^{N} W_{ij}(q)v_j^{(\alpha)}(q) = 0, \alpha = 1, \ldots, N - R_W$$

So pre-multiplying (E-6) by $v_j^{(\alpha)}$ and summing over i we get $$\sum_{i=1}^{N} v_i^{(\alpha)}(q)p_i = \sum_{i=1}^{N} \left[ \sum_{j=1}^{N} \left( v_i^{(\alpha)}(q)W_{ij}(q)\dot{q}^{(j)} \right) + v_i^{(\alpha)}(q)\eta_i(q) \right] \quad (E\text{-}7)$$
$$= \sum_{i=1}^{N} v_i^{(\alpha)}(q)\eta_i(q), \alpha = 1, \ldots, N - R_W$$

So $$\sum_{i=1}^{N} v_i^{(\alpha)}(q)(p_i - \eta_i(q)) = 0, \alpha = 1, \ldots, N - R_W.$$

Let $\{p_\alpha\}$, $\alpha=1, \ldots, N-R_W$, denote the linearly dependent elements of p. Let $\{p_a\}$, $a=1, \ldots, R_a$ be the momenta satisfying (E-1). Then the constraint equations are of the form $$\sum_{\beta=1}^{N-R_W} M_{\alpha\beta}(q)p_\beta - F_\alpha(q, \{p_a\}) = 0, \alpha = 1, \ldots, N - R_W \quad (E\text{-}8)$$

$$M_{\alpha\beta}(q) = v_\beta^{(\alpha)} \text{ and}$$

$$F_\alpha(q, \{p_\beta\}) = \sum_{i=1}^{n} v_i^{(\alpha)}(q)\eta_i(q) + \sum_{b=1}^{R_W} v_b^{(\alpha)}(q)p_b \quad (E\text{-}9)$$

The matrix $\{M_{\alpha\beta}\}$ is necessarily invertible because otherwise M would possess eigenvectors with zero eigenvalues, implying existence of additional constraints. Note that (E-8) can be written as $$p_\alpha - g_\alpha(q, \{p_a\}) = 0, \alpha = 1, \ldots, N - R_W \quad (E\text{-}10)$$

with $$g_\alpha(q, \{p_a\}) = \sum_{\beta=1}^{N-R_W} M_{\alpha\beta}^{-1} F_\beta(q, \{p_a\})$$

with $\dim\{p_a\}=R_W$. So we can define, $$\varphi_\alpha(q,p)=p_\alpha-g_\alpha(q,\{p_a\})=0, \alpha=1,\ldots,N-R_W \quad (E\text{-}11)$$

In Dirac's terminology, constraints of the form of (E-11) are referred to as primary constraints. Although the derivation above is based on a Lagrangian, quadratic in the velocity terms, it is generally valid for Lagrangians which depend on q and $\dot{q}$ but not on higher derivatives.

Note: Primary constraints follow exclusively from the definition of canonical momenta.

The derivation above is valid for general Lagrangians and their Hessian. Let's assume $\{W_{ij}(q, \dot{q})\}$ is the Hessian of a given Lagrangian L. Let $\{W_{ab}|a, b=1, \ldots, R_W\}$ be the largest sub-matrix of $\{W_{ij}\}$ with suitable rearrangement if necessary. We then solve (E-1) for $R_W$ velocities $\dot{q}^{(a)}$ in terms of $\{q^{(i)}|i=1, \ldots, n\}$, $\{p_a|a=1, \ldots, R_W\}$ and $\{q^{(\alpha)}|\alpha=1, \ldots, N-R_W\}$. That is $$\dot{q}^{(a)}=f_a(q,\{p_b\}),\{\dot{q}^{(\beta)}\}) \quad (E\text{-}12)$$

with a, b=1, \ldots, $R_W$ and $\beta=R_W+1, \ldots, N$.

Inserting these relations into (E-1), we get relations of the form $$p_j=h_j(q,\{p_a\},\{\dot{q}^{(\alpha)}\}) \quad (E\text{-}13)$$

with a, j=1, \ldots, $R_W$ and $\alpha=R_W+1, \ldots, N$. This relation reduces to an identity by construction. The remaining equations are of the form $$p_\alpha=h_\alpha(q,\{p_a\},\{\dot{q}^{(\beta)}\}) \quad (E\text{-}14)$$

with $\alpha=1, \ldots, N-R_W$. However, the right hand side cannot depend on $\{\dot{q}^{(\beta)}\}$ since otherwise we could express more velocities in terms of the momenta of the coordinates of the momenta and the remaining velocities.

Hamiltonian Equations of Motion for Constrained Systems

Theorem 3.16.1. In the space $\Gamma_p$ define by $\Gamma_p=\{\phi_\alpha(p, q)\alpha=1, \ldots, N-R_W\}$ where $\phi_\alpha$ is defined as (E-11). The Hamiltonian is only a function of $\{q^{(i)}|i=1, \ldots, N\}$ and momenta $\{p_a|a=1, \ldots, R_W\}$ and does not depend on $\{\dot{q}^{(\alpha)}|\alpha=1, \ldots, N-R_W\}$ Proof. On $\Gamma_p$ the Hamiltonian is given by $$H_o = H_c|_{\Gamma_p} = \sum_{a=1}^{R_W} p_a f_a - \sum_{\alpha=1}^{N-R_W} g_\alpha \dot{q}^{(\alpha)} - L(q, \{f_b\}, \{\dot{q}^{(\beta)}\}) \quad (E\text{-}15)$$

where $f_a$, $a=1, \ldots, N-R_W$ is given by (E-12) and $g_\alpha$, $\alpha=1, \ldots, R_W$ is given by (E-10). We want to show that $H_o$ does not depend on $\dot{q}(\beta)$, $\beta=1, \ldots, N-R_W$. We compute $$\frac{\partial H_o}{\partial \dot{q}^{(\beta)}} = \sum_{a=1}^{R_W} p_a \frac{\partial f_a}{\partial \dot{q}^{(\beta)}} - g_\beta - \sum_{a=1}^{R_W} \frac{\partial L}{\partial \dot{q}^{(a)}}|_{\dot{q}^{(a)}=f_a} \frac{\partial f_a}{\partial \dot{q}^{(\beta)}} - \frac{\partial L}{\partial \dot{q}^{(\beta)}}|_{\dot{q}^{(a)}=f_a} \quad (E\text{-}16)$$

$$= \sum_{a=1}^{R_W} \left( p_a - \frac{\partial L}{\partial \dot{q}^{(a)}}|_{\dot{q}^{(a)}=f_a} \right) \frac{\partial f_a}{\partial \dot{q}^{(\beta)}} - g_\beta - \frac{\partial L}{\partial \dot{q}^{(\beta)}}|_{\dot{q}^{(a)}=f_a}$$

Since by definition $$p_a = \frac{\partial L}{\partial \dot{q}^{(a)}}, a = 1, \ldots, R_W$$

And from (E-11)

$$g_\beta = p_\beta = \frac{\partial L}{\partial \dot{q}^{(\beta)}}\bigg|_{\dot{q}_a=f_a}. \quad (E\text{--}17)$$

So $$\frac{\partial H_o}{\partial \dot{q}^{(\beta)}} = 0, \beta = 1, \ldots, N - R_W.$$

and therefore $$H_o(q,\{p_a\},\{\dot{q}^{(\alpha)}\})=H_o(q,\{p_a\}).$$

Theorem 3.16.2. In the presence of primary constraints (E-11), the Hamilton equations of motion are given by $$\dot{q}^{(i)} = \frac{\partial H_o}{\partial p_i} + \sum_{\beta=1}^{N} \dot{q}^{(\beta)} \frac{\partial \phi_\beta}{\partial p_i}, \quad i = 1, \ldots, N \quad \text{(E--18)}$$

$$\dot{p}_i = -\frac{\partial H_o}{\partial q^{(i)}} + \sum_{\beta=1}^{n} \dot{q}^{(\beta)} \frac{\partial \phi_\beta}{\partial q^{(i)}}, \quad i = 1, \ldots, N$$

$$\phi_\alpha(p, q) = 0, \quad \alpha = 1, \ldots, N - R_W$$

where $\dot{q}^{(\beta)}$ are a priori underdetermined velocities.

Proof: From (E-15) we obtain and the application of Theorem 3.16.1

$$\frac{\partial H_o}{\partial p_a} = f_a + \sum_{b=1}^{R_W} p_b \frac{\partial f_b}{\partial p_a} + \sum_{\beta=1}^{N-R_W} \frac{\partial g_\beta}{\partial p_a} \dot{q}^{(\beta)} - \sum_{b=1}^{R_W} \frac{\partial L}{\partial \dot{q}^{(b)}} \frac{\partial f_b}{\partial p_a} \quad \text{(E--19)}$$

$$= \dot{q}^{(a)} + \sum_{b=1}^{R_W} \left( p_b - \frac{\partial L}{\partial \dot{q}^{(b)}} \right) \frac{\partial f_b}{\partial p_a} + \sum_{\beta=1}^{N-R_W} \frac{\partial g_\beta}{\partial p_a} \dot{q}^{(\beta)}$$

$$= \dot{q}^{(a)} + \sum_{\beta=1}^{N-R_W} \frac{\partial g_\beta}{\partial p_a} \dot{q}^{(\beta)}$$

with $a = 1, \ldots, n - R_W$. Further $$\frac{\partial H_o}{\partial q^{(i)}} = \sum_{b=1}^{R_W} p_b \frac{\partial f_b}{\partial q^{(i)}} + \sum_{\beta=1}^{N-R_W} \dot{q}^{(\beta)} \frac{\partial g_\beta}{\partial q^{(i)}} - \frac{\partial L}{\partial q^{(i)}}\bigg|_{\dot{q}_a = f_a} - \quad \text{(E--20)}$$

$$\sum_{b=1}^{R_W} \frac{\partial L}{\partial \dot{q}_b}\bigg|_{\dot{q}_b = f_b} \frac{\partial f_b}{\partial q^{(i)}}$$

$$= \sum_{b=1}^{R_W} \left( p_b - \frac{\partial L}{\partial \dot{q}^{(b)}}\bigg|_{\dot{q}^{(b)} = f_b} \right) \frac{\partial f_b}{\partial q^{(i)}} + \sum_{\beta=1}^{N-R_W} \dot{q}^{(\beta)} \frac{\partial g_\beta}{\partial q^{(i)}} -$$

$$\frac{\partial L}{\partial q^{(i)}}\bigg|_{\dot{q}^{(a)} = f_a}$$

$$= \sum_{\beta=1}^{N-R_W} \dot{q}^{(\beta)} \frac{\partial g_\beta}{\partial q^{(i)}} - \frac{\partial L}{\partial q^{(i)}}\bigg|_{\dot{q}^{(a)} = f_a}$$

$$= \sum_{\beta=1}^{N-R_W} \dot{q}^{(\beta)} \frac{\partial g_\beta}{\partial q^{(i)}} - \frac{d}{dt}\left( \frac{\partial L}{\partial \dot{q}^{(i)}} \right)\bigg|_{\dot{q}^{(a)} = f_a}$$

from (add reference).

$$\frac{\partial H_o}{\partial q^{(i)}} = -\dot{p}_i + \sum_{\beta=1}^{N-R_W} \dot{q}^{(\beta)} \frac{\partial g_\beta}{\partial q^{(i)}} \quad \text{(E--21)}$$

From (E-19) and (E-20) we get:

$$\dot{q}^{(a)} = \frac{\partial H_o}{\partial p_a} - \sum_{\beta=1}^{N-R_W} \frac{\partial g_\beta}{\partial p_a} \dot{q}^{(\beta)}, \quad a = 1, \ldots, R_W \quad \text{(E--22)}$$

$$\dot{p}_i = -\frac{\partial H_o}{\partial q^{(i)}} + \sum_{\beta=1}^{n-R_W} \dot{q}^{(\beta)} \frac{\partial g_\beta}{\partial q^{(i)}}, \quad i = 1, \ldots, N$$

Since $$\frac{\partial H_o}{\partial p_\alpha} = 0 \text{ and } \frac{\partial \phi_\beta}{\partial p_\alpha} = \delta \beta_\alpha$$

we can supplement these equations with $$\dot{q}^{(\alpha)} = \frac{\partial H_o}{\partial p_\alpha} - \sum_{\beta=1}^{N-R_W} \frac{\partial g_\beta}{\partial p_\alpha} \dot{q}^{(\beta)}, \quad \alpha = 1, \ldots, N - R_W \quad \text{(E--23)}$$

So we can write $$\dot{q}^{(i)} = \frac{\partial H_o}{\partial p_i} + \sum_{\beta=1}^{N-R_W} \frac{\partial g_\beta}{\partial p_i} \dot{q}^{(\beta)}, \quad i = 1, \ldots, N \quad \text{(E--24)}$$

$$\dot{p}_i = -\frac{\partial H_o}{\partial q^{(i)}} - \sum_{\beta=1}^{N-R_W} \dot{q}^{(\beta)} \frac{\partial g_\beta}{\partial q^{(i)}}, \quad i = 1, \ldots, N$$

For consistency with (E-11) we should write $$\dot{q}^{(\alpha)} = \frac{d}{dt} - g_\alpha(q, \{p_a\}), \quad \alpha = 1, \ldots, N - R_W \quad \text{(E--25)}$$

where $\dot{p}_\alpha$ is given by the right hand side of (E-22).

Streamlining the Hamiltonian Equation of Motion (EOM) Definition 3.16-1. A function f is weakly equal to g denoted by f≈g, if f and g are equal on the subspace defined by the primary constraints, $$\phi_\beta = 0 \text{ when } f|_{\Gamma_p} = g|_{\Gamma_p}$$

and $$f(q, p) \approx g(q, p) \Leftrightarrow f(q, p) = g(q, p) \text{ when } \{\phi_\alpha(q, p) = 0\}$$

Theorem 3.16.3. Assume f, g are defined over the entire space spanned by $\{q^{(i)}\}$, $\{p_i\}$. Then if $$f(q, p)|_{\Gamma_p} = g(q, p)|_{\Gamma_p} \quad \text{(E--26)}$$

Then $$\frac{\partial}{\partial q^{(i)}}\left( f - \sum_\beta \phi_\beta \frac{\partial f}{\partial p_\beta} \right) \simeq \frac{\partial}{\partial q^{(i)}}\left( h - \sum_\beta \phi_\beta \frac{\partial h}{\partial p_\beta} \right) \quad \text{(E--27)}$$

and $$\frac{\partial}{\partial p_i}\left( f - \sum_\beta \phi_\beta \frac{\partial f}{\partial p_\beta} \right) \simeq \frac{\partial}{\partial p}\left( h - \sum_\beta \phi_\beta \frac{\partial h}{\partial p_\beta} \right)$$

for i=1, . . . N.

Proof: Consider the two functions $f(q, \{p_a\}, \{p_\beta\})$ and $h(q, \{p_a\}, \{p_\beta\})$. Using (E-11) and from the hypothesis of the theorem, $$f(q, \{p_a\}, \{g_\alpha\}) = h(q, \{p_a\}, \{g_\alpha\}) \quad \text{(E-28)}$$

Thus is follows $$\left( \frac{\partial f}{\partial q^{(i)}} + \sum_a \frac{\partial f}{\partial p_a} \frac{\partial p_a}{\partial q^{(i)}} + \sum_\beta \frac{\partial f}{\partial p_\beta} \frac{\partial g_\beta}{\partial q^{(i)}} \right)_{\Gamma_p} = \quad \text{(E--29)}$$

-continued $$\left(\frac{\partial h}{\partial q^{(i)}} + \sum_a \frac{\partial h}{\partial p_a}\frac{\partial p_a}{\partial q^{(i)}} + \sum_\beta \frac{\partial h}{\partial p_\beta}\frac{\partial g_\beta}{\partial q^{(i)}}\right)_{\Gamma_p}$$

and $$\left(\frac{\partial f}{\partial p_i} + \sum_{a \neq i} \frac{\partial f}{\partial p_a}\frac{\partial p_a}{\partial p_i} + \sum_\beta \frac{\partial f}{\partial p_\beta}\frac{\partial g_\beta}{\partial p_i}\right)_{\Gamma_\beta} = \quad (E\text{--}30)$$

$$\left(\frac{\partial h}{\partial p_i} + \sum_{a \neq i} \frac{\partial h}{\partial p_a}\frac{\partial p_a}{\partial p_i} + \sum_\beta \frac{\partial h}{\partial p_\beta}\frac{\partial g_\beta}{\partial p_i}\right)_{\Gamma_\beta}$$

Note since $\phi_\alpha(q, p) = p_\alpha - g_\alpha(q, \{p_a\})$, we have $$\frac{\partial g_\beta}{\partial q^{(i)}} = -\frac{\partial \phi_\beta(q, p)}{\partial q^{(i)}}$$

and $$\frac{\partial g_\beta}{\partial p_i} = -\frac{\partial \phi_\beta(q, p)}{\partial p_i}$$

and $$\partial \phi_\alpha(q, p) = 0$$

for $\alpha = 1, \ldots, N-R_W$. We have $$\left(\frac{\partial f}{\partial q^{(i)}} - \sum_\beta \frac{\partial f}{\partial p_\beta}\frac{\partial \phi_\beta}{\partial q^{(i)}}\right)_{\Gamma_p} = \left(\frac{\partial h}{\partial q^{(i)}} - \sum_\beta \frac{\partial h}{\partial p_\beta}\frac{\partial \phi_\beta}{\partial q^{(i)}}\right)_{\Gamma_\beta}$$

which can be written as $$\frac{\partial}{\partial q^{(i)}}\left(f - \sum_\beta \phi_\beta \frac{\partial f}{\partial p_\beta}\right) \simeq \frac{\partial}{\partial q^{(i)}}\left(h - \sum_\beta \phi_\beta \frac{\partial h}{\partial p_\beta}\right)$$

since $\phi_\beta \partial^2 f/\partial p_\beta^2 = 0$ because $\phi_\beta = 0$. Similarly, $$\frac{\partial}{\partial p_i}\left(f - \sum_\beta \phi_\beta \frac{\partial f}{\partial p_\beta}\right) \simeq \frac{\partial}{\partial p_i}\left(h - \sum_\beta \phi_\beta \frac{\partial h}{\partial p_\beta}\right)$$

Corrolary 3.16-1.

$$\dot{q}^{(i)} = \frac{\partial H}{\partial p_i} + \sum_\beta v^{(\beta)} \frac{\partial \phi_\beta}{\partial p_i}$$

$$\dot{p}_i = -\frac{\partial H}{\partial q^{(i)}} - \sum_\beta v^{(\beta)} \frac{\partial \phi_\beta}{\partial q^{(i)}}$$

for $i = 1, \ldots, N$.

Proof. We consider two Hamiltonians $H(\{q^{(i)}\}, \{p_i\})$ and $H_o(\{q^{(i)}\}, \{p_a\})$. Define $H(\{q^{(i)}\}, \{p_i\})$ as follows $$H(\{q^{(i)}\},\{p_i\}) \approx H_o(\{q^{(i)}\},\{p_a\}).$$

Then using the result of Theorem 3.16.1, from (E-29) with $f=H$ and $h=H_o$ $$\frac{\partial H_o}{\partial q^{(i)}} \approx \frac{\partial}{\partial q^{(i)}}\left(H - \sum_{\beta=1}^{N-R_W} \phi_\beta \frac{\partial H}{\partial p_\beta}\right) \quad (E\text{--}31)$$

$$\frac{\partial H_o}{\partial p_i} \approx \frac{\partial}{\partial p_i}\left(H - \sum_{\beta=1}^{N-R_W} \phi_\beta \frac{\partial H}{\partial p_\beta}\right) \quad (E\text{--}32)$$

Using (E-31) and (E-32) in (E-24), we get $$\dot{q}^{(i)} \approx \frac{\partial}{\partial p_i}\left(H - \sum_\beta \phi_\beta \frac{\partial H}{\partial p_\beta}\right) + \sum_\beta \dot{q}^{(\beta)}\frac{\partial \phi_\beta}{\partial p_i} \quad (E\text{--}33)$$

and $$\dot{p}_i \approx -\frac{\partial}{\partial q^{(i)}}\left(H - \sum_\beta \phi_\beta \frac{\partial H}{\partial p_\beta}\right) - \sum_\beta \dot{q}^{(\beta)}\frac{\partial \phi_\beta}{\partial q^{(i)}}$$

or $$\dot{q}^{(i)} \approx \frac{\partial}{\partial p_i}\left(H - \sum_\beta \phi_\beta\left(\frac{\partial H}{\partial p_\beta} - \dot{q}^{(\beta)}\right)\right)$$

and $$\dot{p}_i \approx -\frac{\partial}{\partial q^{(i)}}\left(H - \sum_\beta \phi_\beta\left(\frac{\partial H}{\partial p_\beta} - \dot{q}^{(\beta)}\right)\right)$$

Define $$v_\beta \equiv \dot{q}^{(\beta)} - \frac{\partial H}{\partial p_\beta}$$

$$H_T \equiv H + \sum_\beta v^{(\beta)} \phi_\beta$$

So (E-33) becomes $$\dot{q}^{(i)} \approx \frac{\partial H_T}{\partial p_i} \quad (E\text{--}34)$$

$$\dot{p}_i \approx -\frac{\partial H_T}{\partial q^{(i)}}$$

Constrained Hamiltonian Systems

Local symmetries on a Lagrangian based model. Consider $$q^{(i)} \to q^{(i)}(t) + \delta q^{(i)}(t)$$

$$\dot{q}^{(i)} \to \dot{q}^{(i)}(t) + \delta \dot{q}^{(i)}(t)$$

with $i = 1, \ldots, N$. The action of the system is given by $$S(q,\dot{q}) = \int L(q,\dot{q})dt$$

where $q$ and $\dot{q}$ are n-dimensional column vectors. The action differential $$\delta S = \int L(q+\delta q, \dot{q}+\delta \dot{q})dt - \int L(q, \dot{q})dt$$

-continued $$= \int L(q+\delta q, \dot{q}+\delta\dot{q})dt - \int L(q,\dot{q})dt$$

$$= \int \left[\sum_i \frac{\partial L}{\partial q^{(i)}}\delta q^{(i)} + \sum_i \frac{\partial L}{\partial \dot{q}^{(i)}}\delta\dot{q}^{(i)}\right]dt$$

$$= -\int \sum_i \left[\frac{d}{dt}\frac{\partial L}{\partial \dot{q}^{(i)}} - \frac{\partial L}{\partial q^{(i)}}\right]\delta q^{(i)}dt$$

$$= -\sum \int dt \sum_i E_i^{(o)}(q,\dot{q},\ddot{q})\delta q^{(i)}$$

where we define the Euler-Lagrange differential operator $$E_i^{(o)}(q,\dot{q},\ddot{q}) = \frac{d}{dt}\frac{\partial L}{\partial \dot{q}^{(i)}} - \frac{\partial L}{\partial q^{(i)}}.$$

Note that $$\int \sum_{i=1}^N E_i^{(o)}(q,\dot{q},\ddot{q})\delta q^{(i)}dt \equiv 0 \qquad (3.17\text{-}1)$$

on shell. Expanding $E_i^{(o)}$ $$E_i^{(o)}(q,\dot{q},\ddot{q}) = \sum_j \left[\frac{\partial^2 L(q,\dot{q})}{\partial \dot{q}^{(i)}\partial \dot{q}^{(j)}}\ddot{q}^{(j)} + \frac{\partial^2 L(q,\dot{q})}{\partial \dot{q}^{(i)}\partial q^{(j)}}\dot{q}^{(j)}\right] - \frac{\partial L(q,\dot{q})}{\partial q^{(i)}}$$

$$= \sum_j W_{ij}(q,\dot{q})\ddot{q}^{(j)} + \sum_j \frac{\partial^2 L(q,\dot{q})}{\partial \dot{q}^{(i)}\partial q^{(j)}}\dot{q}^{(j)} - \frac{\partial L(q,\dot{q})}{\partial q^{(i)}}$$

$$= \sum_j W_{ij}(q,\dot{q})\ddot{q}^{(j)} + k_i(q,\dot{q})$$

If L is singular, $W_{(N \times N)}$ is not invertible so (3.17-1) cannot be solved for $\ddot{q}_i$, i=1, ..., N. If Rank($W(q,\dot{q})$)=$R_W$ on shell, then there exist N–$R_W$ in the theory. There exist N–$R_W$ independent left (or right) zero mode eigenvectors $w_i^{(o,k)}$, i=1, ..., N–$R_W$ such that $$\sum_i w_i^{(o,k)}(q,\dot{q})W_{ij}(q,\dot{q}) = 0, \quad k=1, \ldots, N-R_W \qquad (3.17\text{-}2)$$

Thus $$\phi^{(o,k)} = \sum_{i=1}^N w_i^{(o,k)}(q,\dot{q})E_i^{(o)}(q,\dot{q},\ddot{q})$$

depend on q and $\dot{q}$ only. The $\phi^{(o,k)}$ also vanish on shell:

$$\phi^{(o,k)}(q,\dot{q})=0, k=1, \ldots, N-R_W$$

The set $\{\phi^{(o,k)}|k=1, \ldots, N-R_W\}$ are the zero generation constraints. It is possible that not all the $\{\phi^{(o,k)}\}$ are linearly independent. So we may find linear combinations of the zero mode eigenvectors $$v_i^{(o,n_o)} = \sum_k c_k^{(n_o)}w_i^{(o,k)}$$

such that we have $$G^{(o,n_o)}=v^{(o,n_o)}E^{(o)}\equiv 0, n_o, \ldots, N_o \qquad (3.17\text{-}3)$$

These are called gauge identities.

Any variation $\delta q_i$, i=1, ..., N, of the form $$\delta q_i = \sum_{n_o} \varepsilon_{n_o} v_i^{(o,n_o)}$$

Is action invariant by (3.17-1).

Given this definition of $\delta q_i$ and (3.17-3), we conclude $$\delta S = \int dt \sum_{i=1}^N E_i^{(o)}(q,\dot{q},\ddot{q})\sum_{n_o}\varepsilon_{n_o}(t)v_i^{(o,n_o)}$$

$$= \int dt \sum_{i=1}^N \varepsilon_{n_o}\sum_{n_o} E_i^{(o)}(q,\dot{q},\ddot{q})v_i^{(o,n_o)}(q,\dot{q})$$

$$= \int dt \sum_{i=1}^N \varepsilon_{n_o} G^{(o,n_o)}$$

$$\equiv 0$$

everywhere. The remaining zero generating modes which we denote by $u^{(o,n_o)}$ lead to genuine constraints. They are of the form $\phi^{(o,n_o)}(q,\dot{q})=0$ on shell, where $$\phi^{(o,n_o)}=u^{(o,n_o)}E^{(o)}. \qquad (3.17\text{-}4)$$

The algorithm now proceeds as follows. We separate the gauge identities (3.17-3) from the nontrivial constraints (3.17-4) and will list them separately. They will be used for determining local symmetry transformations.

Next we want to search for additional constraints. We do this by searching for further functions of the coordinates and velocities which vanish in the space of physical trajectories. To this effect consider the following N+$N_o$ vector constructed from $E^{(o)}$ and the time derivative of the constraints (3.17-4)

$$[E^{(1)}] = \begin{bmatrix} E^{(o)} \\ \frac{d}{dt}(u^{(o,1)}E^{(o)}) \\ \vdots \\ \frac{d}{dt}(u^{(o,n_o)}E^{(o)}) \end{bmatrix} = \begin{bmatrix} E^{(o)} \\ \frac{d}{dt}\phi^{(o)} \end{bmatrix} \qquad (3.17\text{-}5)$$

by construction. The constraint $\phi^{(o)}$ is valid for all time and therefore $$\frac{d}{dt}\phi^{(o)} = 0$$

on shell, but $$\frac{d\phi^{(o,i)}}{dt} = \nabla \dot{q}(u^{(o,i)}E^{(o)})\ddot{q} + \nabla q(u^{(o,i)}E^{(o)})\dot{q} \qquad (3.17\text{-}6)$$

So $$[E_{i_1}^{(1)}] = \sum_{j=1}^{n} W_{i_1 j}^{(1)}(q, \dot{q})\dot{q}^{(j)} + k_{i_1}^{(1)}(q, \dot{q})$$

where $i_1 = 1, \ldots, N+N_o$, and $$[W_{i_1 i}^{(1)}] = \begin{bmatrix} W^{(o)} \\ \nabla \dot{q}(u^{(o,i)}E^{(o)}) \\ \vdots \\ \nabla \dot{q}(u^{(o,N_o)}E^{(o)}) \end{bmatrix} \qquad (3.17\text{-}7)$$

$$[k_{i_1}^{(1)}] = \begin{bmatrix} k^{(o)} \\ \sum_j \frac{\partial}{\partial q^{(j)}}(u^{(o,i)}E^{(o)})\dot{q}^{(j)} \\ \vdots \\ \sum_j \frac{\partial}{\partial q^{(j)}}(u^{(o,N_o)}E^{(o)})\dot{q}^{(j)} \end{bmatrix}$$

We next look for the zero modes of $W^{(1)}$. By construction, these zero modes include the o modes of the previous level. The gauge identities at level 1 are.

$$G^{(1,n_1)} = v^{(1,n_1)}E^1 - \sum_{n_o=1}^{N_o} M_{n_1 n_o}^{(1,0)}(u^{(o,n_o)}E^{(o)}) \equiv 0 \qquad (3.17\text{-}8)$$

where $n_1 = 1, \ldots, N_1$ and the genuine constraints are of the form $$\phi^{(1,n_1)} = \phi^{(1,n_1)}E^1 = 0 \qquad (3.17\text{-}9)$$

with $n_1 = 1, \ldots, N_1$ on shell.

We next adjoin the new identities (3.17-8) to the ones determined earlier (3.17-3) with the remaining constraints (3.17-9) we proceed as before, adjoining their time derivatives to (3.17-5) and construct $W_{i_1 i'}^{(1)}$ and $k_{i_1}^{(1)}$.

The iterative process will terminate at some level M if either i) there is not further zero modes, or ii) the new constraints can be expressed as linear combinations of previous constraints.

The Maximal Set of Linearly Independent Gauge Identities Generated by the Algorithm Note that the algorithm steps are of the form $$G^{(o,n_o)} = u^{(o,n_o)}E^{(o)} \equiv 0 \qquad (3.17\text{-}10)$$

$$G^{(l,n_l)} = u^{(l,n_l)}E^l - \sum_{l'=0}^{l-1}\sum_{n_{l'}=0}^{N_{l'}} M_{n_l n_{l'}}^{(l,l')}\phi^{(l',n_{l'})} \qquad (3.17\text{-}11)$$

with $L = 1, \ldots, N_l$. The $M_{n_l n_{l'}}^{(l,l')}$ are only functions of q and $\dot{q}$. And $$\phi^{(l,n_l)} = u^{(l,n_l)}E^{(l)}, \quad n_l = 1, \ldots, N_l, \qquad (3.17\text{-}12)$$

$$E^{(l)} = \begin{bmatrix} E^{(o)} \\ \frac{d\phi^{(o)}}{dt} \\ \vdots \\ \frac{d\phi^{(l-1)}}{dt} \end{bmatrix} \qquad (3.17\text{-}13)$$

where $\phi^{(l)}$ is a column vector with $N_l$ components $\phi^{(l,n_l)}$. Thus we conclude from (3.17-13) and (3.17-11) that the general form of the gauge identity given by (3.17-11) is of the form $$G^{(l,n_l)} = \sum_{i=1}^{N_l} \sum_{l=1}^{M} \sum_{m=1}^{l} \varsigma_{mi}^{(l,m_l)} \frac{d^m}{dt^m} E_i^{(o)} \equiv 0 \qquad (3.17\text{-}14)$$

where $\varsigma_{mi}^{(l,m_l)}(q, \dot{q})$ and $N_l < M$. From (3.17-14) it also follows that $$\sum_{l=1}^{M} \sum_{n_l=1}^{l} \varepsilon^{(l,n_l)} G^{(l,n_l)} \equiv 0 \qquad (3.17\text{-}15)$$

This identity can also be written as $$\sum \delta q^{(i)} E_i^{(o)} - \frac{d}{dt} F \qquad (3.17\text{-}16)$$

where $$\delta q^{(i)} = \sum_{l=1}^{M} \sum_{n_l=1}^{N_l} \sum_{m=q}^{l} (-1)^m \frac{d^m}{dt^m} \varsigma_m^{(l,n_l)} \varepsilon^{(l,n_l)}(t)$$

and F is a complicated function of q and $\dot{q}$. By collecting indices l, $n_l$ together $$\delta q_i = \sum_{l=1}^{M} \sum_{n_l=1}^{N_l} \sum_{m=q}^{l} (-1)^m \varsigma_{m_i}^{(a)} \varepsilon^{(a)}(t)$$

Example of Constrained Hamiltonian System in Lagrangian Form

Let $$L(q,\dot{q}) = \tfrac{1}{2}\dot{q}^{2(1)} + \dot{q}^{(1)}q^{(2)} + \tfrac{1}{2}(q^{(1)} - q^{(2)})^2 \qquad (3.17\text{-}17)$$

$$L(q,\dot{q}) = \frac{1}{2}\dot{q}^{2(1)} + \dot{q}^{(1)}q^{(2)} + \frac{1}{2}(q^{(1)} - q^{(2)})^2 \qquad (3.17\text{-}17)$$

$$E^{(o)} = \begin{bmatrix} \frac{d}{dt}\frac{\partial}{\partial \dot{q}^{(1)}} - \frac{\partial L}{\partial q^{(1)}} \\ \frac{d}{dt}\frac{\partial}{\partial \dot{q}^{(2)}} - \frac{\partial L}{\partial q^{(2)}} \end{bmatrix} = \begin{bmatrix} \ddot{q}^{(1)} + 2q^{(2)} - q^{(1)} \\ q^{(1)} - q^{(2)} \end{bmatrix} \qquad (3.17\text{-}18)$$

$$W = \begin{bmatrix} 1 & 0 \\ 0 & 0 \end{bmatrix} \qquad (3.17\text{-}19)$$

-continued $$k = \begin{bmatrix} \dot{q}^{(2)} - q^{(1)} + q^{(2)} \\ -\dot{q}^{(1)} - q^{(2)} + q^{(1)} \end{bmatrix} \quad (3.17\text{-}20)$$

The only o mode is $$u^{(o)} = [0, 1] \quad (3.17\text{-}21)$$

Then $$E^{(o)} = W^{(o)}\ddot{q} + k^{(o)}$$
$$= \begin{bmatrix} 1 & 0 \\ 0 & 0 \end{bmatrix} \begin{bmatrix} \ddot{q}^{(1)} \\ \ddot{q}^{(2)} \end{bmatrix} + \begin{bmatrix} \dot{q}^{(2)} - q^{(1)} + q^{(2)} \\ -\dot{q}^{(1)} - q^{(2)} + q^{(1)} \end{bmatrix}$$

Then $$u^{(o)}E^{(o)} = [0 \ 1] \left[ \begin{bmatrix} 1 & 0 \\ 0 & 0 \end{bmatrix} \begin{bmatrix} \ddot{q}^{(1)} \\ \ddot{q}^{(2)} \end{bmatrix} + \begin{bmatrix} \dot{q}^{(2)} - q^{(1)} + q^{(2)} \\ -\dot{q}^{(1)} - q^{(2)} + q^{(1)} \end{bmatrix} \right]$$
$$= -\dot{q}^{(1)} - q^{(2)} + q^{(1)}$$
$$= 0$$

on shell. Then there are no gauge identities for $E^{(o)}$. Now construct $E^{(1)}$.

$$E^{(1)} = \begin{bmatrix} E^{(o)} \\ \frac{d}{dt} u^{(o)} E^{(o)} \end{bmatrix} = \begin{bmatrix} \dot{q}^{(2)} - q^{(1)} + q^{(2)} \\ -\dot{q}^{(1)} - q^{(2)} + q^{(1)} \\ -\ddot{q}^{(1)} - \dot{q}^{(2)} + \dot{q}^{(1)} \end{bmatrix}$$

which can be written $$E^{(1)} = W^{(1)}\ddot{q} + k^{(1)}$$
$$= \begin{bmatrix} 0 & 0 \\ 0 & 0 \\ -1 & 0 \end{bmatrix} \begin{bmatrix} \ddot{q}^{(1)} \\ \ddot{q}^{(2)} \end{bmatrix} + \begin{bmatrix} \dot{q}^{(2)} - q^{(1)} + q^{(2)} \\ -\dot{q}^{(1)} - q^{(2)} + q^{(1)} \\ -\dot{q}^{(2)} + \dot{q}^{(1)} \end{bmatrix}$$

There zero modes of $W^{(1)}$ are $$W^{(1)} \begin{cases} [0 \ 1 \ 0] \\ [1 \ 0 \ 1] \end{cases}$$

The first zero mode is the previous one augmented by one dimension and reproduces the previous constraint. The second mode reproduces the negative of the constraint (3.17-21). That is, $$v^{(1)}E^{(1)} = -u^{(o)}E^{(o)}$$

with $v^{(1)} = [1 \ 0 \ 1]$. This leads to the gauge identity $$G^{(1)} = v^{(1)}E^{(1)} + u^{(o)}E^{(o)} \equiv 0$$

Companionship: Reconciling Agents in the Network.

The outline of the companionship process is as follows for a system of N agents.

Determine the state action space of the system for N−1 agents to create a Tellegen decision element.
Update the remaining agent with the Tellegen DE.
Repeat process so that all N agents are updated with respect to their Tellegen DEs.

User submits query.
System used KB to establish equations of motion for system in Lagrangian or Hamiltonian form.
System determines optimal trajectory via optimization algorithm of the equations of motion that conform to the principle of least action.
System returns solution which is a point in the phase space and also serves as an answer to the query.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
obtaining, by one or more computing systems of a collaborative distributed decision system, coupled differential equations that represent a current state of a physical system and that are generated from system information and objective information and sensor information, wherein the physical system is an energy generating facility that has a plurality of inter-related elements including at least one energy source within the energy generating facility and at least one energy storage mechanism within the energy generating facility, wherein the physical system further has one or more outputs including energy being provided and whose values vary based at least in part on values of one or more manipulatable control elements of the plurality that include one or more controls to determine whether to accept a request to supply a specified amount of energy at the current time and to determine to provide energy to the at least one energy storage mechanism at the current time if not accepted and to provide energy from the at least one energy source at the current time if accepted, wherein the system information is supplied by one or more users to describe the physical system and includes multiple rules that each has one or more conditions to evaluate and that specify restrictions involving the plurality of inter-related elements, wherein the objective information identifies a goal to be achieved during controlling of the physical system, and wherein the sensor information identifies current state information for at least one element of the plurality and partial initial state information for the physical system at an earlier time;

performing, by the one or more computing systems, a piecewise linear analysis of the coupled differential equations to identify one or more control actions to take in the physical system that manipulate values of the one or more manipulatable control elements and that provide a solution for the goal within a threshold amount of an optimal solution for the goal, wherein the performing of the piecewise linear analysis includes:

dividing a time window from the earlier time to the specified time into a succession of a plurality of time slices that each, other than a first time slice of the succession, overlaps at least in part with a prior time slice of the succession;

evaluating, based on the partial initial state information, the coupled differential equations to identify an initial solution for the goal for the first time slice that includes simulating effects of manipulating the one or more manipulatable control elements to one or more initial values, and storing a model describing a state of the physical system for the first time slice that includes the simulated effects of the manipulating to the one or more initial values;

for each time slice of the succession after the first time slice, updating the stored model for the prior time slice to reflect an additional solution for the goal for the time slice that includes simulating effects of further manipulating the one or more manipulatable control elements to one or more additional values; and after updating the stored model to reflect the additional solution for the goal for a last time slice of the succession, further updating the stored model for the last time slice to reflect a further solution for the goal for a next time period after the time window based at least in part on the identified current state information, wherein the further solution includes the identified one or more control actions to take in the physical system for a current time; and wherein the evaluating of the coupled differential equations to identify the initial solution for the goal for the first time slice and the updating of the stored model for each time slice of the succession after the first time slice is performed to train the updated stored model for the last time slice to reflect values of at least some of the plurality of inter-related elements for the current time that include one or more elements whose values are not directly observable, and wherein training of the updated stored model for the last time slice enables the further updating to reflect the further solution for the goal for the next time period; and initiating, by the one or more computing systems, performance of the identified one or more control actions in the physical system for the current time by manipulating the manipulatable control elements in specified manners for the identified one or more control actions, to cause the outputs to change based on the performance of the identified one or more control actions.

2. The computer-implemented method of claim 1 wherein the stored model for each of the time slices of the succession is expressed with a Hamiltonian function specific to the time slice, and wherein each updating of the stored model for a prior time slice to reflect an additional solution for the goal includes modifying the Hamiltonian function expressed by the stored model for the prior time slice.

3. The computer-implemented method of claim 1 wherein the updated stored model for the last time slice is expressed with a Hamiltonian function, and wherein the further updating of the stored model for the last time slice to reflect the further solution for the goal for the next time period includes modifying the Hamiltonian function based at least in part on the identified current state information.

4. The computer-implemented method of claim 1 further comprising, for each of multiple additional times after the current time, adapting a current copy of the stored model to reflect the additional time by:

obtaining additional sensor information that identifies state information at the additional time for one or more elements of the plurality;

determining, by the one or more computing systems, if an updated copy of the stored model can be generated for the additional time by attempting to identify another solution for the goal for the additional time based at least in part on the additional sensor information, wherein the another solution, if identified, includes one or more further control actions to take in the physical system for the additional time; and if the updated copy of the stored model can be generated for the additional time, generating and storing the updated copy of the stored model, and providing information about one or more additional control actions to perform in the physical system for the additional time to further manipulate the manipulatable control elements in a specified manner.

5. The computer-implemented method of claim 4 further comprising, for each of the multiple additional times and if the updated copy of the stored model for the additional time is not generated, providing information about one or more further associated control actions to perform in the physical system for that additional time to further manipulate the manipulatable control elements in a specified manner, wherein the one or more further associated control actions are based on the current copy of the stored model before updating for the additional time.

6. The computer-implemented method of claim 5 wherein generating of the updated copy of the stored model for one of the multiple additional times includes a deadline for the generating to enable real-time control of the physical system to be performed based on performing control actions in the physical system for the one additional time, and wherein the generating of the updated copy of the stored model for the one additional time fails to complete before the deadline, such that the one or more further associated control actions for that one additional time are performed in the physical system for that one additional time to further manipulate the manipulatable control elements in a specified manner.

7. The computer-implemented method of claim 4 wherein the updated copy of the stored model for one of the multiple additional times is not generated in a first attempt, and wherein the method further comprises generating the updated copy of the stored model for the one additional time during a second attempt by:

determining, by the one or more computing systems, at least one of the multiple rules to temporarily relax by modifying at least one of the specified restrictions corresponding to the determined at least one rule;

generating, by the one or more computing systems, additional coupled differential equations that represent a current state of the physical system for the one additional time based at least in part on the modified at least one specified restrictions for the determined at least one rule;

performing, by the one or more computing systems, a further piecewise linear analysis of the generated additional coupled differential equations to identify the another solution for the goal for the one additional time, generating and storing the updated copy of the stored model for the one additional time; and providing information about the one or more additional control actions of the updated copy of the stored model for the one additional time to perform in the physical system for the one additional time to further manipulate the manipulatable control elements in a specified manner.

8. The computer-implemented method of claim 7 wherein the multiple rules include one or more absolute rules that specify non-modifiable restrictions that are requirements regarding operation of the physical system, and further include one or more hard rules that specify restrictions regarding operation of the physical system that can be modified in specified situations, and wherein each determined at least one rule is one of the hard rules.

9. The computer-implemented method of claim 7 wherein the multiple rules include one or more soft rules whose conditions evaluate to one of three or more possible values under differing situations to represent varying degrees of uncertainty and further include additional rules whose conditions evaluate to either true or false under differing situations, and wherein one or more of the determined at least one rules are from the soft rules.

10. The computer-implemented method of claim 4 wherein the determining if the updated copy of the stored model can be generated for one of the multiple additional times includes generating values for one or more model error measurements based at least in part on the current copy of the stored model for the one additional time, and includes determining that at least one of the generated values exceeds an error threshold, and wherein the method further comprises generating the updated copy of the stored model for the one additional time by:

evaluating, by the one or more computing systems, the generated values for the one or more model error measurements to determine at least one of the multiple rules that is incorrect;

modifying, by the one or more computing systems, the determined at least one rule in a manner expected to reduce values for the one or more model error measurements;

generating, by the one or more computing systems, additional coupled differential equations that represent a current state of the physical system for the one additional time based at least in part on the modified determined at least one rule;

performing, by the one or more computing systems, a further piecewise linear analysis of the generated additional coupled differential equations to identify the another solution for the goal for the one additional time, generating and storing the updated copy of the stored model for the one additional time; and providing information about the one or more additional control actions of the updated copy of the stored model for the one additional time to perform in the physical system for the one additional time to further manipulate the manipulatable control elements in a specified manner.

11. The computer-implemented method of claim 10 wherein the another solution identified for the goal for two or more of the additional times each has an associated error measurement within a defined threshold relative to an optimal solution for the goal for that additional time, and wherein the one or more model error measurements are based on a rate of change of one or more of:

Hamiltonian functions expressed by two or more copies of the model for two or more times;

amounts of entropy included in two or more copies of the model for two or more times;

values of variables associated with the plurality of inter-related elements in state information for the physical system for two or more times; or a reduction in the associated error measurements for the another solutions for the two or more additional times.

12. The computer-implemented method of claim 4 wherein the determining if the updated copy of the stored model can be generated for one of the multiple additional times includes:

generating, by the one or more computing systems, the updated copy of the stored model for the one additional time;

generating, by the one or more computing systems, values for one or more model error measurements for the generated updated copy of the stored model for the one additional time;

determining, by the one or more computing systems, that at least one of the generated values exceeds an error threshold; and replacing, by the one or more computing systems, the generated updated copy of the stored model for the one additional time with a new generated updated copy of the stored model for the one additional time, by causing a new copy of the model for the one additional time to be generated without using any past copies of the model, and storing the generated new copy of the model for the one additional time.

13. The computer-implemented method of claim 1 further comprising modifying the multiple rules during one of the multiple additional times, and wherein updating of copies of the stored model after the one additional time includes using the modified rules.

14. The computer-implemented method of claim 1 further comprising, before the dividing of the time window into the succession of time slices, determining, by the one or more computing systems, at least one of a size of the time slices or a size of the time window.

15. The computer-implemented method of claim 14 wherein the determining of the at least one of the size of the time slices or the size of the time window includes evaluating multiple test sizes for the at least one of the size of the time slices or the size of the time window, and selecting, based at least in part on the evaluating, one or more of the multiple sizes to use for the determined at least one size of the time slices or size of the time window.

16. The computer-implemented method of claim 14 further comprising generating a Hamiltonian function to express a copy of the model of the state of the physical system before the dividing of the time window into the succession of time slices, and wherein the determining of the at least one of the size of the time slices or the size of the time window includes performing a symbolic computation analysis of the Hamiltonian function to identify one or more preferred sizes to use for the determined at least one size of the time slices or size of the time window.

17. A system comprising:
one or more processors of one or more computing systems; and
one or more memories with stored instructions that, when executed by at least one of the one or more processors, cause the one or more processors to determine one or more control actions to perform as part of controlling a physical system, the determining of the one or more control actions including:
obtaining coupled differential equations that represent a state of a physical system for a specified time and that are generated from system information and objective information and sensor information, wherein the physical system has a plurality of inter-related elements and has one or more outputs whose values vary based at least in part on values of one or more manipulatable control elements of the plurality, wherein the system information is supplied by one or more users to describe the physical system and includes restrictions involving the plurality of elements, wherein the objective information identifies a goal to be achieved during controlling of the physical system, and wherein the sensor information identifies state information for the specified time for at least one element of the plurality;
performing a first piecewise linear analysis of the coupled differential equations to train a model that describes a state of the physical system for the specified time and that includes values of at least some of the plurality of elements for the specified time, wherein the performing of the first piecewise linear analysis includes simulating effects of manipulating the one or more manipulatable control elements for each of one or more prior time periods before the specified time while satisfying the goal for the one or more prior time periods;
performing a second piecewise linear analysis of the coupled differential equations to identify one or more control actions to take in the physical system for the specified time that manipulate values of the one or more manipulatable control elements and that provide a solution for the goal for the specified time, wherein the performing of the second piecewise linear analysis includes updating the model to reflect the solution for the goal for the specified time period based at least in part on the identified state information for the specified time; and
providing information about the identified one or more control actions, to enable actions to be taken in the physical system for the specified time to affect the outputs based on the identified one or more control actions.

18. The system of claim 17 wherein the software instructions are part of a collaborative distributed decision system, and wherein the system further comprises one or more effectuators to perform the actions in the physical system for the specified time by manipulating the values of the one or more manipulatable control elements in specified manners for the identified one or more control actions to affect the outputs.

19. The system of claim 17 wherein the performing of the first piecewise linear analysis of the coupled differential equations to train the model further includes:
dividing a time window from an earlier time to the specified time into a succession of a plurality of time slices that each, other than a first time slice of the succession, overlaps at least in part with a prior time slice of the succession;
evaluating, based on partial initial state information for the physical system at the earlier time, the coupled differential equations to identify an initial solution for the goal for the first time slice that includes simulating effects of manipulating the one or more manipulatable control elements to one or more initial values, and storing an initial version of the model describing a state of the physical system for the first time slice that includes the simulated effects of the manipulating to the one or more initial values; and
for each time slice of the succession after the first time slice, updating a stored version of the model for the prior time slice to reflect an additional solution for the goal for the time slice that includes simulating effects of further manipulating the one or more manipulatable control elements to one or more additional values.

20. The system of claim 19 wherein the performing of the second piecewise linear analysis of the coupled differential equations to identify the one or more control actions to take in the physical system for the specified time further includes, after updating the stored version of the model to reflect the additional solution for the goal for a last time slice of the succession, further updating the stored version of the model for the last time slice to reflect a further solution for the goal for a next time period after the time window based at least in part on the identified state information, wherein the further solution includes the identified one or more control actions to take in the physical system for a current time.

21. The system of claim 20 wherein the updated stored version of the model for the last time slice is expressed with a Hamiltonian function, and wherein the further updating of the stored version of the model for the last time slice to reflect the further solution for the goal for the next time period includes modifying the Hamiltonian function based at least in part on the identified state information.

22. The system of claim 17 wherein the stored instructions include software instructions that, when executed by the at least one processor, further cause the one or more processors to perform additional automated operations including, for each of multiple additional times after the providing of the information about the identified one or more control actions, adapting a current copy of the model to reflect the additional time by:
obtaining additional sensor information that identifies state information at the additional time for one or more elements of the plurality;
determining if an updated copy of the model can be generated for the additional time by attempting to identify another solution for the goal for the additional time based at least in part on the additional sensor information, wherein the another solution, if identified, includes one or more further control actions to take in the physical system for the additional time; and
if the updated copy of the model can be generated for the additional time, generating and storing the updated copy of the model, and providing information about one or more additional control actions to perform in the physical system for the additional time to further manipulate the manipulatable control elements in a specified manner.

23. The system of claim 22 wherein the additional automated operations further include, for each of the multiple additional times and if the updated copy of the model for the additional time is not generated, providing information about one or more further associated control actions to perform in the physical system for that additional time to further manipulate the manipulatable control elements, wherein the one or more further associated control actions are based on the current copy of the model before updating for the additional time.

24. The system of claim 23 wherein generating of the updated copy of the model for one of the multiple additional times includes using a deadline for the generating to enable real-time control of the physical system to be performed based on performing control actions in the physical system for the one additional time, and further includes failing to complete before the deadline, such that the one or more further associated control actions for that one additional time are performed in the physical system for that one additional time to further manipulate the manipulatable control elements.

25. The system of claim 22 wherein the system information to describe the physical system further includes multiple rules that each has one or more conditions to evaluate and that specify the restrictions involving the plurality of elements, wherein the updated copy of the model for one of the multiple additional times is not generated in a first attempt, and wherein the additional automated operations further include generating the updated copy of the model for the one additional time during a second attempt by:
  determining at least one of the multiple rules to temporarily relax by modifying at least one of the specified restrictions corresponding to the determined at least one rule;
  generating additional coupled differential equations that represent a current state of the physical system for the one additional time based at least in part on the modified at least one specified restrictions for the determined at least one rule;
  performing a further piecewise linear analysis of the generated additional coupled differential equations to identify the another solution for the goal for the one additional time;
  generating and storing the updated copy of the model for the one additional time; and
  providing information about the one or more additional control actions of the updated copy of the model for the one additional time to perform in the physical system for the one additional time to further manipulate the manipulatable control elements.

26. The system of claim 25 wherein the multiple rules include one or more absolute rules that specify non-modifiable restrictions that are requirements regarding operation of the physical system, and further include one or more hard rules that specify restrictions regarding operation of the physical system that can be modified in specified situations, and wherein each determined at least one rule is one of the hard rules.

27. The system of claim 25 wherein the multiple rules include one or more soft rules whose conditions evaluate to one of three or more possible values under differing situations to represent varying degrees of uncertainty and further include additional rules whose conditions evaluate to either true or false under differing situations, and wherein one or more of the determined at least one rules are from the soft rules.

28. The system of claim 22 wherein the system information to describe the physical system further includes multiple rules that each has one or more conditions to evaluate, wherein the determining if the updated copy of the model can be generated for one of the multiple additional times includes generating values for one or more model error measurements based at least in part on the current copy of the model for the one additional time, and includes determining that at least one of the generated values exceeds an error threshold, and wherein the additional automated operations further include generating the updated copy of the model for the one additional time by:
  evaluating the generated values for the one or more model error measurements to determine at least one of the multiple rules that is incorrect;
  modifying the determined at least one rule in a manner expected to reduce values for the one or more model error measurements;
  generating additional coupled differential equations that represent a current state of the physical system for the one additional time based at least in part on the modified determined at least one rule;
  performing a further piecewise linear analysis of the generated additional coupled differential equations to identify the another solution for the goal for the one additional time,
  generating and storing the updated copy of the model for the one additional time; and
  providing information about the one or more additional control actions of the updated copy of the model for the one additional time to perform in the physical system for the one additional time to further manipulate the manipulatable control elements.

29. The system of claim 22 wherein the determining if the updated copy of the model can be generated for one of the multiple additional times includes:
  generating the updated copy of the model for the one additional time;
  generating values for one or more model error measurements for the generated updated copy of the model for the one additional time;
  determining that at least one of the generated values exceeds an error threshold; and
  replacing, the generated updated copy of the model for the one additional time with a new generated updated copy of the model for the one additional time, by causing a new copy of the model for the one additional time to be generated without using any past copies of the model, and storing the generated new copy of the model for the one additional time.

* * * * *